US005970482A

United States Patent [19]
Pham et al.

[11] Patent Number: 5,970,482
[45] Date of Patent: Oct. 19, 1999

[54] SYSTEM FOR DATA MINING USING NEUROAGENTS

[75] Inventors: Khai Minh Pham, Menlo Park; Eric Bertrand Rajkovic, Foster City; Veronique Piffero, Menlo Park, all of Calif.

[73] Assignee: Datamind Corporation, San Mateo, Calif.

[21] Appl. No.: 08/600,229

[22] Filed: Feb. 12, 1996

[51] Int. Cl.[6] .................................................. G06F 15/18
[52] U.S. Cl. .............................. 706/16; 706/12; 706/45
[58] Field of Search ............................. 395/10, 22, 77, 395/50; 706/12, 45, 16

[56] References Cited

U.S. PATENT DOCUMENTS

| | | | |
|---|---|---|---|
| 5,398,300 | 3/1995 | Levey | 706/16 |
| 5,586,218 | 12/1996 | Allen | 706/12 |
| 5,615,341 | 3/1997 | Agrawal et al. | 705/10 |
| 5,692,107 | 11/1997 | Simoudis et al. | 706/12 |

OTHER PUBLICATIONS

Intelligent Data Analysis Methods in DataEngine, http://ss-m3.mitmgbh.de/mit/products/demos.html/dedemo_3.zip, Sep. 1994.
IntelliSphere©, "User's Guide & Reference Guide" (Version 2.0), 1995, pp. I–23 to I–53, II–51 to II–82, II–197 to II–270.
K. M. Pham, "The NeurOagent: A Neural Multi–agent Approach for Modelling, Distributed Processing and Learning," Intelligent Hybrid Systems, 1995, pp. 221–244.
R. Kerber, B. Livezey, E. Simoudis, "A Hybrid System for Data Mining," Intelligent Hybrid Systems, 1995, pp. 121–142.
S. Goonatilake, S. Khebbal, "A Hybrid Systems Classification Scheme," Intelligent Hybrid Systems, pp. 7–11., 1995.
A. Szladow and W. Ziarko, "Rough Sets: Working with Imperfect Data," AI Expert, pp. 36–41, Jul. 1993.
P.D. Varhol, "Modeling systems with polynomial networks: tools for predicting behavior," Dr. Dobb's Journal, vol. 18(9),p. 76(5), Sep. 1993.
D.S. Barr and G. Mani, "Using Neural Nets to Manage Investments," AI Expert, pp. 16–21, Feb. 1994.

(List continued on next page.)

*Primary Examiner*—Robert W. Downs
*Attorney, Agent, or Firm*—Wilson Sonsini Goodrich & Rosati

[57] ABSTRACT

A neuroagent approach is used in an automated and unified data mining system to provide an explicitly predictive knowledge model. The neuroagent is a neural multi-agent approach based on macro-connectionism and comprises a double integration at the association and symbolic level as well as the knowledge model level. This data mining system permits discovery, evaluation and prediction of the correlative factors of data, i.e., the conjunctions, as corresponding to neuroexpressions (a semantic connection of neuroagents) connected to an output neuroagent which corresponds to the data output, the connection weights yielding the relative significance of these factors to the given output. The system takes data sets called Domains, establishes candidate dimensions or Parameters, categorizes Parameters into discrete bins, and trains a neuroagent network composed of neuroagents allocated for each bin and each output based on a discovery data set, called a Discovery Domain, and by building up the various minimal and contextual neuroexpressions, and setting the appropriate connection weights, the results may therefore be compared with an optional evaluation data set, called an Evaluation Domain to establish the accuracy of the knowledge model, and thereafter applied with some degree of confidence to a prediction set or Prediction Domain. The ranking in importance of the composite Parameters may be calculated as well as the discrimination between the various outputs, which permits the relevant factors of interest to a decision maker to come into focus.

33 Claims, 29 Drawing Sheets

OTHER PUBLICATIONS

W. Dwinnell, "The Second Generation Cometh: Advanced Modeling Systems," AI Expert, pp. 38–41, Jun. 1994.

Neural Networks Resource Guide, AI Expert, pp. 42–51, Jun. 1994.

"The Power of Database Mining," AI Expert, p. 46, Dec. 1994.

"Greater Data Insight," AI Expert, p. 41, Feb. 1995.

"Go Ahead and Make a Prediction," AI Expert, p. 45, Jun. 1995.

Database Mining Workstation, HNC, Inc., Software Product Specification, Dec. 1991.

"Mining, minus mining mishaps" (Product Showcase), AI Expert, p. 54, Aug. 1992.

C.J. Matheus, et al., "Systems for Knowledge Discovery in Databases," IEEE Trans. on Knowledge and Data Engineering, vol. 5(6), pp. 903–913, Dec. 1993.

DataLogic/R (V.1.3), REDUCT Systems, Inc., Software Product Specification, Dec. 1993.

L. Lewinson, "Data mining: tapping into the mother lode," Database Programming & Design, vol. 7(2), pp. 50(5), Feb. 1994.

J. Angstenberger, et al., "DataEngine: A Software Tool for Intelligent Data Analysis," WESCON/94, pp. 348–350, Sep. 1994.

DataLogic/R+ (V.1.5), Reduct Systems, Inc., Software Product Specification, Dec. 1994.

R. Sharpe, "A mine of information," Computer Weekly, pp. 33(2), Jan. 1995.

"Pushing the data mining envelope," AI Expert, p. 46, Jan. 1995.

M. Marshall, "New edition of data–mining tool makes up its own rules," Communications Week, n.559, p. 12(2), May 1995.

W. Pickering, "Cognos calls Angoss for data–mining power," PC Week, vol. 12(31), pp. 33(2), Aug. 1995.

P.K. Chan and S.J. Stolfo, "Learning Arbiter and Combiner Trees from Partitioned Data for Scaling Machine Learning," Proc. First Int'l. Conf. on Knowledge Discovery & Data Mining, pp. 39–44, Aug. 1995.

A. Ciampi and Y. Lechevallier, "Designing Neural Networks from Statistical Models: A new approach to data exploration," Proc. First Int'l. Conf. on Knowledge Discovery & Data Mining, pp. 45–50, Aug. 1995.

C. Cortes, et al., "Capacity and Complexity Control in Predicting the Spread Between Borrowing and Lending Interest Rates," Proc. First Int'l. Conf. on Knowledge Discovery & Data Mining, pp. 51–56, Aug. 1995.

C. Cortes, et al., "Limits on Learning Machine Accuracy Imposed by Data Quality," Proc. First Int'l. Conf. on Knowledge Discovery & Data Mining, pp. 57–62, Aug. 1995.

R. Kohavi and D. Sommerfield, "Feature Subset Selection Using the Wrapper Method: Overfitting and Dynamic Search Space Topology," Proc. First Int'l. Conf. on Knowledge Discovery & Data Mining, pp. 192–197, Aug. 1995.

H.-Y. Lee, et al., "Exploiting Visualization in Knowledge Discovery," Proc. First Int'l. Conf. on Knowledge Discovery & Data Mining, pp. 198–203, Aug. 1995.

E. Simoudis, et al., "Using Recon for Data Cleaning," Proc. First Int'l. Conf. on Knowledge Discovery & Data Mining, pp. 282–287, Aug. 1995.

N. Zhong and S. Ohsuga, "Toward A Multi–Strategy and Cooperative Discovery System," Proc. First int'l. Conf. on Knowledge Discovery & Data Mining, pp. 337–342, Aug. 1995.

"Mining data," PC Week, p. E5, Aug. 1995.

R. Shortland and R. Scarfe, "Digging for gold," IEE Review, vol. 45(5), pp. 213–217, Sep. 1995.

W.W. Eckerson, "Information Harvesting offers data mining and forecasting tool," Distributed Computing Monitor, vol. 10(9), p. S6, Sep. 1995.

I. Greenberg and C. Whitmer, "SPSS 7.0 for Windows 95 set to mine data warehouse systems," InfoWorld, vol. 17(42), p. 37, Oct. 1995.

A.J. Fridlund,"Sophisticated Statistica is slick jack–of–all–trades; wealth of features in easy to access," InfoWorld, vol. 17(44), p. 106, Oct. 1995.

S.R. Hedberg, "The Data Gold Rush," BYTE, pp. 83–88, Oct. 1995.

K. Watterson, "A Data Miner's Tools," BYTE, pp. 91–96, Oct. 1995.

C.D. Krivda, "Data–Mining Dynamite," BYTE, pp. 97–103, Oct. 1995.

B. Phillips, "Data–mining tool taps parallel servers," PC Week, pp. 36(2), Jan. 1996.

Fuzzy Predicates

Forward Propagation

Backward Propagation

Retropropagation of necessities

Inference Proagation Mechanisms

Learning Algorithm

Scenario Specification

Scenario No.1: Scenario #1

| Field Name | Input/Output | Type | Nb Values | Categorization | Min | Max |
|---|---|---|---|---|---|---|
| ACCOUNT | Output | Discrete | 3 | | | |
| SEX | Input | Discrete | 2 | | | |
| MARITALSTA | Input | Discrete | 3 | | | |
| CHILDREN | Input | Discrete | 4 | | | |
| OCCUPATION | Input | Discrete | 5 | | | |
| HOME | Input | Discrete | 2 | | | |
| EXPENSES | Input | Continuous | 5 | Equidistant | 508 | 3541 |
| INCOME | Input | Continuous | 5 | Equidistant | 2004 | 8975 |
| CHECKING | Input | Discrete | 2 | | | |
| SAVINGS | Input | Discrete | 2 | | | |
| MASTERCARD_C | Input | Discrete | 7 | | | |
| VISA_CREDI | Input | Discrete | 5 | | | |
| AMEX_CREDI | Input | Discrete | 4 | | | |
| MERCHANT | Input | Discrete | 10 | | | |
| PAYMENTHIS | Input | Discrete | 9 | | | |

FIG. 11

Scenario Specification

Scenario No.1: Scenario #1

| Field Name | Input/Output | Type | Nb Values | Value of Category | Occur | Min | Max |
|---|---|---|---|---|---|---|---|
| SEX | Input | Discrete | 2 | F | 118 | | |
| | | | | M | 289 | | |
| MARITALSTA | Input | Discrete | 3 | M | 304 | | |
| | | | | S | 66 | | |
| | | | | W | 37 | | |
| CHILDREN | Input | Discrete | 4 | 0 | 11 | | |
| | | | | 1 | 194 | | |
| | | | | 2 | 148 | | |
| | | | | 3 | 11 | | |
| OCCUPATION | Input | Discrete | 5 | Manager | 49 | | |
| | | | | Principal | 93 | | |
| | | | | Professional | 100 | | |
| | | | | Skilled | 32 | | |
| | | | | Unskilled | 9 | | |
| HOME | Input | Discrete | 2 | Own | 321 | | |
| | | | | Rent | 96 | | |
| EXPENSES | Input | Continuous | 5 | 1 | 197 | 506 | 1113 |
| | | | | 2 | 88 | 1113 | 1720 |
| | | | | 3 | 68 | 1720 | 2327 |
| | | | | 4 | 37 | 2327 | 2934 |
| | | | | 5 | 17 | 2934 | 3541 |
| INCOME | Input | Continuous | 5 | 1 | 171 | 2004 | 3398.2 |
| | | | | 2 | 60 | 3398.2 | 4792.4 |
| | | | | 3 | 44 | 4792.4 | 6186.6 |
| | | | | 4 | 92 | 6186.6 | 7590.8 |
| | | | | 5 | 40 | 7590.8 | 8375 |
| CHECKING | Input | Discrete | 2 | N | 365 | | |
| | | | | Y | 42 | | |
| SAVINGS | Input | Discrete | 2 | N | 18 | | |
| | | | | Y | 389 | | |
| MASTERCARD_C | Input | Discrete | 7 | extremely high | 1 | | |
| | | | | extremely low | 248 | | |
| | | | | high | 5 | | |
| | | | | low | 46 | | |
| | | | | middle level | 9 | | |
| | | | | very high | 1 | | |

Chart EXPENSES / Population / Discovery Results / Drawing Actions

Relationship Discovery Report

| N° | Input criteria | Condition | Freq | Importance | Output | |
|---|---|---|---|---|---|---|
| | Scenario No.1: Scenario #1 | | | | | |
| 9 | OCCUPATION Principal | | 37.65 | 100 | ACCOUNT | Balanced |
| 10 | MERCHANT level 8 | | 12.96 | 100 | ACCOUNT | Balanced |
| 11 | MERCHANT level 7 | | 8.91 | 100 | ACCOUNT | Balanced |
| 53 | CHECKING N | MINIMAL | 100 | 36 | ACCOUNT | Overdraft |
| 54 | PAYMENTHIS 1 | | 44.83 | 93 | ACCOUNT | Overdraft |
| 55 | PAYMENTHIS 0 | | 9.2 | 93 | ACCOUNT | Overdraft |
| 88 | PAYMENTHIS 5 | | 15.07 | 92 | ACCOUNT VISA | late payment |
| 89 | PAYMENTHIS 3 | | 54.79 | 91 | ACCOUNT VISA | late payment |
| 90 | PAYMENTHIS 4 | | 28.77 | 88 | ACCOUNT VISA | late payment |
| 91 | MARITALSTA S | | 49.32 | 73 | ACCOUNT VISA | late payment |
| 92 | HOME Rent | | 49.32 | 73 | ACCOUNT VISA | late payment |
| 93 | INCOME 4 5 | | 49.32 | 73 | ACCOUNT VISA | late payment |
| 94 | VISA_CREDI very low | | 5.48 | 60 | ACCOUNT VISA | late payment |
| 95 | SAVINGS N | | 9.59 | 59 | ACCOUNT VISA | late payment |
| 96 | MERCHANT level 0 | | 36.99 | 54 | ACCOUNT VISA | late payment |
| 97 | MARITALSTA W | | 16.44 | 52 | ACCOUNT VISA | late payment |
| 98 | EXPENSES 15 | | 80.82 | 49 | ACCOUNT VISA | late payment |
| 99 | AMEX_CREDI level 0 | | 82.19 | 45 | ACCOUNT VISA | late payment |
| 100 | CHILDREN 1 | | 71.23 | 45 | ACCOUNT VISA | late payment |
| 101 | VISA_CREDI middle level | | 23.29 | 43 | ACCOUNT VISA | late payment |
| 102 | VISA_CREDI low | | 28.77 | 42 | ACCOUNT VISA | late payment |
| 103 | MSTRCARD_C extremely low | | 79.45 | 41 | ACCOUNT VISA | late payment |
| 104 | OCCUPATION Professional | | 30.14 | 39 | ACCOUNT VISA | late payment |
| 105 | MERCHANT level 9 | | 58.9 | 37 | ACCOUNT VISA | late payment |
| 106 | CHECKING N | | 94.52 | 34 | ACCOUNT VISA | late payment |

Evaluation Report

Scenario #1 : Scenario #1

| Output | Success | | Failure | | Relative undeterm. | | Number | % | Number of examples |
|---|---|---|---|---|---|---|---|---|---|
| | Number | % | Number | % | Number | % | | | |
| ACCOUNT Balanced | 201 | 81.38 | 46 | 18.62 | 0 | 0 | 0 | 0 | 247 |
| ACCOUNT Overdraft | 85 | 97.7 | 2 | 2.3 | 0 | 0 | 0 | 0 | 87 |
| ACCOUNT VISA Late Payment | 68 | 93.15 | 5 | 6.85 | 0 | 0 | 0 | 0 | 73 |
| ACCOUNT | 354 | 86.98 | 53 | 13.02 | 0 | 0 | 0 | 0 | 407 |

Top N profile Scenario No. 1

| | ACCOUNT | LINE | SEX | MAR | CH | OCCUPATION | HOME | EXPEN | INC | CH | SA | MASTERCARD | VISA CREDIT | AMEX | MERC | PAYMENT/HIS | EX/Level | Discrim |
|---|---|---|---|---|---|---|---|---|---|---|---|---|---|---|---|---|---|---|
| 7 | | | | | | | | | | | | | | | | | | |
| 8 | | | | | | | | | | | | | | | | | | |
| 9 | Balanced | 322 | F | M | 2 | Principal | Own | 2373 | 6781 | Y | Y | middle level | middle level | level 3 | level 5 | | 805 | 77 |
| 10 | Balanced | 280 | M | M | 2 | Principal | Own | 1735 | 5784 | Y | Y | very high | very high | level 3 | level 3 | | 801 | 75 |
| 11 | Balanced | 255 | M | M | 2 | Principal | Own | 3046 | 7616 | N | Y | very high | very high | level 2 | level 4 | | 782 | 68 |
| 59 | Overdraft | 201 | F | W | 1 | Skilled | Rent | 737 | 2733 | N | Y | extremely low | low | level 0 | level 0 | 2 | 653 | 25 |
| 60 | Overdraft | 174 | M | W | 1 | Professional | Own | 852 | 2436 | N | Y | extremely low | high | level 0 | level 0 | 1 | 635 | 29 |
| 61 | Overdraft | 161 | F | M | 1 | Skilled | Rent | 965 | 2758 | N | Y | extremely low | very high | level 0 | level 0 | 1 | 630 | 31 |
| 109 | VISA Late Payment | 184 | M | W | 1 | Professional | Own | 723 | 2068 | N | Y | extremely low | middle level | level 0 | level 0 | 3 | 621 | 15 |
| 110 | VISA Late Payment | 203 | M | M | 1 | Skilled | Own | 703 | 2812 | N | Y | extremely low | very low | level 0 | level 0 | 5 | 594 | 14 |
| 111 | VISA Late Payment | 187 | M | M | 1 | Unskilled | Own | 844 | 2414 | N | Y | extremely low | middle level | level 0 | level 0 | 4 | 592 | 9 |
| 112 | VISA Late Payment | 199 | M | W | 1 | Professional | Own | 614 | 2276 | N | Y | extremely low | low | level 0 | level 0 | 3 | 585 | 15 |
| 113 | VISA Late Payment | 102 | M | M | 1 | Professional | Own | 990 | 2475 | N | Y | extremely low | very high | level 0 | level 9 | 5 | 584 | 14 |
| 114 | VISA Late Payment | 27 | M | S | 1 | Professional | Rent | 1041 | 6859 | N | Y | extremely low | low | level 0 | level 9 | 3 | 567 | 23 |
| 115 | VISA Late Payment | 87 | M | W | 1 | Professional | Own | 569 | 2276 | N | Y | extremely low | low | level 0 | level 9 | 3 | 567 | 16 |
| 116 | VISA Late Payment | 32 | F | S | 1 | Manager | Own | 965 | 2759 | N | Y | extremely low | very high | level 0 | level 9 | 5 | 566 | 12 |
| 117 | VISA Late Payment | 107 | F | W | 1 | Professional | Own | 643 | 2145 | N | Y | extremely low | very high | level 0 | level 9 | 4 | 565 | 10 |
| 118 | VISA Late Payment | 11 | M | M | 1 | Professional | Own | 1058 | 2529 | N | Y | extremely low | high | level 0 | level 0 | 3 | 564 | 9 |
| 119 | VISA Late Payment | 14 | M | S | 1 | Manager | Rent | 957 | 6190 | N | Y | extremely low | middle level | level 0 | level 9 | 6 | 564 | 26 |
| 120 | VISA Late Payment | 159 | M | M | 1 | Professional | Own | 859 | 2457 | N | Y | extremely low | very high | level 0 | level 0 | 5 | 562 | 12 |
| 121 | VISA Late Payment | 175 | M | M | 1 | Professional | Rent | 989 | 6474 | N | Y | extremely low | high | level 0 | level 9 | 4 | 557 | 16 |
| 122 | VISA Late Payment | 173 | M | M | 1 | Professional | Rent | 1015 | 6902 | N | Y | extremely low | high | level 0 | level 0 | 4 | 557 | 16 |
| 123 | VISA Late Payment | 64 | M | M | 1 | Manager | Own | 938 | 3127 | N | Y | extremely low | middle level | level 0 | level 9 | 3 | 556 | 18 |
| 124 | VISA Late Payment | 170 | M | M | 1 | Professional | Own | 1000 | 2502 | N | Y | extremely low | very high | level 0 | level 0 | 4 | 553 | 10 |
| 125 | VISA Late Payment | 169 | F | S | 1 | Manager | Rent | 981 | 6804 | N | Y | extremely low | very high | level 0 | level 9 | 3 | 548 | 17 |
| 126 | VISA Late Payment | 21 | F | S | 1 | Manager | Rent | 1068 | 7052 | N | Y | extremely low | low | level 0 | level 0 | 3 | 547 | 20 |
| 127 | VISA Late Payment | 185 | M | S | 1 | | Rent | 1037 | 6594 | N | Y | extremely low | middle level | level 0 | level 0 | 5 | 547 | 22 |
| 128 | VISA Late Payment | 98 | M | M | 2 | Professional | Rent | 1016 | 6766 | N | N | extremely low | very low | level 0 | level 9 | 3 | 546 | 24 |
| 129 | VISA Late Payment | 81 | M | M | 1 | Professional | Own | 701 | 2597 | N | N | extremely low | middle level | level 0 | level 9 | 3 | 544 | 16 |
| 130 | VISA Late Payment | 108 | M | M | 1 | | Own | 951 | 2378 | N | Y | extremely low | very high | level 0 | level 9 | 3 | 544 | 14 |
| 131 | VISA Late Payment | 122 | F | S | 1 | Skilled | Rent | 817 | 6366 | N | Y | extremely low | middle level | level 0 | level 9 | 1 | 541 | 17 |

FIG. 21

Scoring

Scenario No.1 : Scenario #1

| | SEX | MA | CH | OCCUPATION | HOME | EXPEN | INCOM | CH | SAV | MSTRCARD | VISA CREDIT | AMEX | | MERC | | PAY | o:ACCOUNT | toACCOUNT Score%=10 |
|---|---|---|---|---|---|---|---|---|---|---|---|---|---|---|---|---|---|---|
| 9 | F | M | 2 | Skilled | Own | 1124 | 3212 | N | Y | extremely low | very high | level | 0 | level | 9 | 2 | Overdraft | -13 |
| 10 | F | M | 1 | Professional | Own | 1100 | 3145 | N | Y | extremely low | very high | level | 0 | level | 9 | 0 | Overdraft | 25 |
| 11 | M | M | 0 | | Own | 1266 | 3165 | N | Y | extremely low | very high | level | 0 | level | 9 | 2 | Overdraft | 32 |
| 12 | M | W | 0 | | Own | 974 | 3249 | N | Y | extremely low | very high | level | 0 | level | 9 | 3 | VISA Late Payment | 4 |
| 13 | M | W | 0 | | Own | 1392 | 3979 | N | Y | extremely low | very high | level | 0 | level | 0 | 1 | Overdraft | 31 |
| 14 | F | M | 1 | Professional | Own | 1030 | 3815 | N | Y | extremely low | very high | level | 0 | level | 9 | 2 | Overdraft | 22 |
| 15 | M | M | 1 | Professional | Own | 1158 | 3310 | N | N | low | high | level | 2 | level | 3 | 2 | Overdraft | 7 |
| 16 | F | M | 2 | | Rent | 964 | 3214 | N | Y | extremely low | high | level | 2 | level | 9 | 2 | Overdraft | -7 |
| 17 | M | M | 0 | | Own | 1439 | 3598 | N | Y | extremely low | high | level | 0 | level | 9 | 2 | Overdraft | 33 |
| 18 | M | S | 1 | Manager | Rent | 1254 | 6585 | N | Y | extremely low | high | level | 0 | level | 9 | 3 | VISA Late Payment | 18 |
| 19 | F | M | 1 | Professional | Own | 1058 | 2539 | N | Y | extremely low | high | level | 0 | level | 9 | 3 | VISA Late Payment | 9 |
| 20 | M | M | 1 | Professional | Own | 1132 | 3976 | N | Y | extremely low | high | level | 0 | level | 9 | 3 | VISA Late Payment | 10 |
| 21 | M | M | 2 | Professional | Own | 912 | 3040 | N | N | low | middle level | level | 3 | level | 3 | 4 | Balanced | 16 |
| 22 | M | S | 1 | Manager | Rent | 957 | 6190 | N | Y | extremely low | middle level | level | 0 | level | 9 | 6 | VISA Late Payment | 26 |
| 23 | M | S | 2 | Professional | Rent | 1077 | 6591 | N | Y | extremely low | middle level | level | 0 | level | 9 | 5 | VISA Late Payment | 22 |
| 24 | M | M | 1 | Professional | Own | 1096 | 3134 | N | Y | extremely low | middle level | level | 0 | level | 9 | 8 | Overdraft | 2 |
| 25 | M | M | 2 | Skilled | Own | 974 | 3609 | N | N | low | low | level | 2 | level | 9 | 2 | VISA Late Payment | -13 |
| 26 | M | M | 2 | Professional | Rent | 965 | 3462 | N | Y | very low | low | level | 0 | level | 9 | 3 | VISA Late Payment | -10 |
| 27 | M | M | 1 | Professional | Own | 938 | 3476 | N | N | very low | low | level | 3 | level | 3 | 3 | Balanced | 4 |
| 28 | F | M | 1 | Skilled | Rent | 1192 | 3409 | N | N | very low | low | level | 2 | level | 3 | 2 | Overdraft | 28 |
| 29 | F | S | 1 | | Rent | 1068 | 7052 | N | N | very low | low | level | 0 | level | 0 | 3 | VISA Late Payment | 28 |
| 30 | M | M | 2 | | Own | 1262 | 2608 | N | Y | very low | low | level | 2 | level | 3 | 3 | Balanced | 16 |
| 31 | M | M | 1 | | Own | 1169 | 3341 | N | N | very low | low | level | 2 | level | 6 | 3 | VISA Late Payment | 1 |

Discovery Views / Study Improvements / Scoring / Drawing / Actions

FIG. 22

SYSTEM FOR DATA MINING USING NEUROAGENTS

I. BACKGROUND
A. Field of the Invention
B. Description of the Related Art
C. The Neuroagent as Methodology
  1. Neuroagent Structure
    a. Communication and Activation Envelope
    b. The Nominal Zone
    c. Internal Process
  2. The Neuroagent's Basic Behavior
    a. The Behavior Parameters
      (1) Excitation Threshold
      (2) Excitation Level
      (3) Modulation Coefficient
    b. The Neuroagent's State Determination
      (1) Defining the Neuroagent State
      (2) Defining the State of the Minimal Excitation Zone
      (3) Defining the State of the Contextual Excitation Zone
    c. The Inference Propagation Mechanism
  3. Construction of Neuroagent Networks

II. SUMMARY OF THE INVENTION
III. BRIEF DESCRIPTION OF THE DRAWINGS
IV. DETAILED DESCRIPTION
A. User-Apparent Features of the Disclosed Embodiment
  1. Overview of the Disclosed Embodiment
  2. The Subject
    a. Providing the Subject Information
    b. Providing the Data Source
    c. Providing Group Access
    d. Providing User Access
  3. The Study
    a. Providing the Study Information
    b. Describing the Domain
    c. Describing the Parameters
      (1) Continuous Fields
      (2) Discrete
    d. Options
  4. Immediate Use of the Study
    a. Scenario Specification
    b. Population Description
    c. Distribution
  5. Discovery Process
    a. Relationship Discovery Report
      (1) Output
      (2) Conjunctions
      (3) Frequency
      (4) Criteria
      (5) Minimal Criteria
      (6) Importance
    b. The Discovery Views
      (1) Conjunctions View
      (2) Specific/Discriminant/Irrelevant Criteria View
      (3) Decision Impact View
  6. Using the Model for Evaluation
    a. Operation of the Evaluation Process
    b. Interpreting the Evaluation
      (1) Success/Failure Number/Percentage
      (2) Indeterminacy
      (3) Hetero- versus Homogeneous Prediction Relevance
    c. Top "N" Profile View
    d. Study Improvement
      (1) Discoveries
      (2) Audit of the Model
    e. Redefining the Model
  7. Prediction
    a. Batch Prediction
      (1) Scoring Results
      (2) Mailing Results
    b. Interactive Prediction
  8. Overall Use of the Disclosed Embodiment
B. Implementation of the Disclosed Embodiment for Data Mining
  1. Meta Data Construction Process
  2. Neuroagent Network Construction
  3. Discovery
    a. Conjunctions and Minimal Conditions
    b. Importance
    c. Frequency
    d. Discrimination
    e. Specificity and Irrelevancy
  4. Evaluation Manager
    a. Failure, Success Numbers
    b. Indeterminancy
  5. Prediction Manager
  6. Specialized Discoveries
    a. Segmentation
    b. Audit Profiles
  7. Parallelism

I. BACKGROUND.
A. Field of the Invention

This invention relates to data processing. In particular, this invention relates to data mining using a unified neural multi-agent approach.

B. Description of the Related Art

Today, Data Mining has become a "hot" field for business intelligence because, until now, databases were essentially oriented to the input side and had very poor output analysis functionality. With the different mechanisms to extract information from existing data available today, this has lead to different definitions for Data Mining. However, one could offer a synthetic definition of Data Mining as a pattern discovery process from very large databases to provide models for use in decision making. A more precise definition is useful to classify the different "Data Mining" approaches.

Corporations keep accumulating huge amount of data every day, data which may represent their biggest potential assets. However, to realize this wealth, data must be transformed into usable form for the end-user. Decision Support Systems (DSS), including Executive Information Systems (EIS) and Data Access, have been developed to provide a first level of solutions to achieve these transformations.

Data Access and Presentation Tools provide a logical view of databases, generate complex SQL queries and include report writers that can generate charts or maps with "drill down" or other analysis capabilities. EIS tools, which are typically custom or semi-customized software, are heavily programmed to provide "canned" reports for top-level executives, as well as some very advanced statistical analysis functions that can be customized by MIS departments for Executive Reporting.

Today, EIS/DSS tools present two main limitations for fully transforming "data" into "knowledge": (i) users must know in advance exactly what they are searching for and how to search for it, which represents a comparatively low level of discovery; and (ii) results are "static", which means there are no unified mechanisms to provide explicitly predictive capabilities for new cases and validation processes therefore.

Although Data Mining presents an excellent market opportunity, there are two major impediments which have precluded the development of this market until now: (i) lack of quality data, which has until very recently represented a formidable bottleneck; and (ii) limited functionalities and performance of existing tools. None of the technologies used in current Data Mining products (Neural Networks, Rule Induction, Case-Based Reasoning (CBR) and statistical analysis) can provide the combination of prediction, explanation, performance and ease of use necessary for widespread usage of knowledge discovery tools.

Neural Networks constitute one of the better approaches to build predictive models from a set of examples with possibly imperfect data. However, Neural Networks present at least three major limitations: (i) the high level of expertise needed to choose a suitable architecture for the system (the number of layers, the number of neurons per layer, etc.) and to validate such system; (ii) the inability of neural nets to "explain" their results, i.e., they do not provide explicitly predictive models; and (iii) the inability to add explicit knowledge, thus forcing the system to eliminate artifacts or irrelevant relationships or to introduce a priori knowledge. Sometimes, an architecture already established for a specific problem can be used directly to build a predictive model. However, if one changes the problem or even the input data, the architecture can become inadequate. It is then unclear how to define a new architecture. From the knowledge worker's perspective, Neural Networks provide no knowledge discovery since the network provides no "understanding", i.e., the ability to comprehend the significance and reasons therefore; rather, it is a predictive system, but not an explicitly predictive system.

Rule Induction is a pattern discovery technology which does provide explicit results. The knowledge worker can thus understand the discoveries. However, this approach presents a number of limitations as well: (i) it is not adapted to handle complex data because the learning process is time-prohibitive, owing to the large number of combinations between generated rules; and (ii) when the learning is finished, the quantity of generated rules can be very large. The knowledge worker thus has tremendous difficulty to pinpoint relevant discoveries in a sea of rules. When data is imperfect, rules are not particularly well adapted and the predictive model thus not reliable.

Case-Based Reasoning is a technology based on the indexation of all the cases which are presented to the system, as for example, all the court cases on a particular legal issue. When the predictive model is established, it can perform reasoning by analogy. For each new case the system tries to find an old case which is the "closest" by some measure. There are different ways to calculate the distance between the different cases. By contrast with Neural Networks, which does not retain the full data presented to it, every case is maintained in a CBR system. The indexation techniques have no capability for generalization, and there is thus no effective synthesis for the knowledge worker. One can say, therefore, that the "richness" of discoveries is very low. It is relatively easy to build a predictive model, having merely to define the data fields like a desktop database and the system will index the different cases presented. CBR is an interesting approach for building a purely predictive model, like Neural Networks, but it is inadequate to perform knowledge discovery. And since the size of CBR models increase with the number of cases presented, it is difficult to handle very large databases owing to the memory requirements. Moreover, the processing of each new case takes, on average, more time than the previous case because all cases are kept in the system, which exacerbates the database size limitation.

Statistical methods are very well known in data analysis. They are reliable and can provide very rich information. However, the user must often be a trained statistician to choose the right methods and then to interpret the results. The user must have the time and resources to perform the computation of the entire database. Handling non-linear problems, which constitute many normal business problems, require even more advanced skills. Statistical analysis methods favor large populations and tend to discover the more important trends at the expense of the small ones. However, a company might wish to base its competitive advantage on the capability to discover individual particularities, i.e., special niche markets. Finally, statistical analysis tools do not provide an explicitly predictive model. One cannot use a statistical analysis tool to build an automatic prediction system. This lack of explicit predictive capability makes it difficult to validate data analysis results and necessitates the services of an expert statistician where rapid prediction is called for (e.g., credit acceptance).

C. The Neuroagent as Methodology

In AI, three fundamental levels can be distinguished: the knowledge level (knowledge modelling methodology), the symbol level (techniques for knowledge representation such as rules, semantic networks, and frames) and the sub-symbolic level (associative or connectionist technologies). Usually, the neuro-symbolic hybrid systems focus on the integration of the last two levels.

The neuroagent is a neural multi-agent approach based on macro-connectionism and comprises a double integration. The first integration concerns the association and symbol levels, where a neuro-symbolic fully-integrated processing unit provides learning capabilities and distributed inference mechanisms. The second integration concerns the symbol and knowledge levels, using a concept operational modelling (COM) methodology. COM permits the building of generic knowledge models which ensures coherent maintenance of all knowledge models based thereupon.

Knowledge acquisition is often considered to be a bottleneck for the development of expert systems, but two different cases must be distinguished where: (1) the expertise is complex and a modelling phase is necessary to define the conceptual model of the expertise (knowledge level); and (2) the expertise cannot be formalized and learning capabilities are therefore necessary. A prior art graphical knowledge-based system shell called intelliSphere™, marketed in the U.S. by DataMind, Inc., Redwood City, Calif., is based on the neuroagent approach, and has allowed the development of solutions to different industrial problems (e.g., image processing, design by optimization and constraints satisfaction, and medical diagnosis) where classical approaches have presented significant limits for modelling or learning.

Usually, the basic functional unit in an artificial neural network corresponds to a single formal neuron. FIG. 1, described below, shows how the structure of the neuroagent is related to the neurobiological macro-connectionist level, i.e., the basic unit at this level is an assembly or network of neurons, not a single neuron.

From the computer science point of view, the common characteristics between the connectionist and the macro-connectionist levels are: (i) an automata network; (ii) each automaton has a transition function and a memory; (iii) a communication medium based on the numeric propagation; (iv) numeric learning capabilities; (v) associative memory properties; and (vi) the triggering of the automaton's behavior based on the numeric stimulation that the automaton has received.

In comparison to the connectionist level, the macro-connectionist level differs in the following respects: (i) the automaton can be complex; (ii) the automaton is functionally autonomous; (iii) the propagation mechanism is more complex; and (iv) the topology of the network presents a semantic organization.

These latter characteristics are implemented in the neuroagent approach. The neuroagent is both an analysis and modelling entity for the knowledge level and an implemented neuro-symbolic processing unit for the development of knowledge-based systems.

1. Neuroagent Structure.

FIG. 1 shows the structure of a neuroagent 100 which consists of three main elements: (i) the Communication and Activation Envelope 110 which ensures a standard communication between neuroagents, and which controls the neuroagent's state; (ii) the Nominal Zone 120 which describes the neuroagent (e.g., name, synonyms); and (iii) the Internal Process 130 which determines the neuroagent's functional specifications.

a. Communication and Activation Envelope.

The Communication and Activation Envelope 110 contains: (i) the Minimal Excitation Zone 112; and (ii) the Contextual Excitation Zone 114. These excitation zones 112, 114 are areas which will receive the connections 130 from other neuroagents. It is clear that the Activation and Communication Envelope 110 can have the following configurations depending on the connections of its excitation zones 112 and 144: (i) no connection on either of the excitation zones 112 and 144; (ii) connections only on the Minimal Excitation Zone 112; (iii) connections only on the Contextual Excitation Zone 114; and (iv) connections on both the Minimal 112 and the Contextual 144 Excitation Zones.

A neuroexpression is a logic expression of neuroagents. In the embodiment described here, only logical AND's ("&") and NOT's ("!") are permitted as logical connectors within a neuroexpression; OR's ("|") have been dispensed with because their logical function can be satisfied simply by having other neuroexpressions connected in parallel. An "atomic" neuroexpression is one that corresponds to a single neuroagent. With reference now to FIG. 2, one can see in neuroagent network 200 the connections established between neuroexpressions $E_1$ 230, $E_2$ 240, $E_3$ 250 and a given output neuroagent Z 210. In this example, the neuroexpressions $E_1$ 230, $E_2$ 240, $E_3$ 250 consist of two neuroagents each, B 232 and C 234, F 242 and D 244, B 232 and A 220, respectively. One can observe all the neuroexpressions $E_1$ 230, $E_2$ 240, $E_3$ 250 are connected (through 255) to neuroagent Z's 210 Contextual Excitation Zone Z 210b, while neuroagent A 220 is connected (through 225) to it's Minimal Excitation Zone 210a. Note that there is nothing which prohibits neuroagents B 232 and A 220 being represented more than once in neuroagent network 200. An output neuroagent may even form part of the input to itself.

Referring once more to FIG. 1, the Minimal Excitation Zone 112 of neuroagent 100 is the zone where all connections present must be validated, i.e., they are necessary conditions. However, having a necessary condition does not mean it is sufficient; rather, it is a minimal condition. For example, the concept "WHEEL" is absolutely necessary for the validation of the concept "CAR", but it is not sufficient. However, it is possible to express a minimal and sufficient condition. Recall that in FIG. 2 neuroagent A 220 is connected to both the Minimal 210a and Contextual 210b Excitation Zones.

The Contextual Excitation Zone 114 of neuroagent 100 is the zone where one defines what "evokes" and what "rejects" the neuroagent 100, or equivalently, what validates or inhibits the neuroagent. Using connection weights, as for example here, $w_{ij}$ 132, $w_{ik}$ 134, $w_{im}$ 136, it is possible to grade evocations and rejections. The evocation is a positive real number that can express a relatively weak (i.e., 20–40), or strong evocation (i.e., 80–100). The rejection is a negative real number that can express a relatively weak (i.e., (–40) –(–20)) or strong rejection (i.e., (–100)–(–80). The connection weights, $w_{ij}$ 132, $w_{ik}$ 134, $w_{im}$ 136, are, by convention, expressed as percentages.

There are two ways to establish the connection weights: (i) explicitly (e.g., with a fixed number of broad evocation levels: very weakly positive 20, weakly positive 40, positive 60, strongly positive 80, very strongly positive 100; similarly, for rejection: very weakly negative –20, weakly negative –40, negative –60, strongly negative –80, very strongly negative –100); or (ii) by learning from examples.

Contrary to ordinary Neural Networks, the connection weights can be dynamically modulated according to the current context, during the propagation process. This can be accomplished by modulating a connection weight by means of the Modulation Coefficient or by the Stimulation Function, discussed below.

The introduction of Modulation Coeffients and Stimulation Functions means that the defined connection weight, the effective connection weight and the stimulation weight may thus be all different. This notion of Modulation Coefficient is important because, as shall be seen, it allows external numerical functions to be directly integrated inside the system. The Modulation Coefficient may be a numerical function (fuzzy function, statistical function, or any numerical function). By default, the stimulation function is linear, but can be sigmoidal, for example. A sigmoidal choice, for example, tends to force evocation or rejection results.

b. The Nominal Zone.

The Nominal Zone 120 contains the neuroagent's 100: (i) label, the neuroagent's main identification used to designate it; and (ii) synonyms, used to assign other names to a neuroagent.

c. Internal Process.

There are two types of actions that can be taken by the Internal Process 310 of a neuroagent 300, as shown in FIG. 3: Cognitive actions 330, 340 and Productive actions 320.

Cognitive actions 330, 340 have a direct effect on the inference strategies. For example, a function 330 can be used to validate, inhibit or activate other neuroagents as well as to dynamically modulate the connection weights or functions used to express fuzzy predicates. Also, an Internal Process 310 can be used to embed a network of neuroagents 340 within a neuroagent 300.

Productive actions 320 are programmed functions (in "C" for example) which correspond to external processing (e.g., operate a video camera, execute an SQL request, make a library function call) or even the encapsulation of another entire neuroagent-based application.

It should be noted that a neuroagent lacking an Internal Process is not simply a neuron in the ordinary Neural Networks sense. For example, the neuroagent has a Minimal Excitation Zone, and such neuroagents can be built up into a neuroexpression with other neuroagents.

2. The Neuroagent's Basic Behavior.

A neuroagent's basic behavior is determined by the behavior parameters, the neuroagent's state and the inference propagation mechanisms.

a. The Behavior Parameters.

The neuroagent's inferential behavior is conditioned through various behavior parameters, among them: (i) the Excitation Threshold; (ii) the Excitation Level; and (iii) the Modulation Coefficient.

These behavior parameters shall be explained, in part, with reference to FIG. 4, where a neuroagent j 420 is acted upon by neuroexpressions, such as $E_i$ 430 and $E_r$ 440 (consisting of neuroagents k1 432, k2 434 and r 442, respectively) through the Contextual Excitation Zone 424, and by neuroagent (equivalently, atomic neuroexpression) 410 through the Minimal Excitation Zone 422.

(1) Excitation Threshold.

The Excitation Threshold, $et_j$, sets the validation threshold for the Contextual Excitation Zone 424. The default setting for the Excitation Threshold parameter is 100%. In other words, if the sum of all stimulations exceed 100%, the Contextual Excitation Zone 424 is considered validated.

(2) Excitation Level.

The Excitation Level allows the determination of the state of the Contextual Excitation Zone 424. In the embodiment discussed here, the Excitation Level $el_j$ of neuroagent j 420 is established as:

$$el_j = \sum_{i=1}^{n} f(S_{Ei,j}) eval\_exp(E_i) \qquad \text{(Eq. 1)}$$

where f is a "stimulation" function. This function is linear by default, but clearly it is possible to choose other functions, a double sigmoidal function for example. The expression $S_{Eij}$ 438 (438') is the stimulation of neuroexpression $E_i$ 430 with respect to neuroagent j 420, and eval_exp($E_i$) is the logic evaluation function for the neuroexpression $E_i$ 430. Thus, in this example, eval_exp($E_i$) is true if and only if component neuroagents k1 432 and k2 434 are true, i.e., that they are both validated. Similarly, eval_exp($E_r$) is true identically with neuroagent r 442 being validated. The default setting for the Excitation Level parameter is 0%.

(3) Modulation Coefficient.

The Modulation Coefficient is used to dynamically modulate the neuroagent's 420 connection weights. Indeed, the connection weight $W_{Eij}$ 436 is a fixed value determined by a training expert or by learning from examples. But, neuroagent j 420 will receive a stimulation $S_{Eij}$ 438 (438') from neuroexpression $E_i$ 430, if the latter is validated, rather than the connection weight $W_{Eij}$ 436. An exemplary formula for calculating the stimulation $S_{Eij}$ 438 (438') would be:

$$S_{Eij} W_{Eij} \times mc_{E_i} \qquad \text{(Eq. 2)}$$

with $mc_{Ei}$ the Modulation Coefficient of the neuroexpression $E_i$ 430. The Modulation Coefficients of individual neuroagents may be established by numerical functions, based on fuzzy predicates or statistics, for example. Furthermore, one can propose various ways of compounding the Modulation Coefficient of a neuroexpression based on the Modulation Coefficients of the component neuroagents (e.g., average). In this embodiment, however, the compounded Modulation Coefficient $mc_{Ei}$ is taken to be:

$$mc_{E_i} = \min_{h \in E_i}(mc_h) \qquad \text{(Eq. 3)}$$

where $\{mc_h\}$ are the Modulation Coefficients of all neuroagents h (say 432 or 434) which belong to the neuroexpression $E_i$ 430. In this context, each of the modulation coefficients $mc$, are evaluated with respect to the reference data point. The default setting for the Modulation Coefficient parameter is 100%.

(a) Fuzzy Predicates.

Owing to the Modulation Coefficient, neuroagents can be used to implement some features of fuzzy associative memories, which can be illustrated with FIGS. 5(a)–(d) in the context of a traffic problem. With reference to FIG. 5(a), the fuzzy membership set 900 for traffic density is shown, consisting of light traffic distribution 902, medium distribution 904 and heavy distribution 906. From the fuzzy membership defined by set 900, one can take the fuzzy primitive "is_from", $mc_h$ 922, shown in FIG. 5(c) which represents the heavy traffic distribution. Similarly, one could have chosen a fuzzy primitive "is_between", $mc_p$ 912, shown in FIG. 5(b) taken from another fuzzy membership set (not shown) related to the peak traffic period. With these fuzzy primitives 912, 922, one can apply them to the example network 950 shown in FIG. 5(d) with the aim of predicting when to deviate from one's normal path to avoid traffic. The network 950 is composed of neuroexpressions $E_i$ 960 and $E_i$ 970 connected to output neuroagent "Deviations" j 980. Neuroexpression $E_i$ 960 is composed of the neuroagents "Peak Period" 962 and "Heavy Traffic" 964, while atomic neuroexpression $E_r$ 970 is composed simply of neuroagent "Road Works" 972. Thus, applying fuzzy primitives $mc_p$ 912 and $mc_h$ 922, one can arrive at the "compound" modulation coefficient, $mc_{Ei}$ 990, as, for example, from (Eq. 3). Thus, the closer the hour is to peak period, i.e., between the hours of 6 to 8 oclock, as well as the higher the traffic density is with respect to 200 cars, the more likely that neuroexpression $E_i$ 960 will validate "Deviations" j 980. Of course, the presence of road works will also validate "Deviations" j 980 in the conventional manner. Thus, fuzzy predicates can be freely mixed with deterministic predicates.

b. The Neuroagent's State Determination.

At any given time, each neuroagent is characterized by its state which is established as the result of all the stimulation it receives on its Activation and Communication Envelope.

(1) Defining the Neuroagent State.

Three states are possible for a neuroagent: (i) undetermined; (ii) validated; or (iii) inhibited. Table I summarizes all of the neuroagent's states.

TABLE I

| Neuroagent States | | |
|---|---|---|
| Minimal Excitation Zone | Contextual Excitation Zone | Neuroagent General State |
| Validated | No connection | Validated |
| No connection | Validated | Validated |
| Validated | Validated | Validated |
| Inhibited | No connection | Inhibited |
| No connection | Inhibited | Inhibited |
| Inhibited | Any | Inhibited |
| Any | Inhibited | Inhibited |
| Undetermined | No connection | Undetermined |
| No connection | Undetermined | Undetermined |
| Undetermined | Undetermined | Undetermined |
| Undetermined | Validated | Undetermined |
| Validated | Undetermined | Undetermined |

The default state for a neuroagent is undetermined.

(2) Defining the State of the Minimal Excitation Zone.

Again, with reference to FIG. 4, the Minimal Excitation Zone 422 is validated when the neuroexpressions (here, neuroagent 410) connected to this zone, i.e., the logic conditions described with neuroagents, are validated. This zone 422 is inhibited otherwise. By convention, if there are no connections on the Minimal Excitation Zone 422 then it is considered to be validated. The evaluation of the Minimal Excitation Zone 422 of the neuroagent j 420, $mez_j$, is thus formulated as follows:

with nb_mez$_j$ the number of connections on the Minimal Excitation Zone 422 of the neuroagent j 420, eval_mez (j) the logic evaluation function of the neuroexpressions $$mez_j = \begin{cases} 1; & \text{if } nb\_mez_j > 0 \text{ and } eval\_mez(j) \\ 1; & \text{if } nb\_mez_j = 0 \\ 0; & \text{otherwise} \end{cases} \quad \text{(Eq. 4)}$$

410 connected on the Minimal Excitation Zone 422 of neuroagent j 420.

(3) Defining the State of the Contextual Excitation Zone.

The Contextual Excitation Zone 424 is validated when the sum of positive and negative stimulations 438 (438') meets or exceeds the neuroagent's Excitation Threshold. Similarly, the Contextual Excitation Zone 424 is inhibited when the sum of the positive and negative stimulations 438 (438') is less than or equal to the negative value of the Excitation Threshold. Between these two limits, the Contextual Excitation Zone 424 is indeterminate. As the default value of the Excitation Threshold 424 is equal to 100%, this means that the Contextual Excitation Zone 424 inhibited when the sum of the positive and negative stimulation 438 (438') is less than or equal to −100%.

By convention, if there are no connections on the Contextual Excitation Zone 424 then it is considered as validated. The evaluation of the Contextual Excitation Zone 424 of the neuroagent j, cez$_j$ is thus formulated as $$cez_j = \begin{cases} 1; & \text{if } nb\_cez_j > 0 \text{ and } el_j \geq et_j \\ 1; & \text{if } nb\_cez_j = 0 \\ 0; & \text{otherwise} \end{cases} \quad \text{(Eq. 5)}$$

with nb_cez$_j$ the number of connections on the Contextual Excitation Zone 424, el$_j$ the Excitation Level of the neuroagent j 420, and et$_j$ the Excitation Threshold of the neuroagent j 420. The Excitation Level, el$_j$, would be given by (Eq. 1).

c. The Inference Propagation Mechanism.

The propagation mechanisms incorporated into various embodiments of neuroagents include: (i) forward propagation; (ii) backward propagation; (iii) spontaneous backward propagation; and (iv) "retropropagation of necessities."All these propagation mechanisms are asynchronous, meaning that the update of neuroagents are event-driven.

FIGS. 6(*a*)–(*c*) show the different inference propagation mechanisms within the same system. In FIG. 6(*a*), forward propagation, the usual mode of propagation, is shown. Neuroagent 600 is connected to neuroagent 610 via the latter's Minimal Excitation Zone 614 or Contextual Excitation Zone 612 (connections 604 or 602, respectively). Thus, when neuroagent 600 is validated, this state is propagated, as signals 608 or 606, as the case may be, to neuroagent 610. Thus, if the minimal conditions on neuroagent 610 are satisfied and/or the excitation threshold reached, neuroagent 610 itself may be validated and the propagation may continue further.

FIG. 6(*b*) shows backward propagation. Notice that the connections are analogous to FIG. 6(*a*), with neuroagent 620 connected to neuroagent 630 via the latter's Minimal Excitation Zone 634 or Contextual Excitation Zone 632 (connections 624 or 622, respectively). Backward propagation may be performed as a result of an explicit selection to backward propagate, or may occur spontaneously, through the mechanism of Hypothesis. The Hypothesis mechanism triggers backward propagation where neuroagent validation is almost present, as for example: (i) the Minimal Excitation Zone 634 is validated and the Contextual Excitation Zone 632, is near but below its excitation threshold, say in the range of 80–100%; or (ii) Contextual Excitation Zone 632 is validated but the Minimal Excitation Zone 634 is indeterminate. Thus, depending on the mechanism, neuroagent 630 will backward propagate, as either signals 636 or 638 (under Hypothesis, owing to the spontaneous generation by the Contextual 632 or Minimal 634 Excitation Zones, respectively), to neuroagent 620. Thus, neuroagent 620, based on this backward propagation, will find itself either validated, inhibited or indeterminate. The indeterminate state may cause further spontaneous backward propagation, or the process will stop if neuroagent 620 is not configured to go into Hypothesis.

Retropropagation of the necessities involves only the Minimal Excitation Zone, and is a means to verify implicit deductions, as shown in FIG. 6(*c*). Here, neuroagent 650 is connected to neuroagent 640 through the latter's Minimal Excitation Zone (connection 652). Neuroagent 650 may be connected to other neuroagents (not shown) through connection 654. Thus, if neuroagent 640 is validated (signal 642) retropropagation will occur (signal 644), thereby validating neuroagent 650, which will forward propagate itself (signal 656) as will neuroagent 640 (via connection 646). The implicit deductions are thus verified in the sense that the network connection topology supplies the information. Say that neuroagent 640 represents "CAR" and neuroagent 650 "WHEELS". Thus, this connection of neuroagents 640, 650 would supply the deduction that "CARS" implies "WHEELS".

3. Construction of Neuroagent Networks.

With the neuroagent approach, it is possible to design a knowledge base through either explicit modelling, learning, or both. This versatility enhances the quality of the knowledge bases, since in many cases neither explicit modelling nor learning from examples are sufficient of themselves.

The learning process is conducted with two objectives: (i) to automatically establish the connection weights as in usual connectionist models; and (ii) to automatically establish the topology of the network. Due to the neuroagent's connectionist architecture, the system will not be a "black box" at the end of the learning; rather, it will be able to reach semantic conclusions, i.e., make explicit predictions as to: minimal conditions for the validation of outputs, the simultaneous presence of certain inputs, and the specificity of certain inputs, etc.

Say one had a medical database to study in order to design a knowledge base of pathologies diagnosed in various patients. At the end of the learning process, one would obtain the connection weights established by the system, but also: (i) which symptoms are minimal (necessarily present) in order to diagnose a given pathology; (ii) which symptoms are always found together; and (iii) which symptoms are specific to a given pathology.

The neuroagent architecture has the following characteristics: (i) the topology of the neuroagent network is built during the learning period; (ii) the input parameters can be qualitative and/or quantitative; (iii) input parameters can be missing; (iv) the neuroexpressions are built during the learning period; (v) learning can be mixed directly with explicit knowledge; (vi) the order in which the examples are presented has no importance; and (vii) the order of the input data included in the examples has no importance.

The learning algorithm used with neuroagents is similar to that used with Probabilistic Neural Networks (PNN).

However, it presents a number of differences, such as the advent of neuroexpressions, excitation zones, and the topology building associated therewith. FIGS. 7(a)–(b) shows how the topology of a neuroagent is built up during learning. Consider, in FIG. 7(a), how input neuroagents S1 710, S2 720, S3 730 are interconnected via 712, 722, 732, respectively, to output neuroagent P1 700 in view of training data 701. With only one set of training data 701, consisting of input S1 710, S2 720, S3 730 and output P1 700, the strongest assumption compatible with such data is to form a neuroexpression 705 comprised of neuroagents S1 710, S2 720 and S3 730, and connected via 706 to the Minimal Excitation Zone 702 of output neuroagent 700. In other words, without other information, the inputs all are assumed to occur together and be a minimal condition. There are thus no connections to the Contextual Excitation Zone 704 at this stage.

With a second set of training data, this situation changes, as shown in FIG. 7(b). Training data 701', consisting of inputs S1 710', S2 720', S4 740', S5 750' for output P1 700', causes a revision of the prior assumptions. The neuroexpression 705 must be broken down into the smaller neuroexpression 705', consisting of neuroagents S1 710' and S2 720', and the lone neuroagent 730' because the latter was not present in training data 701'. A new neuroexpression 707' is created and composed of neuroagents S4 740' and S5 750', because there is nothing yet to break the assumption that these neuroagents occur together. As S3 730' can no longer be assumed as "minimal", the connection 703' to output neuroagent P1 700' is made through the Contextual Excitation Zone 704'. Similarly, neuroexpression 707' was not "minimal" in the first instance, so it too, is connected via 705' to Contextual Excitation Zone 704'. The connection 706' of residual neuroexpression 705' to the Minimal Excitation Zone 702' remains. It is clear that this process could be repeated with still more training data.

During the learning period, the parameters which are necessary for the calculation of the connection weights are established. With $N(E_1|O_j)$ being the number of examples where the neuroexpression $E_i$ was present when the output was $O_j$, $N(E_i)$ the total number of examples where neuroexpression $E_i$ was present, $N(n_k)$ the number of examples where the neuroagent $n_k$ was present, $N(O_j)$ the number of examples where the output was $O_j$, N the total number of examples which were presented during the learning period, and Nb_Class the number of output classes which were presented during the learning period, one can discuss the construction of the connection weights. The evaluation of the connection weight, or impact, w, of $E_i$ on the various outputs $O_j$ is based on a comparative process. In the embodiment discussed here, the connection weight $w(E_i,O_j)$ is defined as $P(O_j|E_i)$, the probability that output neuroagent $O_j$ is validated (i.e., the corresponding outcome is present) when neuroexpression $E_i$ is true. Notice that $P(O_j|E_i)$ can be expressed in terms of the converse probabilities, $P(E_i|O_k)$, namely, the probabilities that $E_i$ is true when any of the output neuroagents $\{O_k\}$ are validated, in this manner:

$$P(O_j | E_i) = \frac{P(E_i | O_j)}{\sum_k P(E_i | O_k)} \quad \text{(Eq. 6)}$$

A simplifying approximation, in that one is concerned here only with neuroexpression $E_i$ and output $O_j$, is that all other probabilities other than $P(E_i|O_j)$, representing the other (Nb_Class-1) output classes, are equal and denoted by the expression $P(E_i|\overline{O_j})$. Under this approximation:

$$P(O_j | E_i) \approx \frac{P(E_i | O_j)}{P(E_i | O_j) + P(E_i | \overline{O_j})(Nb\_Class - 1)} \quad \text{(Eq. 7)}$$

where $P(E_i|\overline{O_j})$ can be expressed in this manner:

$$P(E_i | \overline{O_j}) = \frac{N(E_i) - N(E_i | O_j)}{N - N(O_j)} \quad \text{(Eq. 8)}$$

Recalling that $N(E_i)$ is the total number of occurrences of neuroexpression Ei, this number certainly cannot be greater than the occurrence of any of its composite neuroagents, $N(n_k)$, and so offers the familiar approximation:

$$N(E_i) \approx \min_{n_k \in E_i} N(n_k) \quad \text{(Eq. 9)}$$

Finally, $P(E_i|O_j)$ itself can be expressed readily as:

$$P(E_i | O_j) = \frac{N(E_i | O_j)}{N(O_j)} \quad \text{(Eq. 10)}$$

Thus, back substitution of (Eq. 8), (Eq. 9) and (Eq. 10) into (Eq. 7) would yield an approximation to $P(O_j|E_i)$ as:

$$w(E_i, O_j) \approx \left[ 1 + (Nb\_Class - 1) \times \frac{N(O_j)}{N(E_i | O_j)} \times \frac{\min_{n_k \in E_i} N(n_k) - N(E_i | O_j)}{N - N(O_j)} \right]^{-1} \quad \text{(Eq. 11)}$$

However, to avoid taking irrelevant information into account, a Significant Threshold, ST, may be introduced as follows:

$$ST = \max\left(\frac{100}{Nb\_Class} + SD, PT\right) \quad \text{(Eq. 12)}$$

where SD (for standard deviation) and PT (parasite threshold) are arbitrary constants though preferably small. Thus, the final value for the connection weight is calculated as follows:

$$w(E_i, O_j) = \begin{cases} 0; & \text{if } P(O_j | E_i) \leq ST \\ P(O_j | E_i); & \text{otherwise} \end{cases} \quad \text{(Eq. 13)}$$

The basic neuroagent technology, and the prior art IntelliSphere™ product which embodied it, presents a formidable learning curve owing to its novel methodology. What is needed, therefore, is an application which can both hide the underlying mechanisms of the neuroagent methodology from the casual user, yet at the same time, unleash the strengths of this technology.

II. SUMMARY OF THE INVENTION.

Data Mining is an automatic pattern discovery process from complex databases to provide knowledge models for use in decision making. What is needed is a tool, in the hands of knowledge workers, that can provide the best results because knowledge workers are in the center of the decision making process. A non-Data Analysis specialist must be able to use directly and completely a Data Mining tool.

An automatic pattern discovery process is needed. Pattern discovery is the capability to establish relationships between different pieces of information (features) to define a pattern which in turn represents a context capable of identifying a situation or defining it. The adjective "automatic" excludes the classic analysis tools (fast data access tools, DSS, EIS, OLAP, etc.) for the development of "intelligent" Data Mining systems, as shall be discussed below, because with those tools one must know in advance exactly what one must search. These tools thus act as a "verification" mode. This constitutes the main limitation of these kind of tools in exploring complex data sets.

Two types of pattern discovery processes must be distinguished: (i) signal pattern discovery; and (ii) knowledge pattern discovery. A signal pattern discovery process is typically used to build a signal recognition system, such as a character recognition system (OCR). In this case, the discovery process is up to the system itself in providing pattern recognition capabilities. The user is not interested in understanding how the system works, rather only the quality and the speed of the recognition process. A knowledge pattern discovery process, or simply, knowledge discovery process, provides the understanding of the discovery process, i.e., what do the relationships established by the system look like. In knowledge discovery, both the quality of the recognition and the understanding of this recognition are important. For the decision makers, a really useful discovery involves the understanding of something new. To be understandable, the results of a discovery process must be explicit. The knowledge discovery process provides the highest value information from data.

The present invention provides new capabilities for knowledge workers with some "intelligence" inside to help them to explore complex data sets. This intelligence is provided by a discovery and inference engine. Intelligent Data Mining can be defined as follows: an automatic pattern discovery process from complex databases to provide explicitly predictive knowledge models for use in decision making.

Data mining tools extend normal thinking logic by analyzing complex data automatically in order to build a Knowledge Model useful for both understanding and prediction. The present invention surpasses other Data Mining tools. None of the other technologies used in current products (Neural Networks, rule induction, Case-Based Reasoning and statistical analysis) can provide the combination of prediction, explanation, performance and ease of use necessary for widespread information discovery. The present invention is a unified approach towards Data Mining. Where other prior art systems may combine some of these other technologies in a hybrid system, one component in the hybrid providing the prediction, another component the explanation, the knowledge model of the present invention provides, in a unified manner, both prediction and explanation.

The present invention has the ability to support complex databases. The difficulty in discovering new and useful information from very large databases, of perhaps several tens or hundreds of gigabytes, comes from the fact that they contain hundreds of different parameters having an influence on a given outcome. Such a complex environment cannot be visualized easily or averaged out by simple tools. Data Mining tools must be able to mine quickly very large number of records, while able to handle the complexity of analysis.

It should be noted that sometimes very large databases can be very simple with nothing really to discover, whereas some small databases can be very complex and potentially very rich for the discovery process. For example, in the medical domain, there are very complex databases both large and small. A clinical test does not usually generate a very large database, since there are not millions and millions of test cases, but the results are very complex to analyze. The real challenge for Data Mining comes from complex databases rather than simply large databases. The present invention is adapted to handle complex databases (either small or very large).

What is also needed is support for decision making through predictive models. Decision making can be divided into two main types: (i) classification processes (e.g., credit acceptance); and (ii) design processes (e.g., a new product for a special target market). The first type of decision making can be improved by the prediction capability of the present invention. These predictions are possible because associations have been established between different contexts and different events. The second kind of decision-making process involves an understanding of the past. Indeed, when one learns from the past and truly understands such learning, i.e., comprehend its implications, one can use the discovered knowledge to design new things. Knowledge workers can make decisions because they can both predict and understand processes. The present invention provides explicitly predictive Knowledge Models whose processes can be understood, i.e., they provide semantic understanding, rather than being simply utilized. Thus, one avoids the undesirable situation where the justification for an answer is simply that the Knowledge Model gave a certain result.

What is also needed is real accessibility of data mining tools to non-data analysis specialists. Classical data analysis tools are handled by MIS departments who have a need to schedule new analyses weeks in advance. The number of problems that end-users get to tackle is limited because the process is both costly in computational time and requires access to advanced data analysis specialists. However, there is a need among end-user knowledge worker to be able to rapidly test ideas, understand trends and opportunities. Extreme precision in the analytical results is not necessarily what such knowledge workers are after. They may well realize that prompt access to the meaning of patterns is a trade-off as data in today's business environment is usually imperfect and can change rapidly. Therefore Data Mining tools must be directly useable and accessible to the end-user. The current invention provides non-specialists with the predictive capabilities and highly-valued knowledge discovery, without requiring the intermediation of MIS personnel.

These and other objects of the present invention are accomplished by using a computer-implemented data mining system comprised of a Study Manager, Discovery Manager, Evaluation Manager, Prediction Manager and Knowledge Model engine. The Study Manager allows a Discovery Domain, an Evaluation Domain and a Prediction Domain to be selected from one or more Data Sources, each Data Source including one or more data records, and each data record having one or more Parameters. The Knowledge Model engine, when presented with the Discovery Domain, constructs an explicitly predictive Knowledge Model therefrom and returns a discovery results set, and when presented with either of the Evaluation or Prediction Domains, applies the Knowledge Model thereto and returns an evaluation or prediction results set, respectively. The Discovery Manager takes the discovery results set from the Knowledge Model engine and calculates the relative significance of the Parameters under the Knowledge Model. The Evaluation Manager takes the evaluation results set from the Knowledge Model engine and calculates the accuracy of the Knowledge Model. Finally, the Prediction Manager takes the prediction results set from the Knowledge Model engine and calculates the predictions of the Knowledge Model.

The accompanying drawings, which are incorporated in, and which constitute a part of, this specification, illustrate one embodiment of this invention, and together with the description, explain the principles of the invention.

III. BRIEF DESCRIPTION OF THE DRAWINGS.

FIGS. 5(a)–(d) show the use of fuzzy predicates in a neuroagent network.

Figure 1:
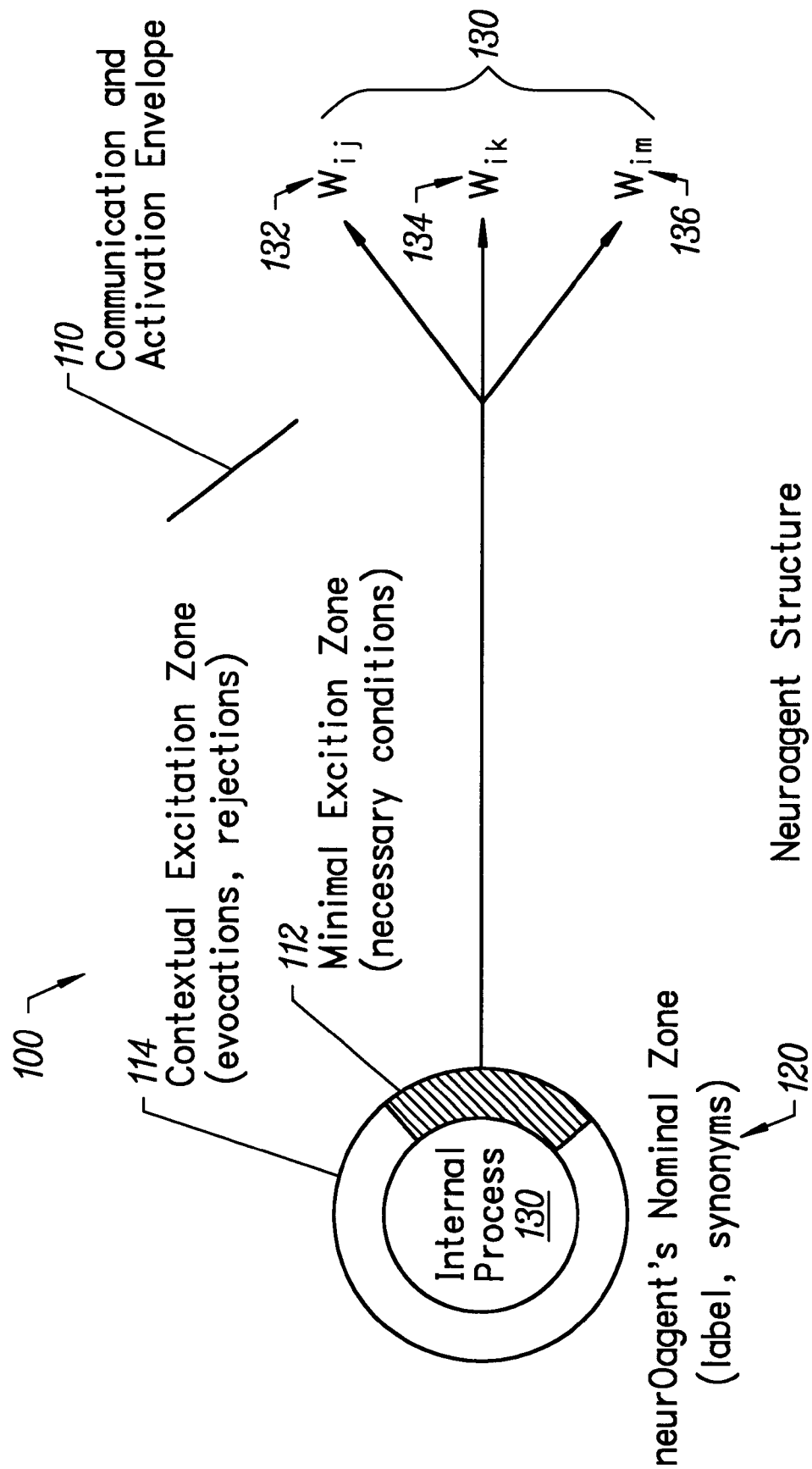
FIG. 1 shows the basic neuroagent structure.
Figure 2:
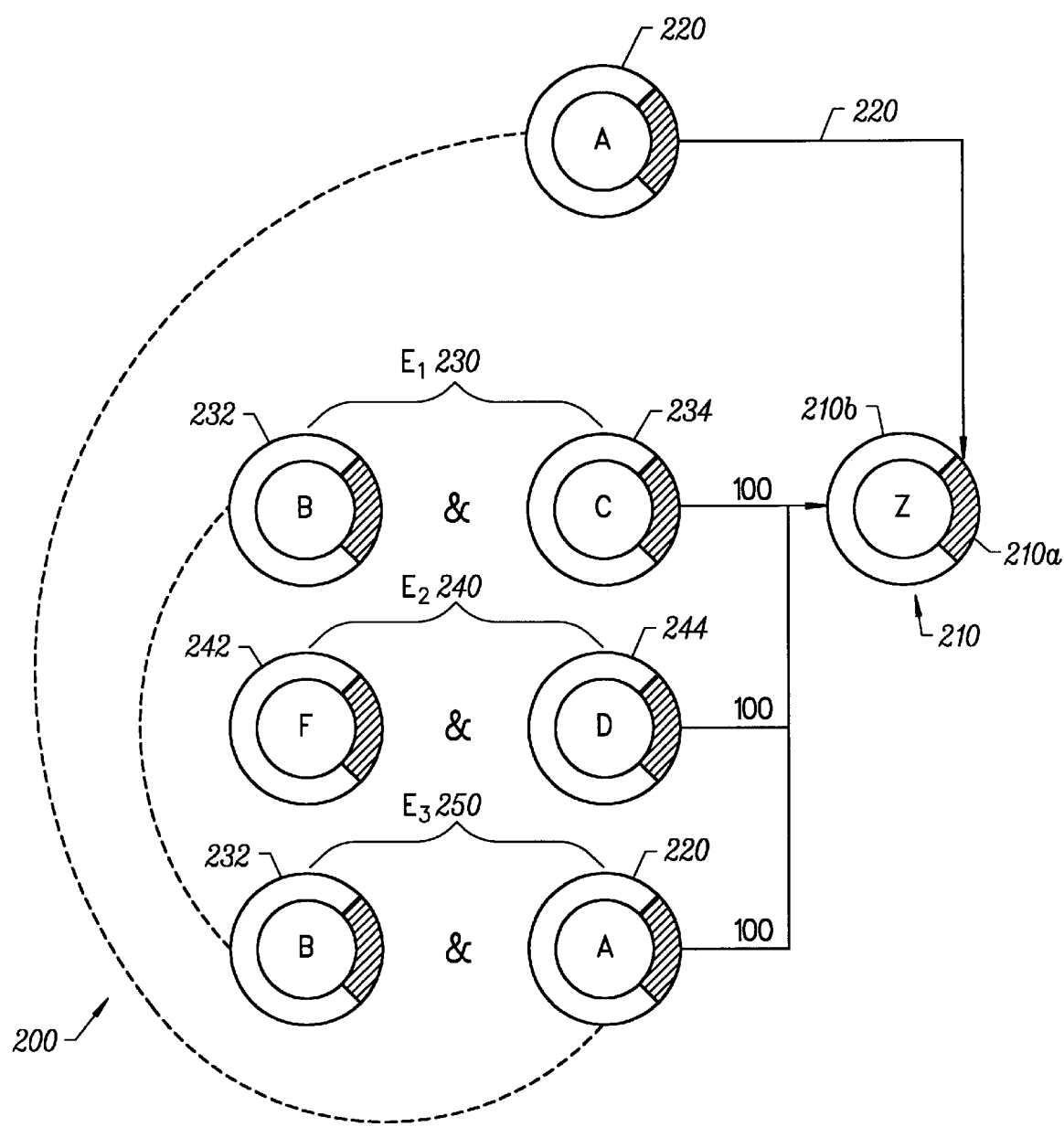
FIG. 2 shows examples of neuroexpressions in a neuroagent network.
Figure 3:
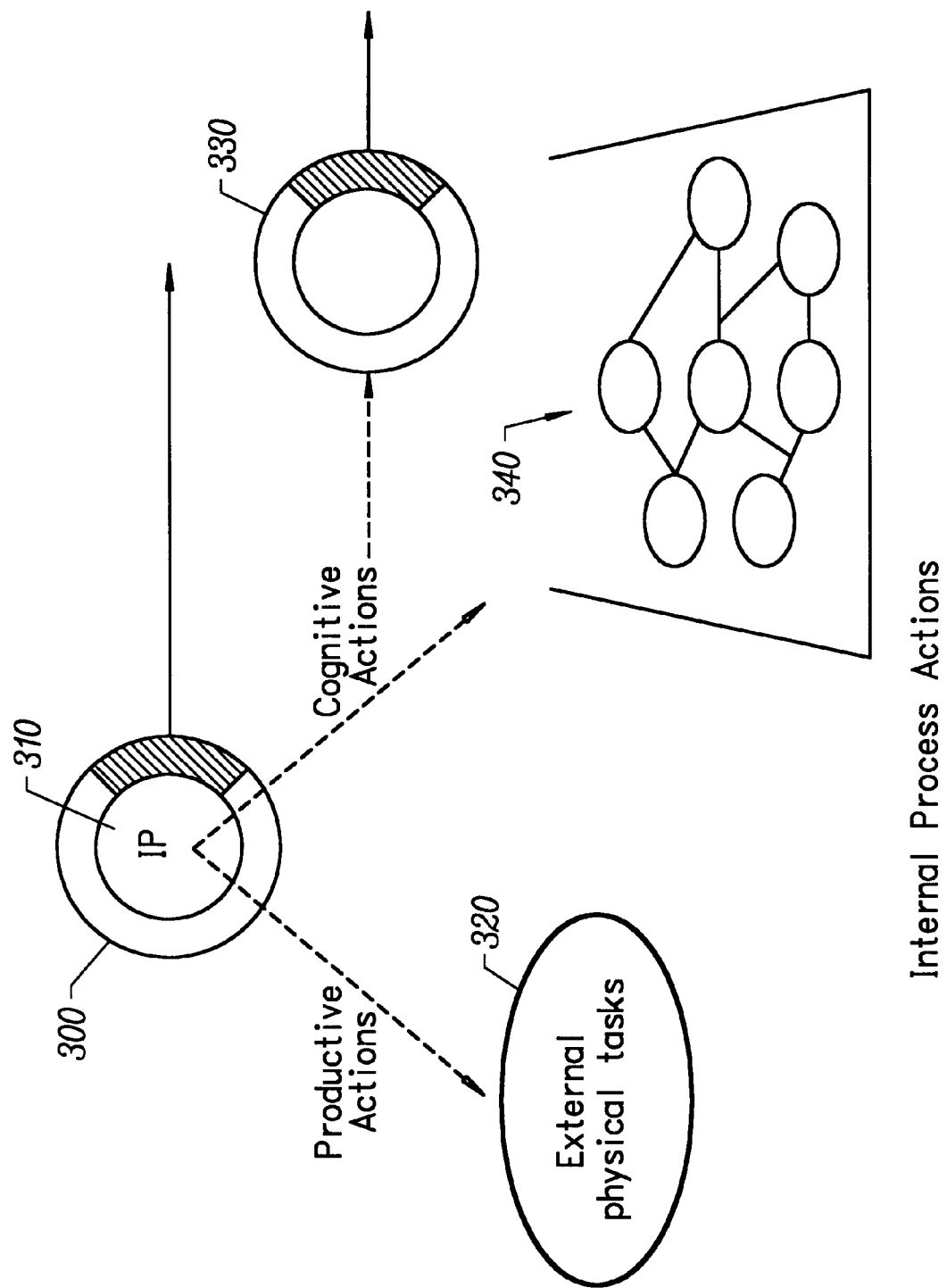
FIG. 3 shows the types of actions (productive, cognitive) that can be taken by the internal process of a neuroagent.
Figure 4:
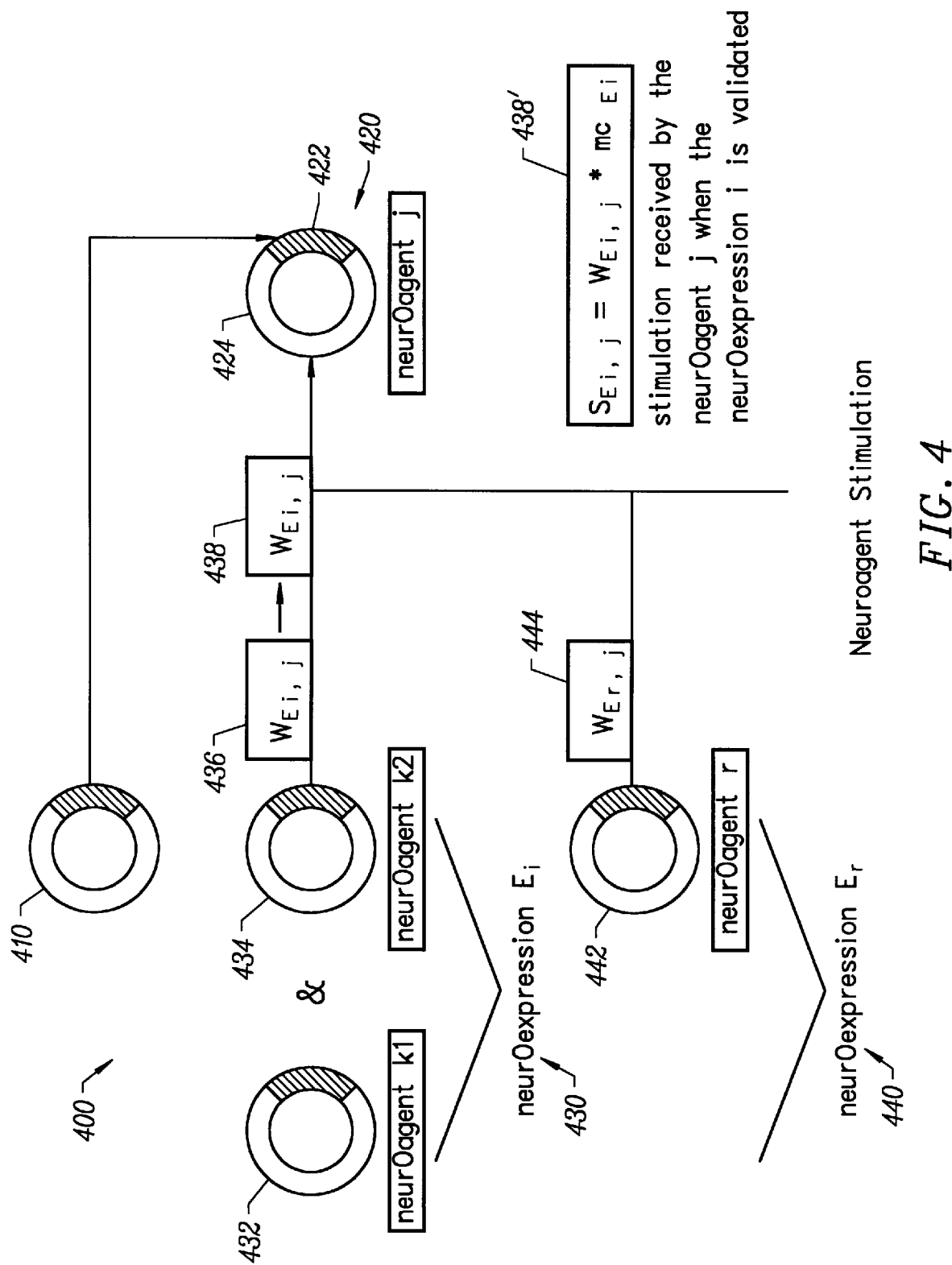
FIG. 4 shows the operation of neuroagent stimulation.
Figure 5A:
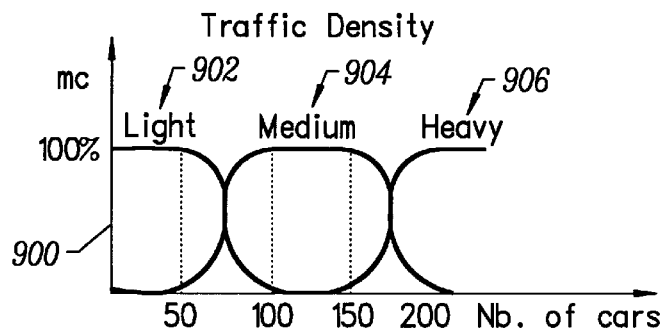
Figure 5B:
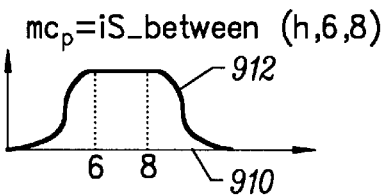
Figure 5C:
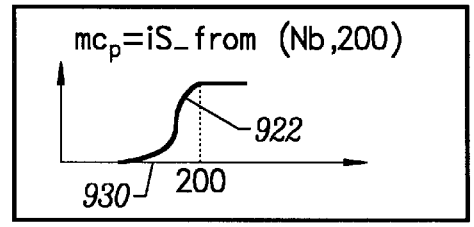
Figure 5D:
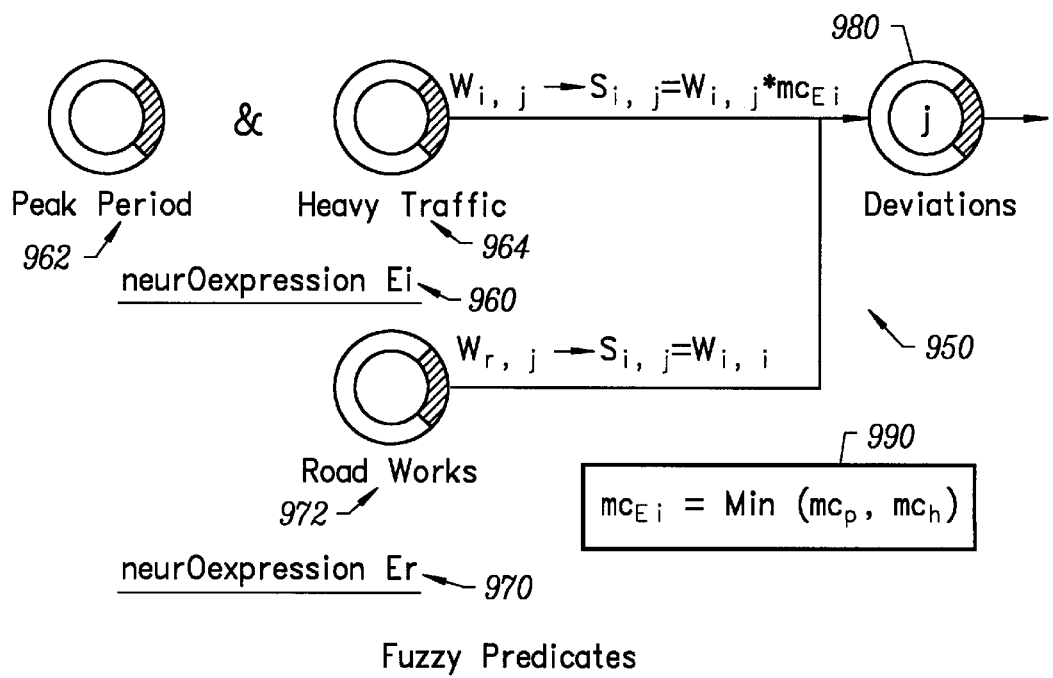
Figure 6A:
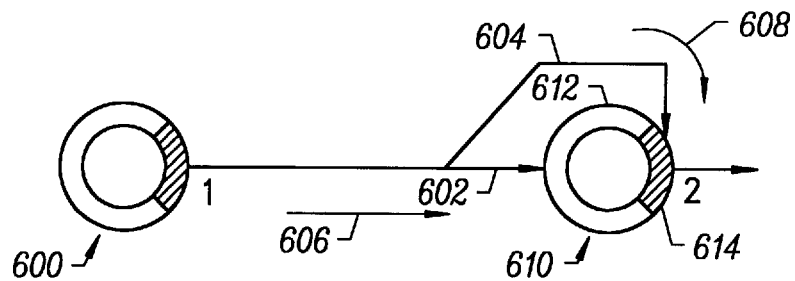
Figure 6B:
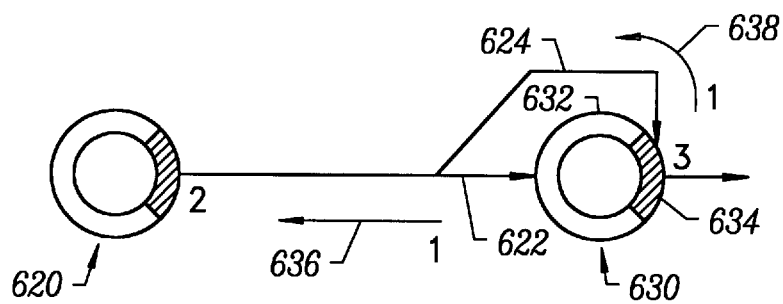
Figure 6C:
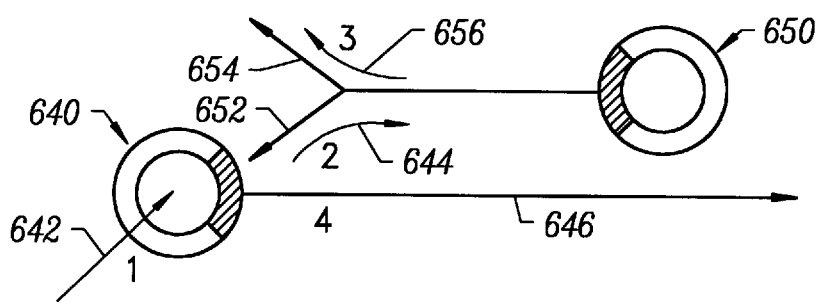

FIGS. 6(a)–(c) show, respectively, forward propagation, backward propagation and retropropagation of the necessities.

Figure 7A:
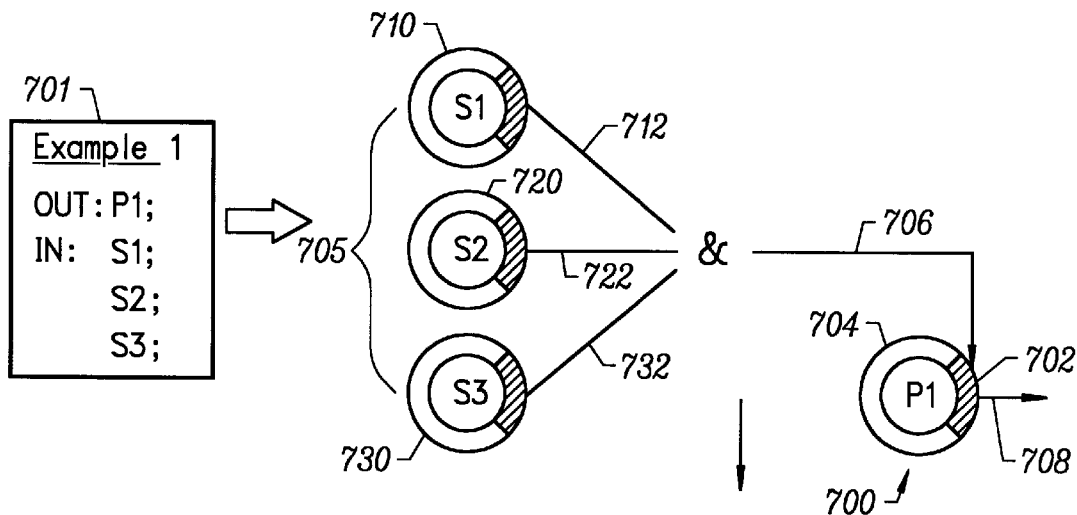
Figure 7B:
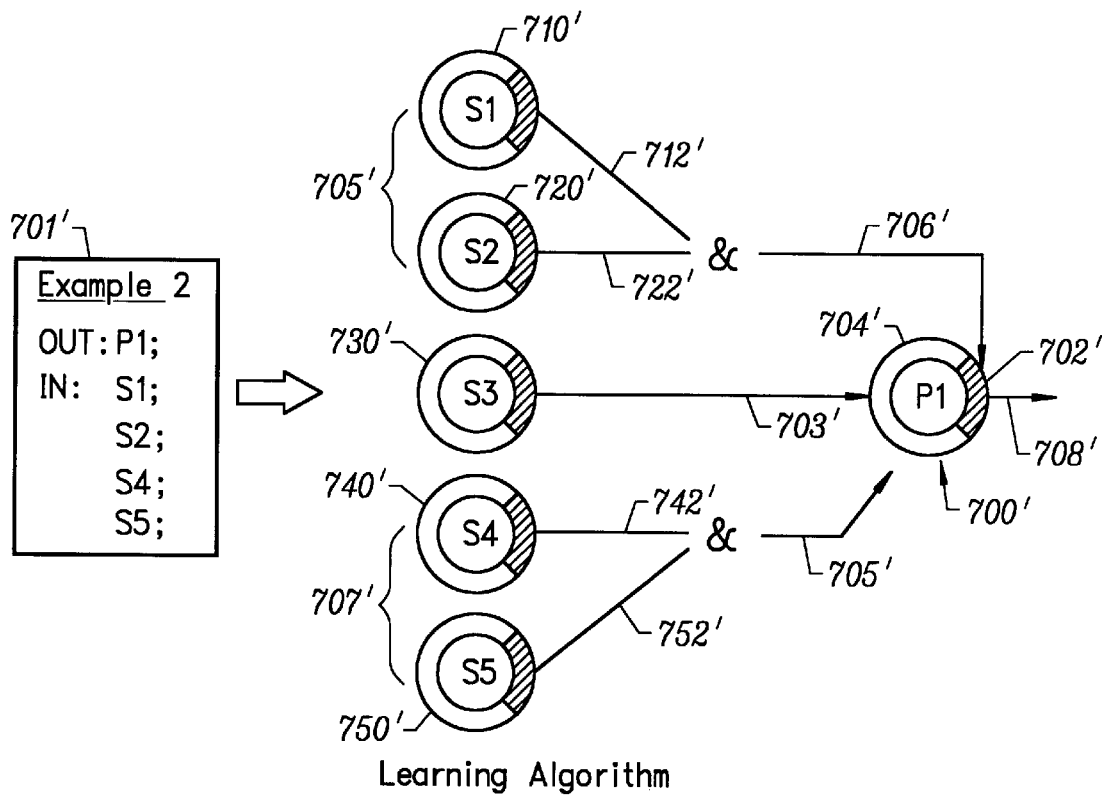

FIGS. 7(a)–(b) shows the neuroagent learning mechanism.

Figure 8:
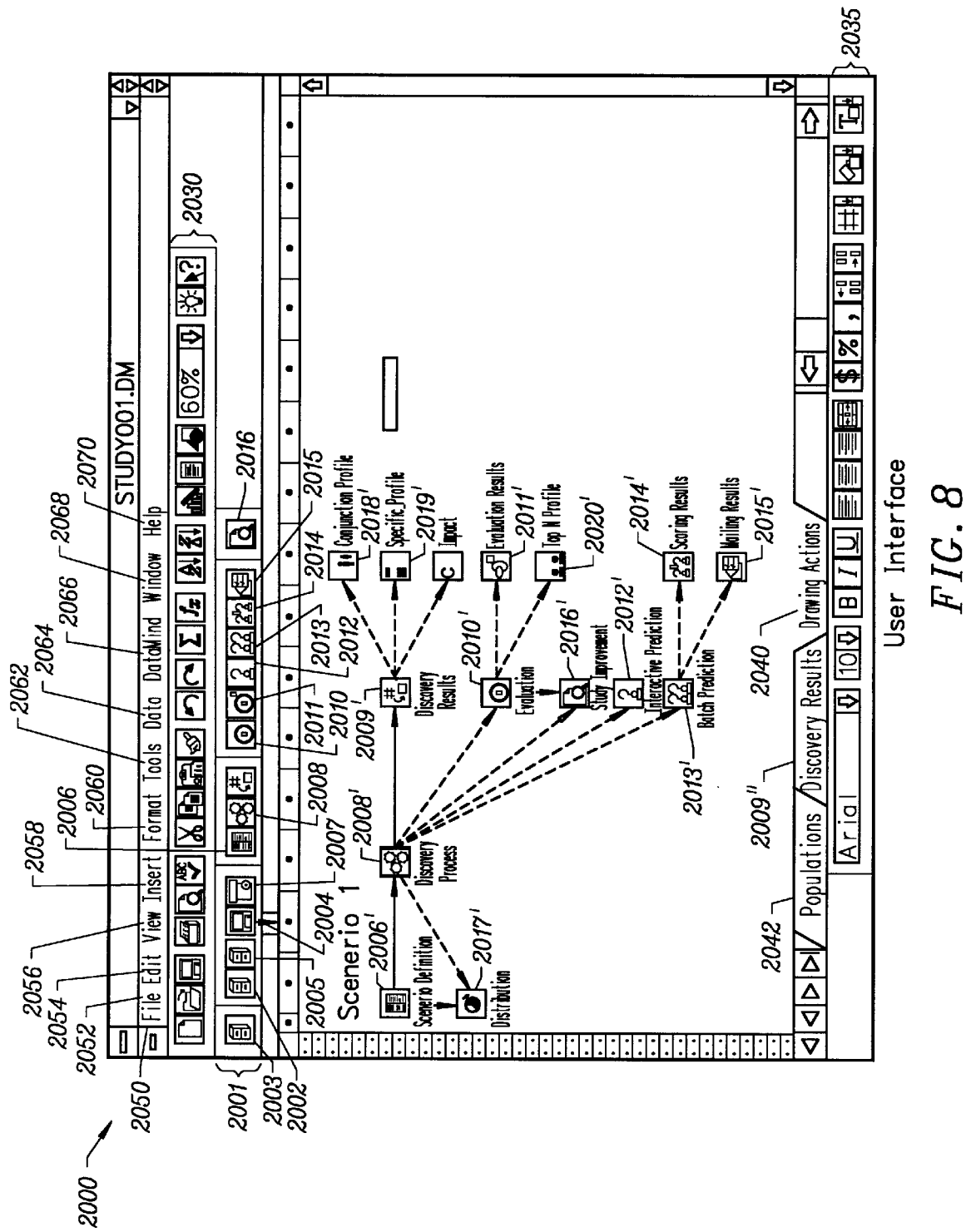

FIG. 8 shows the user interface for an embodiment of the present invention.

FIGS. 9(a)–(d), through various screen displays, show the process for creating a Subject in an embodiment of the present invention.

FIGS. 10(a)–(d), through various screen displays, show the process for creating a Study in an embodiment of the present invention.

FIG. 11 shows a screen display of the Scenario Specification.

FIG. 12 shows a screen display of the Population Description.

Figure 13A:
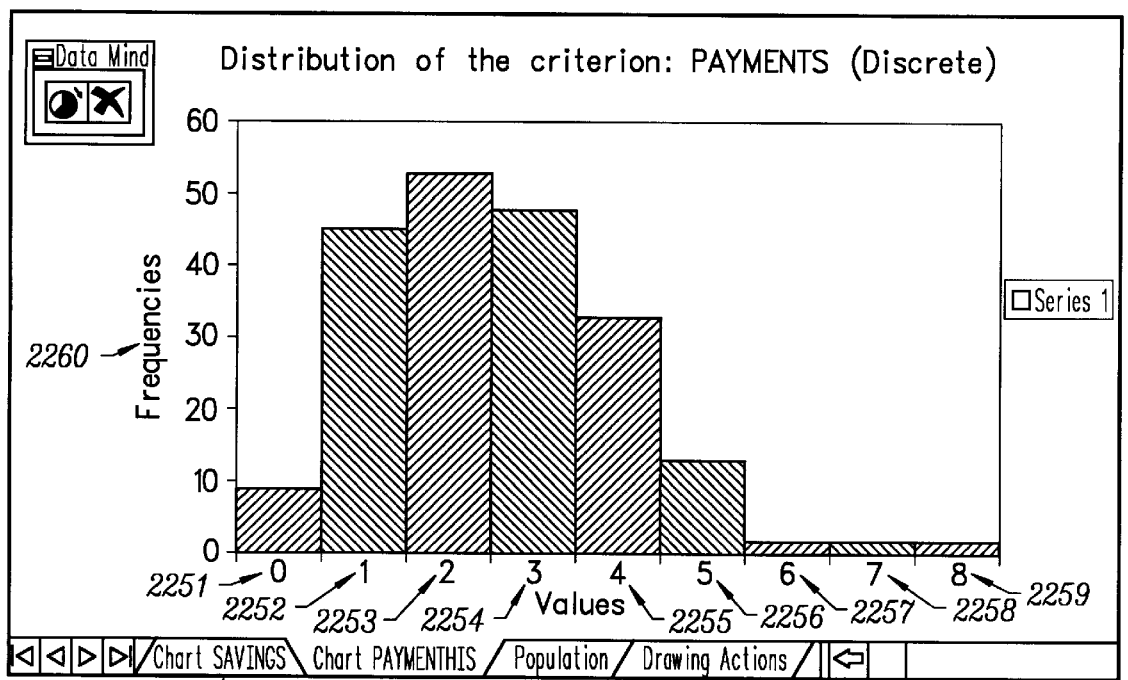
Figure 13B:
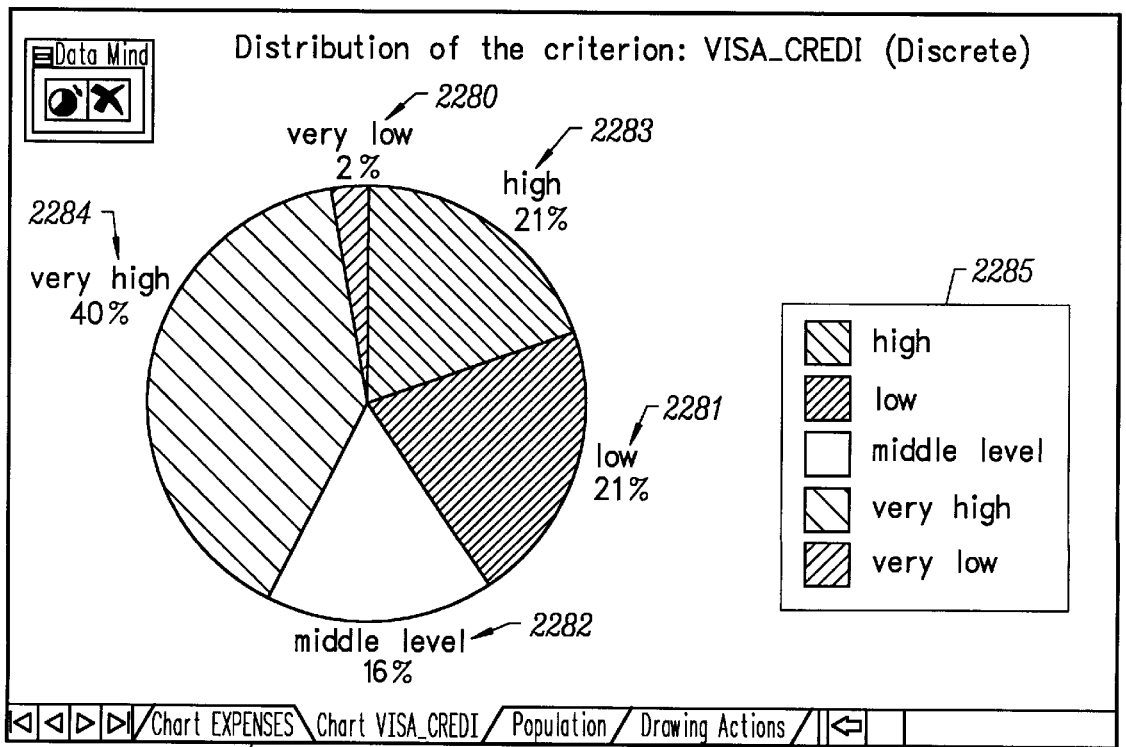

FIGS. 13(a)–(b) show screen displays of data distributions.

FIG. 14 shows a screen display of the Relationship Discovery Report.

Figure 15:
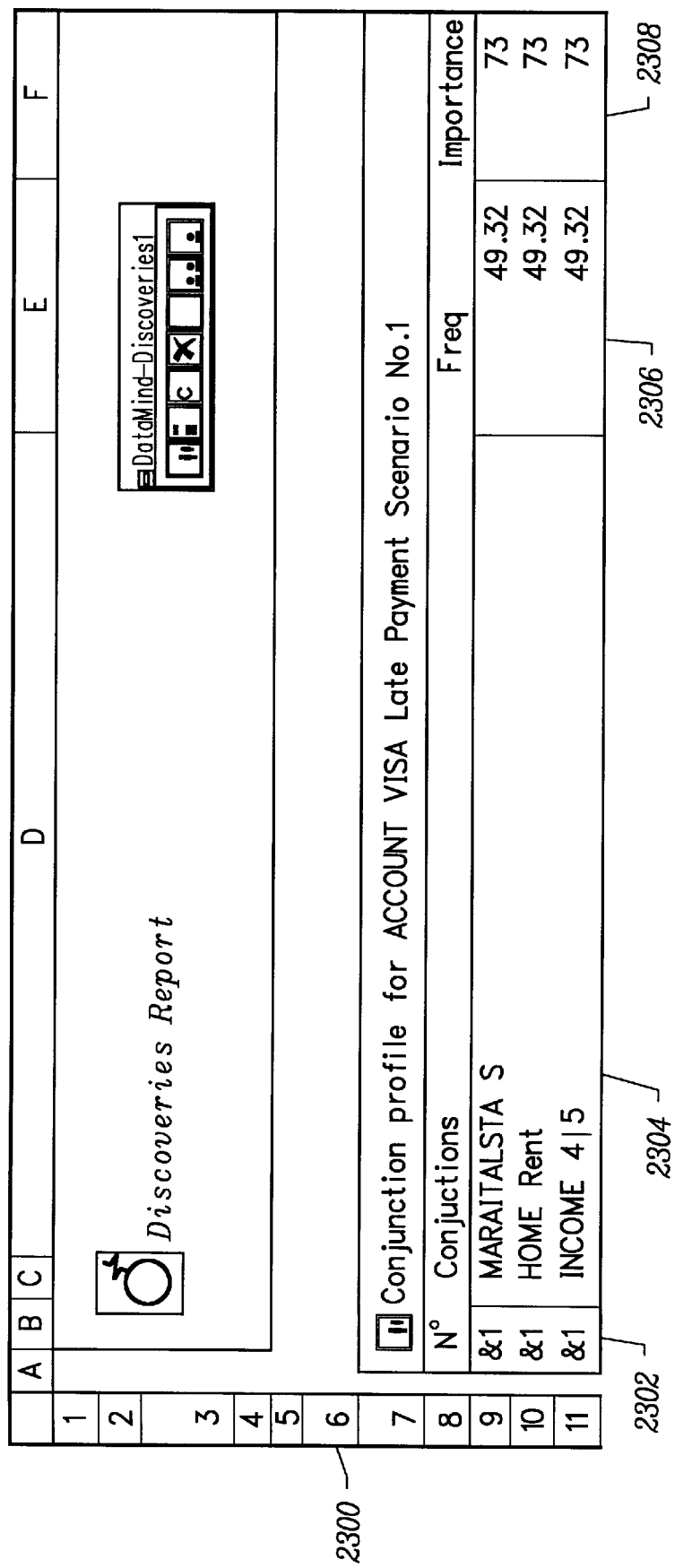

FIG. 15 shows a screen display of the Conjunction Profile View.

Figure 16:
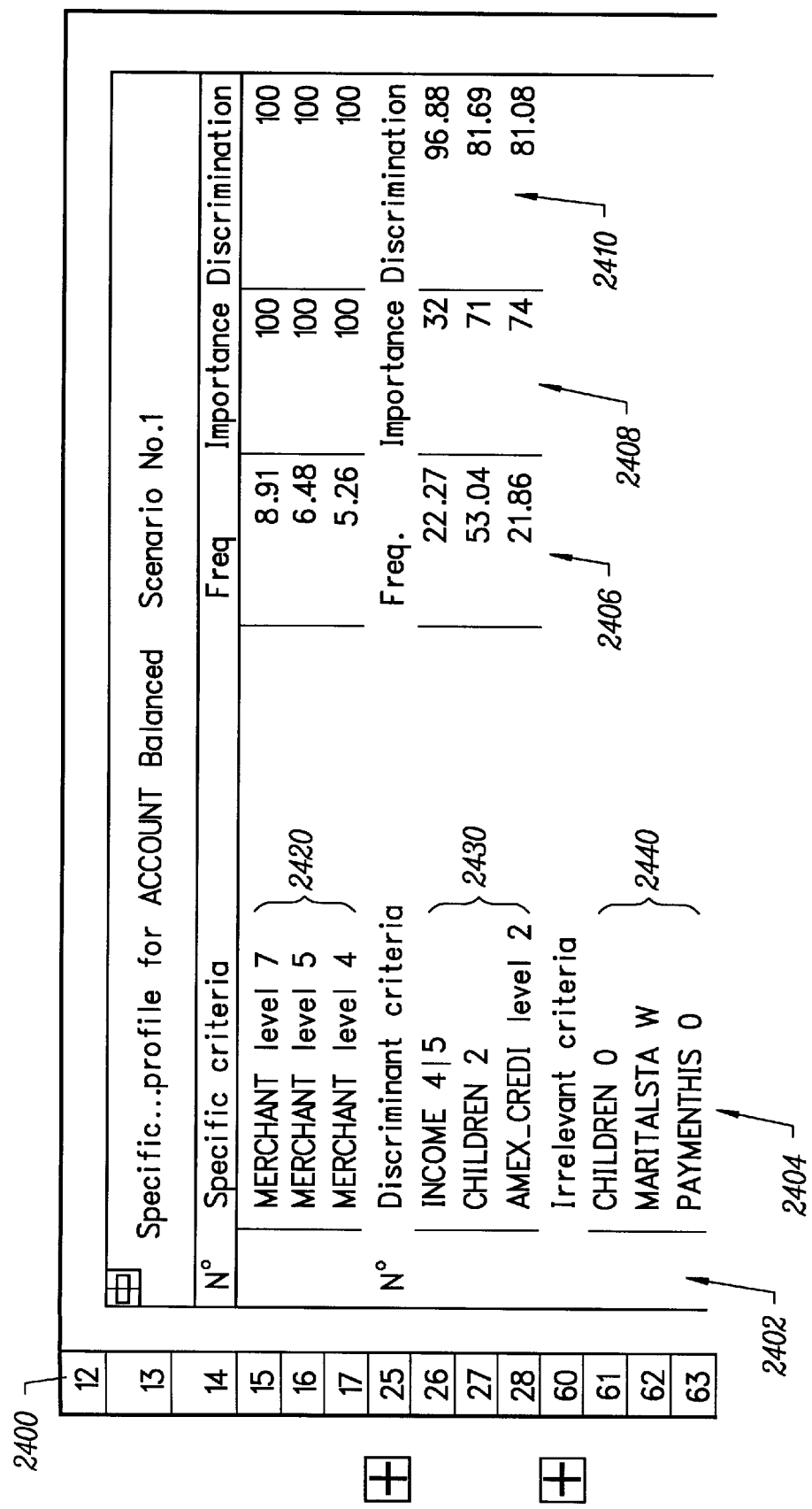

FIG. 16 shows a screen display of the Specific/Irrelevant Criteria Profile View.

Figure 17:
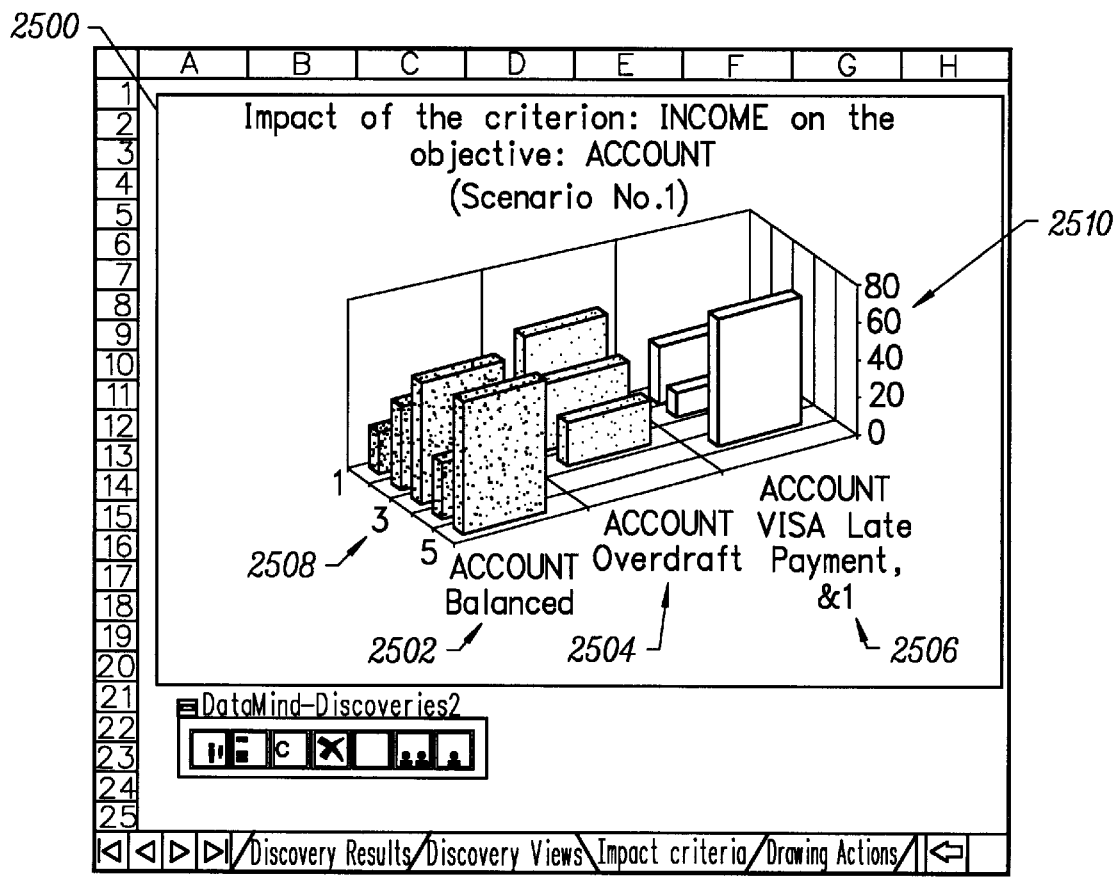

FIG. 17 shows a screen display of the Decision Impacts View.

FIG. 18 shows a screen display of the Evaluation Report.

FIG. 19 shows a screen display of the Top "N" Profile View.

Figure 20:
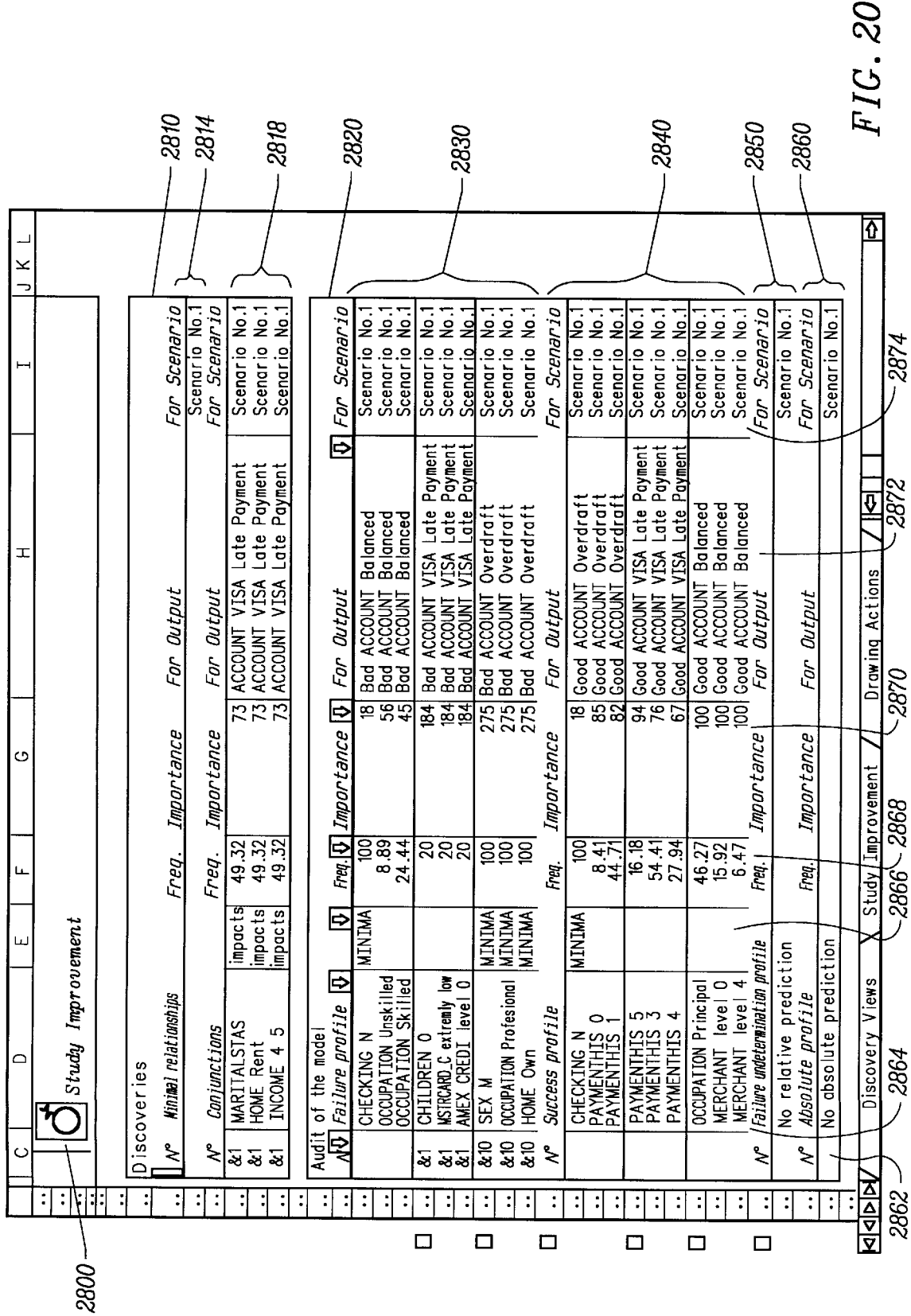

FIG. 20 shows a screen display of the Study Improvement Report.

FIG. 21 shows a screen display of the Scoring Results.

Figure 22:
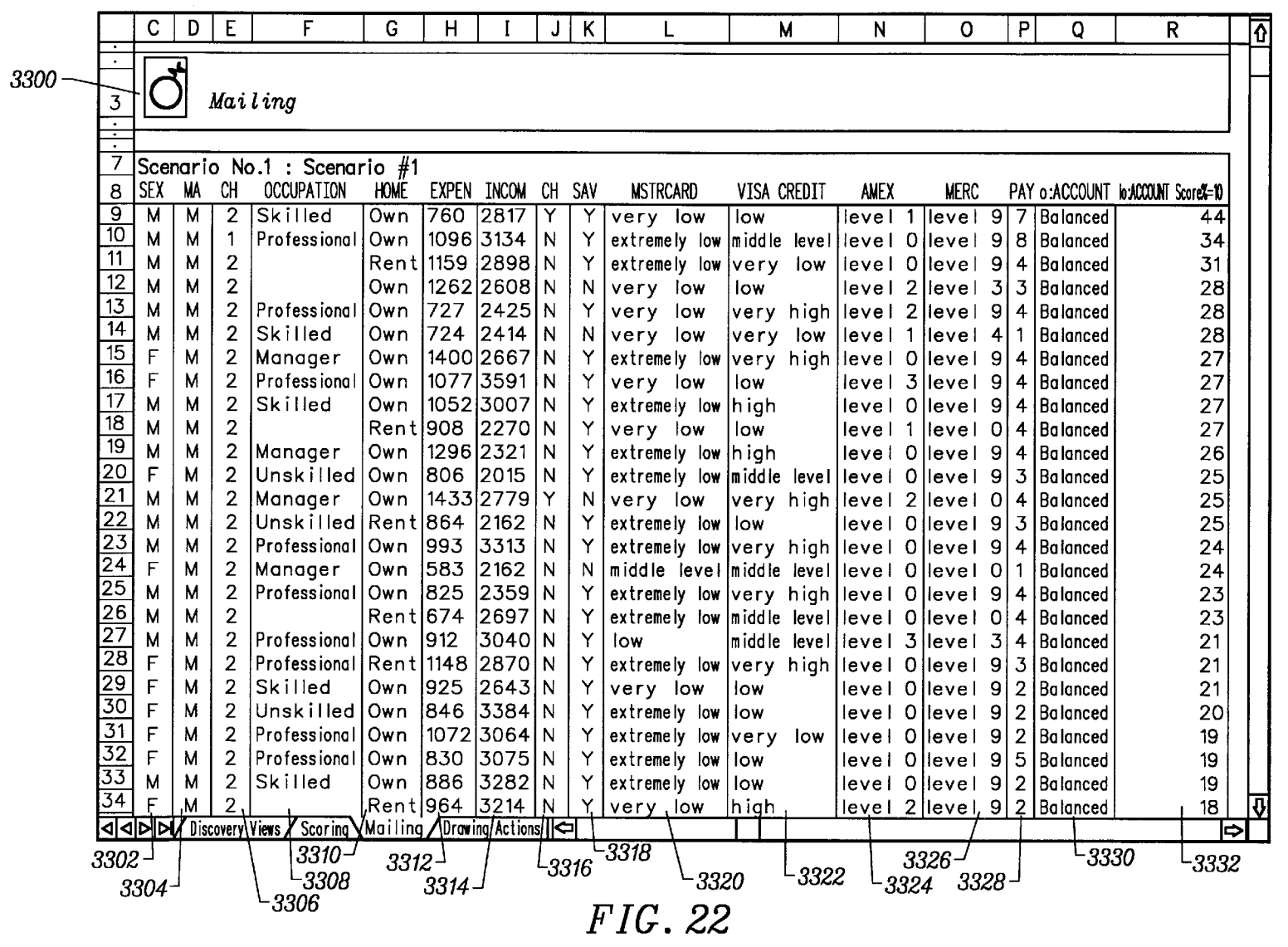

FIG. 22 shows a screen display of the Mailing Results.

Figure 23A:
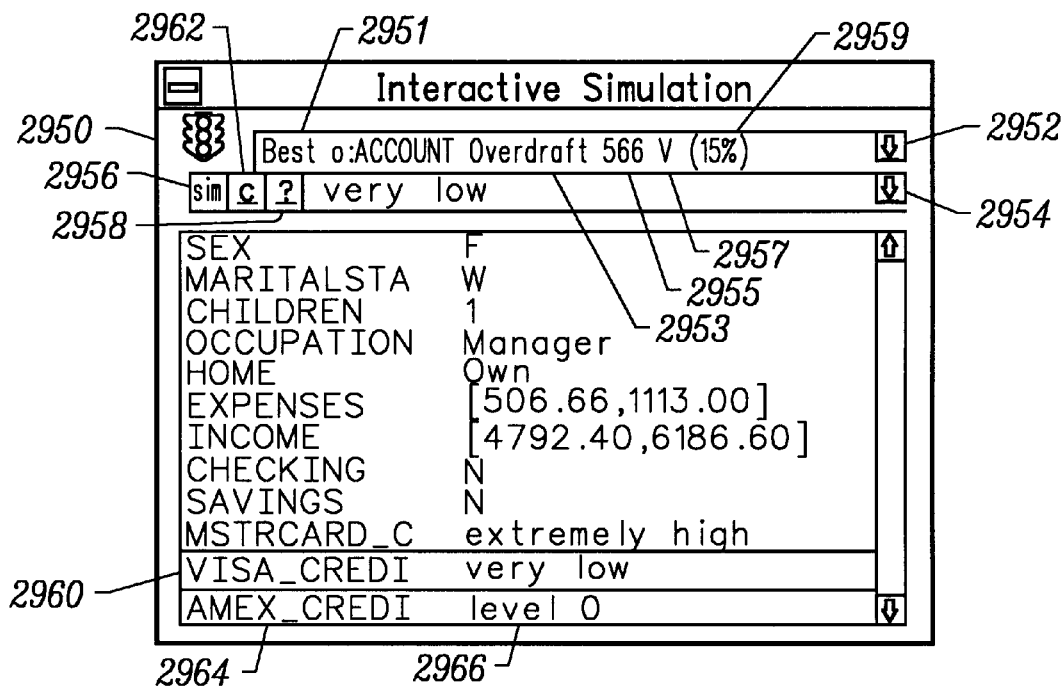
Figure 23B:
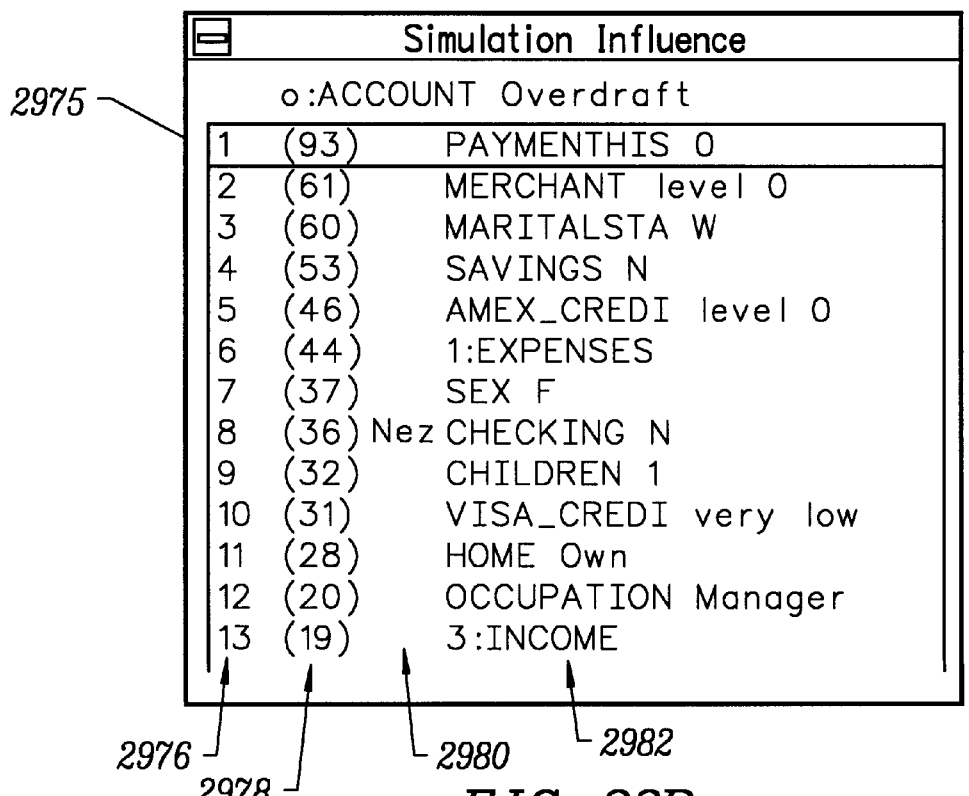

FIGS. 23(a)–(b) show screen displays of the Interactive Simulation Dialog and Simulation Influence Dialog, respectively.

Figure 24:
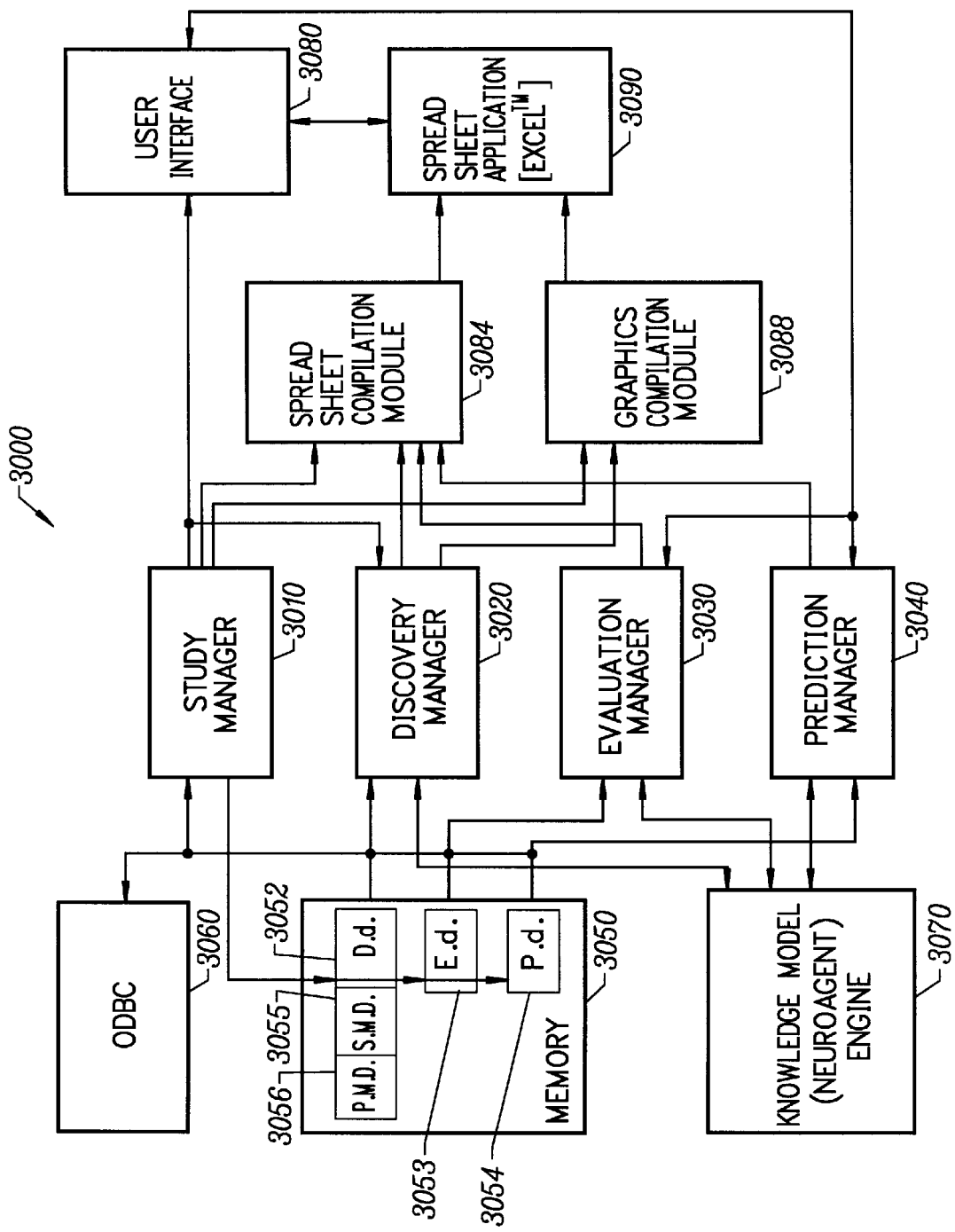

FIG. 24 shows a block level diagram of an embodiment of the present invention.

Figure 25:
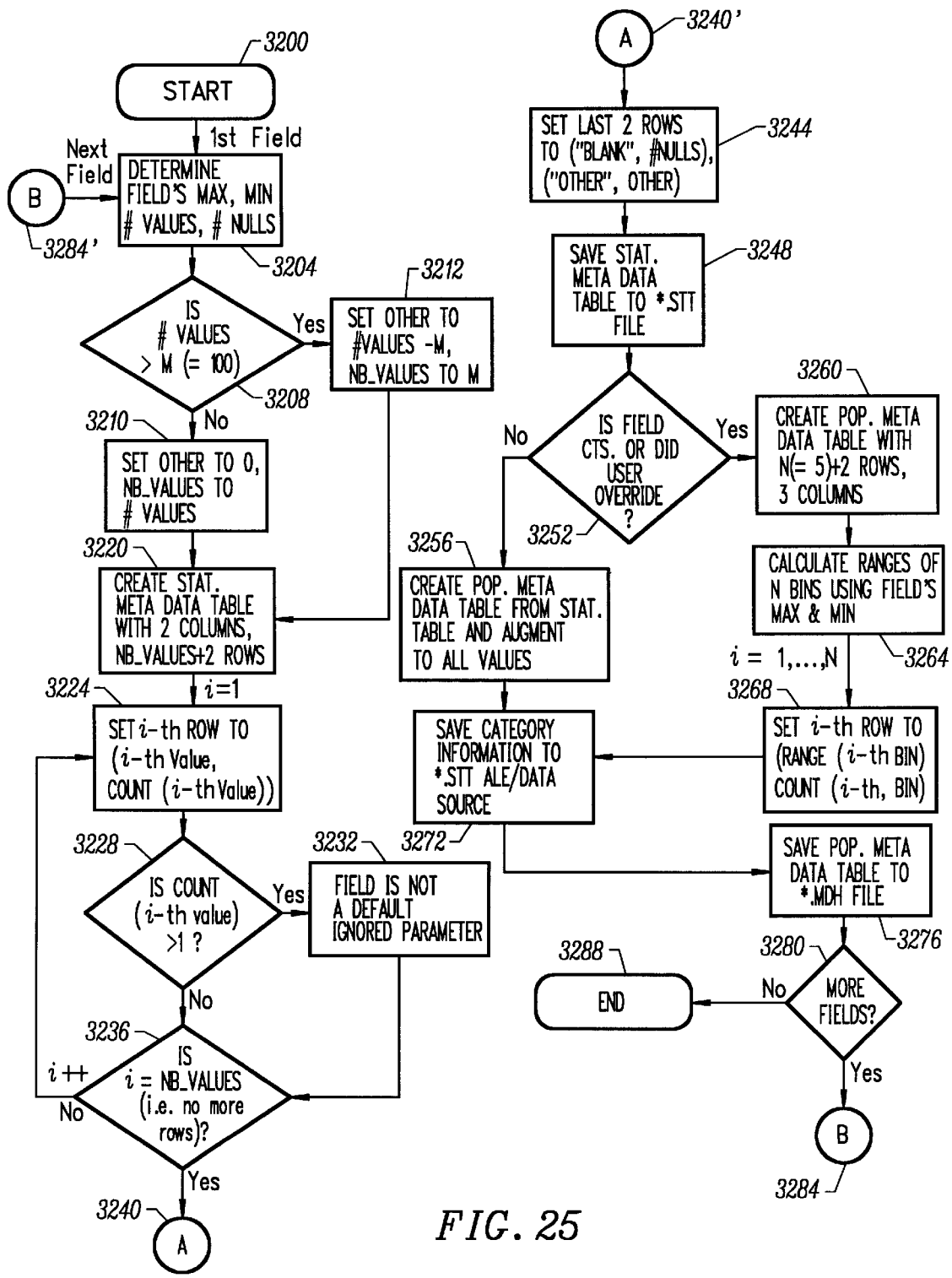

FIG. 25 shows a flowchart which describes the process of building up the Statistical and Population Meta Data tables.

Figure 26:
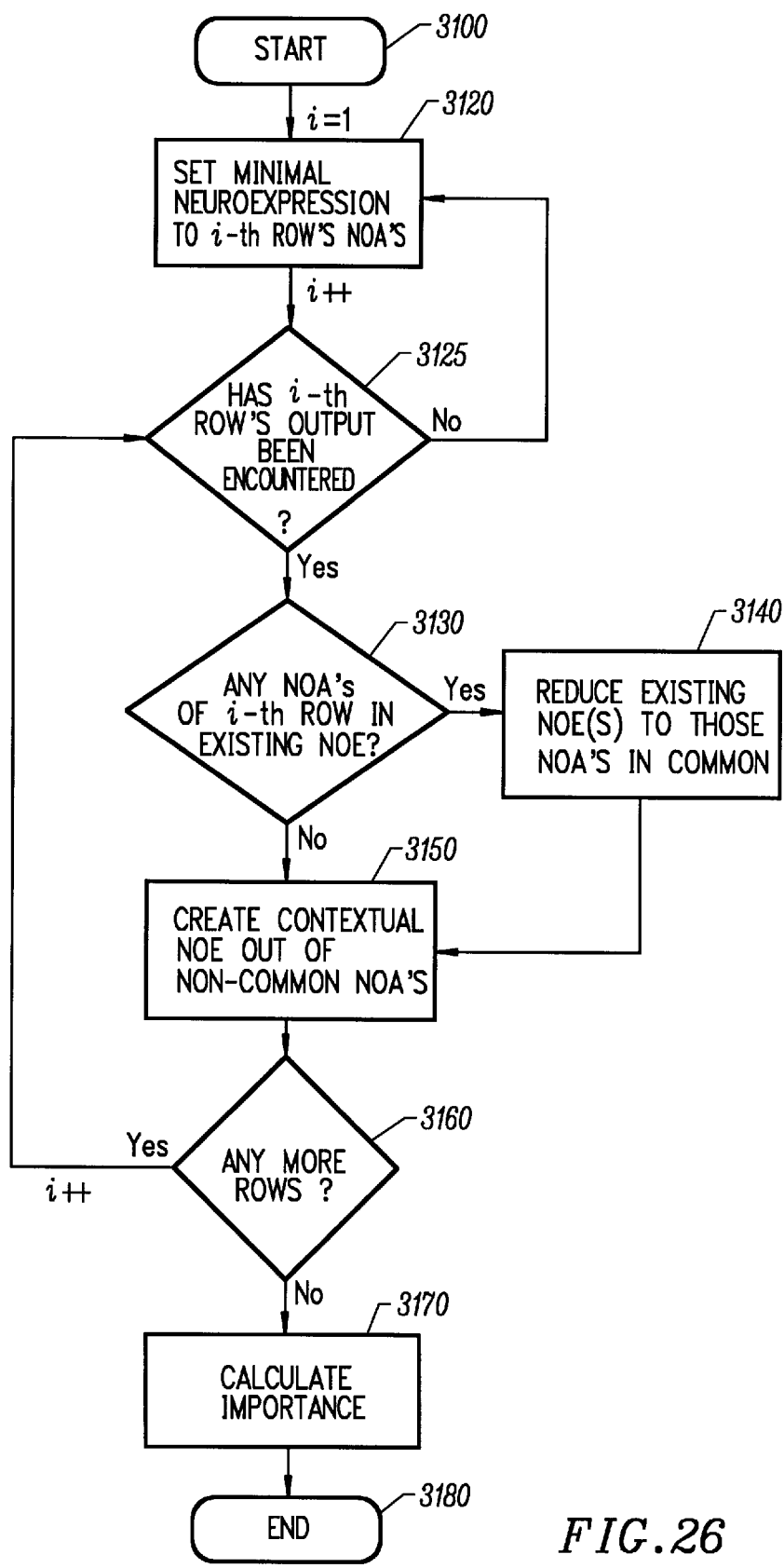

FIG. 26 shows a flowchart which describes the process of building up the neuroexpressions into a network during the Discovery Process.

Figure 27:
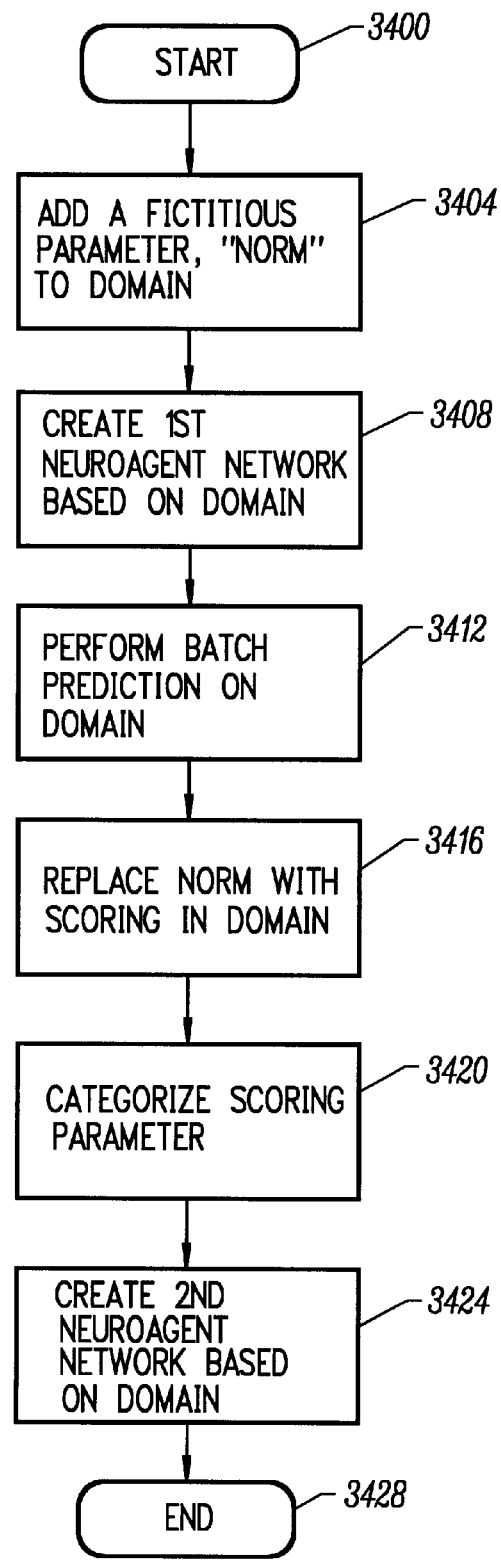

FIG. 27 shows a flowchart which describes the process of segmentation, i.e., building up a neuroagent network in the absence of a prescribed output parameter.

IV. DETAILED DESCRIPTION.

A. User-Apparent Features of the Disclosed Embodiment.

1. Overview of the Disclosed Embodiment.

With reference to FIG. 8, the overall user-apparent structure of the software application, constituting an embodiment of the present invention, shall now be described. This embodiment is an add-on to the familiar spreadsheet program, Excel™, produced and marketed by the Microsoft Corporation of Redmond, Wash. The version of Excel™ used with this embodiment is version 5.0 (for Windows95™, version 7.0).

The main screen 2000 includes sets of icon buttons 2001, 2030, 2035 and menu bar 2050. The disclosed embodiment inserts the "DataMind" menu 2066 to menu bar 2050 as an addition to the familiar Excel™ menus File 2052, Edit 2054, View 2056, Insert 2058, Format 2060, Tools 2062, Data 2064, Window 2068 and Help 2070. The set of icon buttons 2001 are also an addition to the sets of icon buttons 2030, 2035 under the standard Excel™ environment. In this embodiment, one can use either the menu items under menu bar 2050 or the corresponding icon buttons 2001, 2030, 2035 for various functions. Furthermore, the user can access many of the same function through the "Drawing Actions" spreadsheet 2040, which contains analogous icon buttons arranged in a data workflow manner. Thus, the "add-on" features are available under "DataMind" menu 2066, the icon button set 2001 and through the "Drawing Actions" spreadsheet 2040. Also, a function of the Excel™ user interface is to be able to detach sets of icon buttons from the menu bar 2050 and have them as free-standing dialog boxes. The implementation of these features is well-documented and will thus not be discussed here.

The Subject Administration (icon button 2003) allows a user to create a new Subject and modify existing Subjects. The Study Manager (icon button 2002) allows the user to select a new or existing Study. Study Setup (icon button 2005) allows a user to create a new Study and modify existing Studies. Save Study (icon button 2004), as the name implies, saves a Study (with Excel™ spreadsheets the user has worked with). Close study (icon button 2007) closes the current Study opened under Excel™.

Scenario Definition (icon buttons 2006, 2006') gives a high-level view of the Study data under consideration. Distribution (icon button 2017') allows the user to select various data dimensions of the current Study for graphical examination.

Discovery Process (icon buttons 2008, 2008') runs the actual background process for Discovery on the current Study. Discovery Results (icon buttons 2009, 2009') displays results of the Discovery. The Discovery views, Conjunction Profile, Specific/Irrelevant Profile, Impact (icon buttons 2018', 2019' and 2021', respectively) display the results of the Discovery in various formats.

Evaluation (icon buttons 2010, 2010') runs the actual background process for Evaluation of the current Study. Evaluation Results (icon buttons 2011, 2011') displays the results of an Evaluation. The Top "N" Profile View (icon button 2020') shows the dominating characteristics of an Evaluation. Study Improvement (icon buttons 2016, 2016') shows the user the areas to consider for future study improvement. This selection brings up the Study Improvement spreadsheet, which supplies ideas to optimize the user's Study.

Interactive Prediction (icon buttons 2012, 2012') activates the interactive prediction dialog box. Batch prediction (icon buttons 2013, 2013') runs the actual background process Prediction of the current Study. Batch prediction is a prediction run on all of the records specified in a prediction set. Batch prediction can be used for scoring or mailing processes. Scoring Results (icon buttons 2014, 2014') displays the results of batch prediction. Mailing Results (icon buttons 2015, 2015') allows the user to select a set of records from the prediction set for such purposes such as a mailing or other notation.

Available through the DataMind menu 2066 but not otherwise shown is the dictionary, which contains equivalents between the generic data mining language and a user's own language. The dictionary may also be used to establish data equivalence, criterion equivalence or qualitative values, as assigned to Discovery results. An example of data equivalence, in the setting of a sales analysis, could be that code "1" represents the Western Region (such association already having been made in the Data Warehouse environment, Data Warehousing to be discussed below). An example of criterion equivalence could be that the first category of a parameter, age (1:age), has a synonym which is "teenager." The synonym is the descriptor assigned to an input or output. This descriptor tells more about the output in relation to other outputs. For example, if a set of outputs describe the "best" to "worst" outcomes for an objective, one may describe them as "very good," "good," "average," "bad," and "very bad" using synonyms. The various results screens will display this descriptive label, as appropriate, based on the results. Also, discovery levels are by default quantitative values that can be changed in a custom and qualitative way. For example, one could define a "very low" importance level to be between the values 0 and 20. Illustrations of these features will be found in the description that follows.

2. The Subject.

"Subject" is a term used in the Data Warehousing field. A Subject defines a coherent set of Data Sources which usually come from different operational databases. In the disclosed embodiment, when a user creates a Subject, the data is described by identifying the Data Source (e.g., ODBC—Open Data Base Connectivity—or ASCII file) by name. It should be understood by one of ordinary skill in the art that an ODBC connection would preferentially be made to a Data Warehouse.

Generally, a Data Warehouse acts as a central data store for operational data extracted and transformed from other data storage platforms, such as Online Transaction Processing (OLTP) systems. A Data Warehouse is a relational database management system (RDBMS) designed specifically for decision-making rather than transaction processing. Another way of defining a Data Warehouse is that it is a superset of historical data collected from different operational data bases and processed for uniformity of storage and retrieval for business purposes. Although OLTP systems can also be an RDBMS, they are optimized for day-to-day operations rather than ad hoc information retrieval and business analysis. Furthermore, their data models are normalized, i.e., the database schema are written with a minimum of redundancy, such as having only one key field to identify a particular record in a table. Data Warehouses maintain multi-dimensionality to retain versatility in their ad hoc queries. While OLTP's contemplate a changing and incomplete data landscape, Data Warehouses are created for a historical and descriptive purpose. One example is Red Brick™ Warehouse VPT, produced by Red Brick Systems of Los Gatos, Calif., which uses RISQL™, a Data Warehouse-adapted extension to the SQL relational database language originally developed by IBM Corp. of Armonk, N.Y. The Red Brick™ Warehouse VPT System is adapted for very large data warehouses in excess of 500 Megabytes, parallel query processing on symmetric multiprocessing architectures, and time-based data management. RISQL™ adds Data Warehouse functionality to SQL such as cumulative totals, moving averages and sums, ranking results rows including breaking up into tertiles, as well as evaluating ratios of values to totals. Clearly, this is advantageously suited to provide updated information which can test the predictions of a Data Mining Tool.

Both a Data Warehouse and a Data Mining tool would advantageously provide "stability" in that supplied historical data represents a coherent chronological snapshot across all field values. For example, if a company's sales department figures are only available for last week, while the manufacturing department's figures for this week are already in, then last week's figures for the entire organization should be used. This coherence could be established through use of timestamps for the entered data, so that contemporaneous data could be selected.

a. Providing the Subject Information.

Figure 9A:
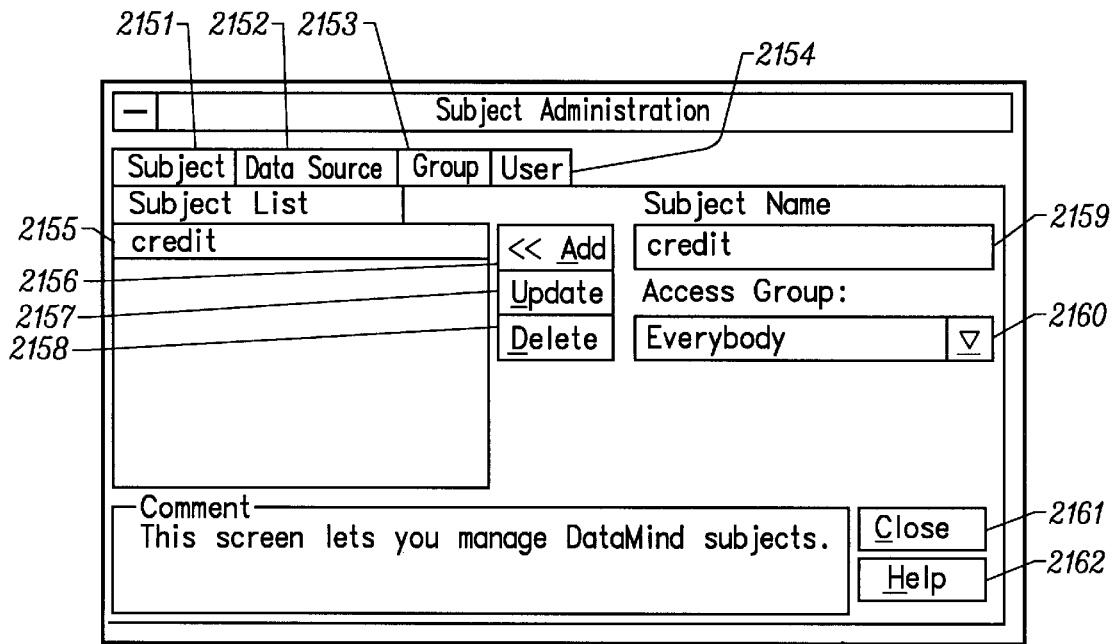

One begins a new Subject by clicking on icon button 2003 or selecting "System Administration" from the "DataMind" pull-down menu 2066 from menu bar 2050. Thereafter, dialog box 2150a is brought up as shown in FIG. 9(a). The mode of dialog box 2150a may be set through tab selectors "Subject" 2151, "Data Source" 2152, "Group" 2153 or "User" 2154. The mode associated with dialog box 2150a is "Subject". In this mode, the subject name 2159 or access group 2160 (for security purposes) may be set or changed by the user. The selected Subjects appear in the "Subjects List" window 2155, this list being modifiable through use of the Add 2156, Update 2157 and Delete 2158 buttons. Pushing of the "Save" button 2161 in any of these modes will commit all changes made, while "Help" button 2162 will invoke the help utility.

b. Providing the Data Source.

Figure 9B:
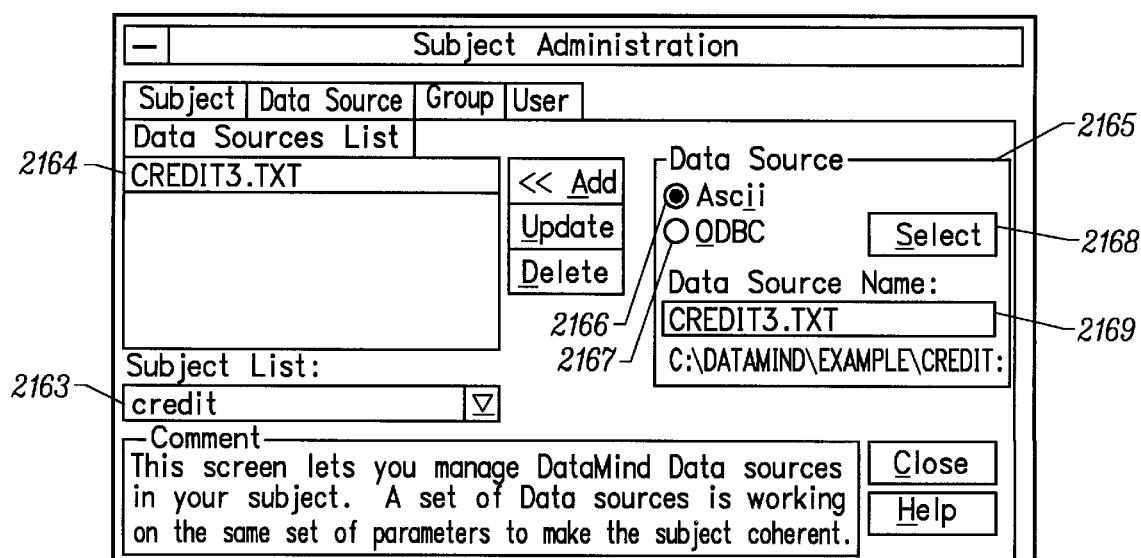

With reference now to FIG. 9(b), the user may specify the Data Source(s). A Data Source can be a data file or a data request. At this stage, it is not important for the system to know the nature of the data; rather, simply how to get it. Thus, each Data Source 2165 may be specified, as ASCII or ODBC, though buttons 2167 and 2168, respectively, and its location through "Select" button 2168 and data entry of the Source name 2169.

It should be understood that multiple Data Sources may be aggregated into a Subject in of two ways: (i) the records of each Data Source merely accumulated with the others and so arranged consecutively; or (ii) the records of one or more Data Sources merged into larger records. In the latter case, care must taken to properly align the data records from the multiple Data Sources, much as an inner join is performed between tables in a single relational database. The Subject is thus the coherent assembly of Data Sources, Parameter for Parameter.

c. Providing Group Access.

Figure 9C:
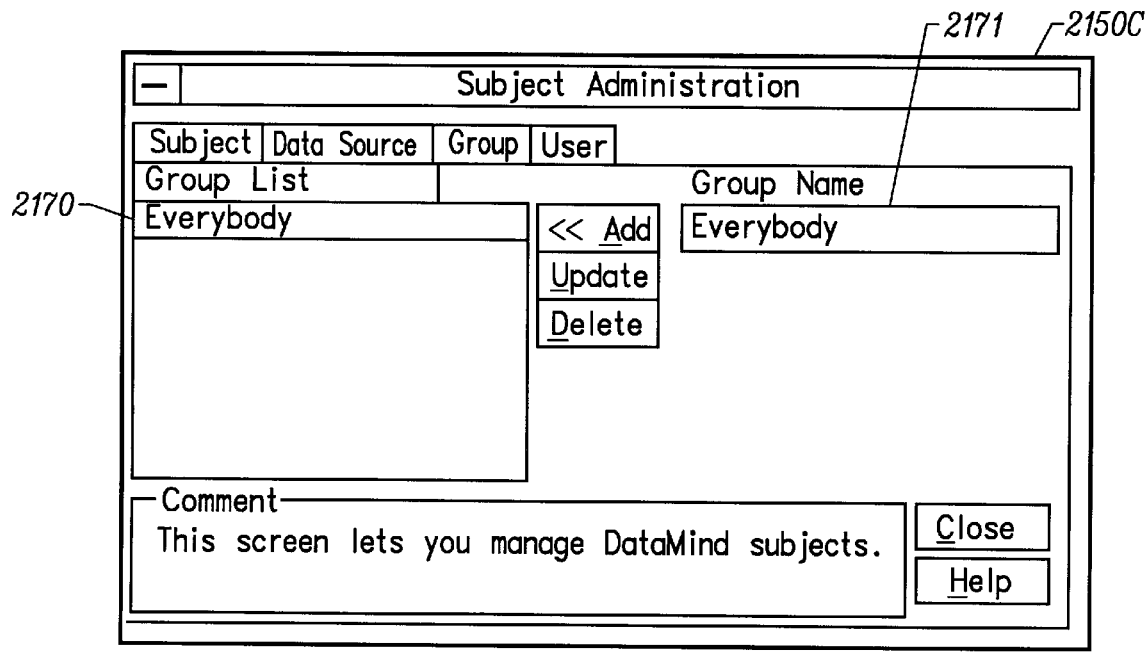

As seen in FIG. 9(c), the user may accumulate a group list 2170 of user groups authorized to access the given Subject, with each group name specified through data entry 2171. This is like group authority for database access.

d. Providing User Access.

Figure 9D:
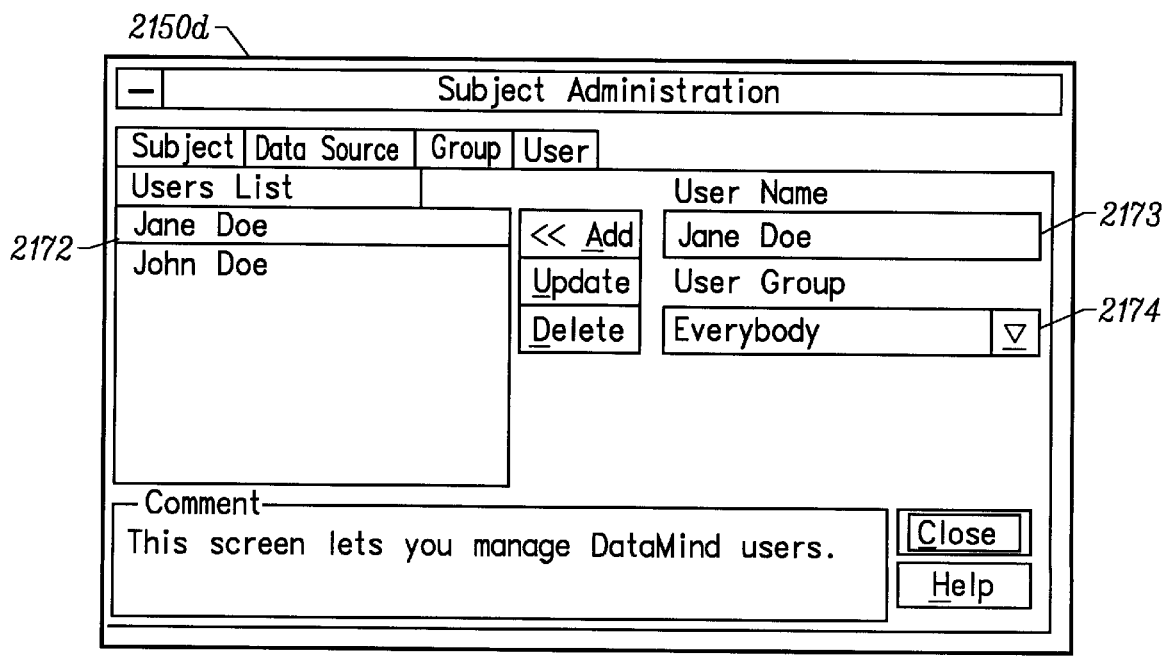

FIG. 9(d) shows how the various users are built up into a group list 2172, with the group name specified through data entry field 2174 and user name through data entry field 2173. This is like user authority for database access.

3. The Study.

The "Study" is the basic unit the user creates to tackle a new data mining problem. In the disclosed embodiment, a Study may be created, opened, saved, saved as another Study, and modified. Study creation is an iterative process in which each new Discovery may give one new ideas to investigate, and thus new specifications to optimize one's Study. This could be as simple as selecting a new Output Parameter, or changing the categorization of a parameter. The Study use phase is the way to use the data mining tool when one considers the Knowledge Model as accurate. One can use it to discover new knowledge and/or to predict new situations. The processes underlying data are different if a Study is being built as compared to when an existing Study is being used, as shall be seen.

A Study is the container for Subject and Domain specifications, each Domain being a list of Data Sources, the Study allowing for setting Domains for each of the purposes of Discovery, Evaluation and/or Prediction, and describing the Parameters (variables or data fields), and indicating any specific Categorization. Thus, in this embodiment, a Study uses one and only one Subject, the Subject has Domains assigned for each of the tasks of Discovery, Evaluation and Discovery.

A Categorization represents the way a user partitions (abstracts) a numerical field in order to give a sense (semantic) to this field for the user's particular context. Depending on a user's needs, one might employ a more granular or more refined Categorization—it really depends on how one looks at the information. For example, a doctor might split the parameter "AGE" in several categories (because she knows that there are some diseases specific to each particular age): baby (ages 0–1), and toddler (ages 1–3). A toy company, on the other hand, might be interested only in these different categories: young children (age$\leq$4) and older children (ages 5–18). Thus, one may have the same data, yet categorize them differently depending on the purpose. One way to determine an appropriate Categorization is to analyze the data distribution, through histograms or otherwise. One may note clumping of data points in some areas, spreading out in others, this may suggest having partitions of unequal size, but roughly equal populations. This can be achieved by partitioning the data into very small sections, say 50 in number, so that the population in each section is not too great, with the population measured in each, and thus sections may be assembled together into larger "bins" as required to accomodate a useful Categorization. These bins need not be mutually exclusive, i.e., they may overlap.

a. Providing the Study Information.

Figure 10A:
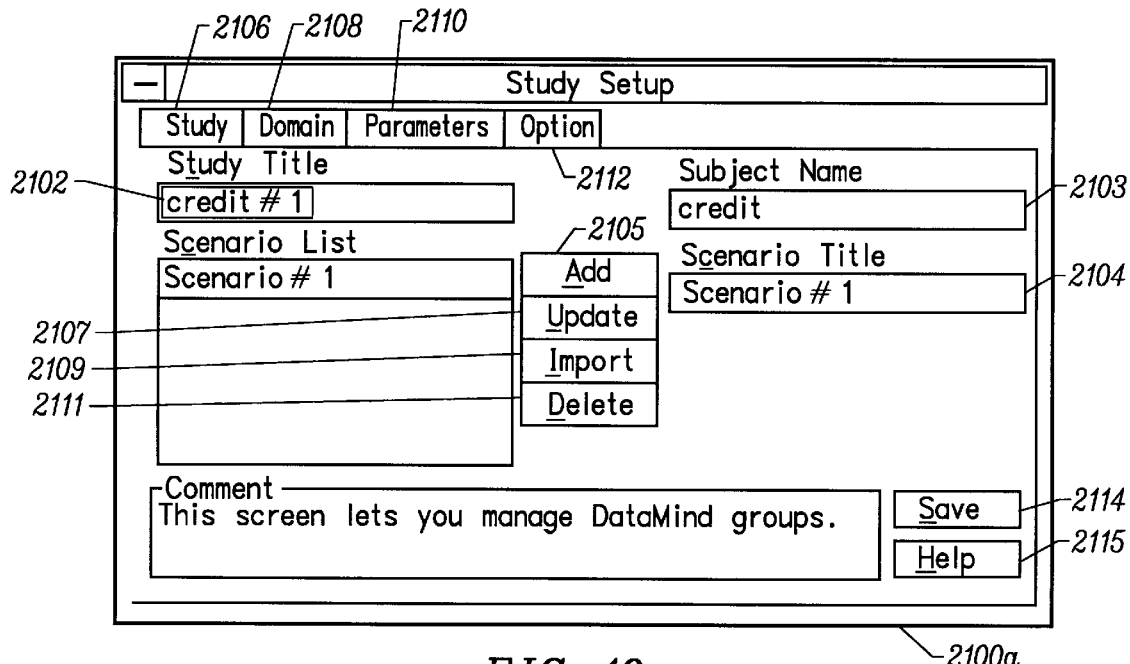

One begins a new Study by clicking on the Study Manager icon button 2002 on the DataMind Toolbar 2001 or by selecting the "Study Manager" from the "DataMind" pull-down menu 2066 from menu bar 2050. An intermediate dialog box (not shown) is brought up affording the user the ability to select an existing Study or create a new one. Thereafter, the dialog box 2100a is brought up as shown in FIG. 10(a). The mode of dialog box 2100a may be set through tab selectors "Study" 2106, "Domain" 2108, "Parameters" 2110 or "Option" 2112. The mode associated with dialog box 2100a is "Study." In this mode, the Subject title 2012 or Domain titles 2014 may be set or changed by the user. Pushing of the "Save" button 2114 in any of these modes will commit all changes made, while "Help" button 2115 will invoke the help utility. With all the necessary information properly specified for all the modes, a study "workbook" will be created under Excel™ containing: (i) a dictionary spreadsheet; (ii) the Drawing Actions spreadsheet; (iii) the Scenario Specification; and (iv) the Population Description.

b. Describing the Domain.

Next, one describes the Domain. A Domain is a set of elements or data rows to which variables are restricted to be used by the data mining tool. In a Study, one may set one of several Domains: (i) the training or Discovery domain; (ii) the Evaluation domain; and (iii) the Prediction domain. Each Domain allows the user to realize a step in the study. As mentioned earlier, a Data Source can be a data file or a database request. It is not important to know exactly the nature of the data. The Data Source simply prompts the data mining tool as to how to obtain the data.

The training or Discovery domain is a historical data set with which the user wishes to base discovery. In a simple Study, under the disclosed embodiment, a training domain is a single database request or a flat file containing the data. For trend analysis study, the Discovery Domain could be composed of several requests or several data sets each representing a step of a trend in the historical data. By default, when the user defines one Discovery domain, the Evaluation Domain is set to the same set. The Prediction Domain may contain as many requests as the user desires, depending on the different predictions the user wishes to make.

Figure 10B:
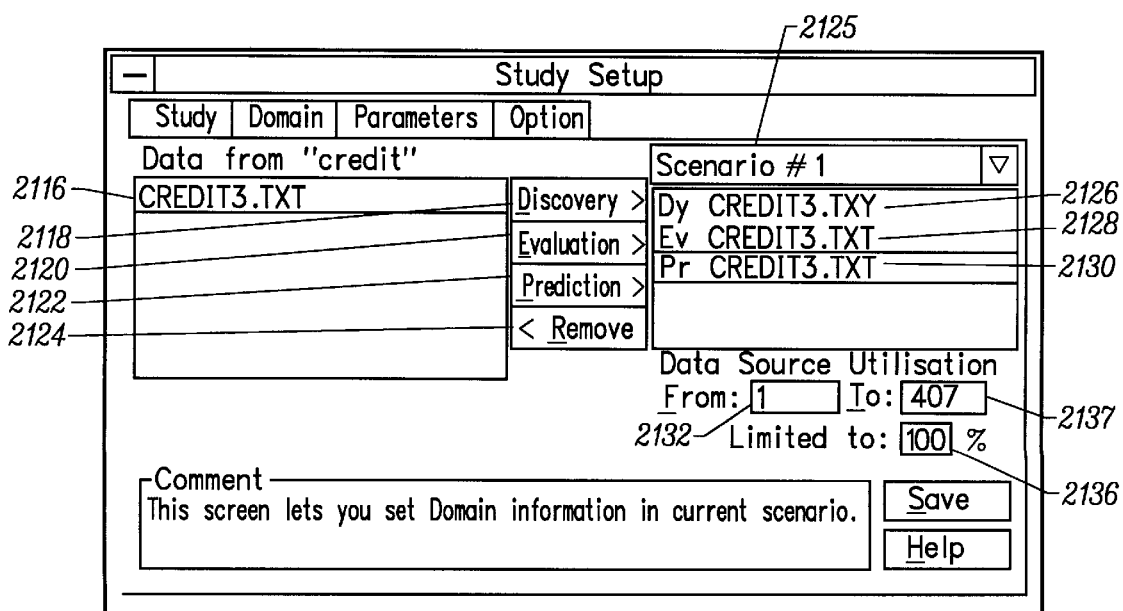

In the "Domain" mode, one has the dialog box 2100b as shown in FIG. 10(b). The user thus selects the data source from the data source list 2116 and presses the Discovery button 2118 to set the Discovery Domain 2126. This data set will be run for the Knowledge Discovery Process to obtain the Discovery Results. Similarly, through use of the Evaluation button 2120 one sets the Evaluation Domain 2128, and the Prediction button 2122 will set the Prediction Domain 2130. Corrections to any of these sets may be made through the Remove button 2124.

Data Source Utilization refers to the range of data to be used from a Data Source. Thus, this may be specified through a lower and upper row range through data entry fields 2132 and 2134, respectively, or through a proportional cutoff as specified through data entry field 2136. In this embodiment, specification of row ranges 2132, 2134 will cause a corresponding readjustment in the display of the proportional cutoff 2136 and vice-versa.

c. Describing the Parameters.

Figure 10C:
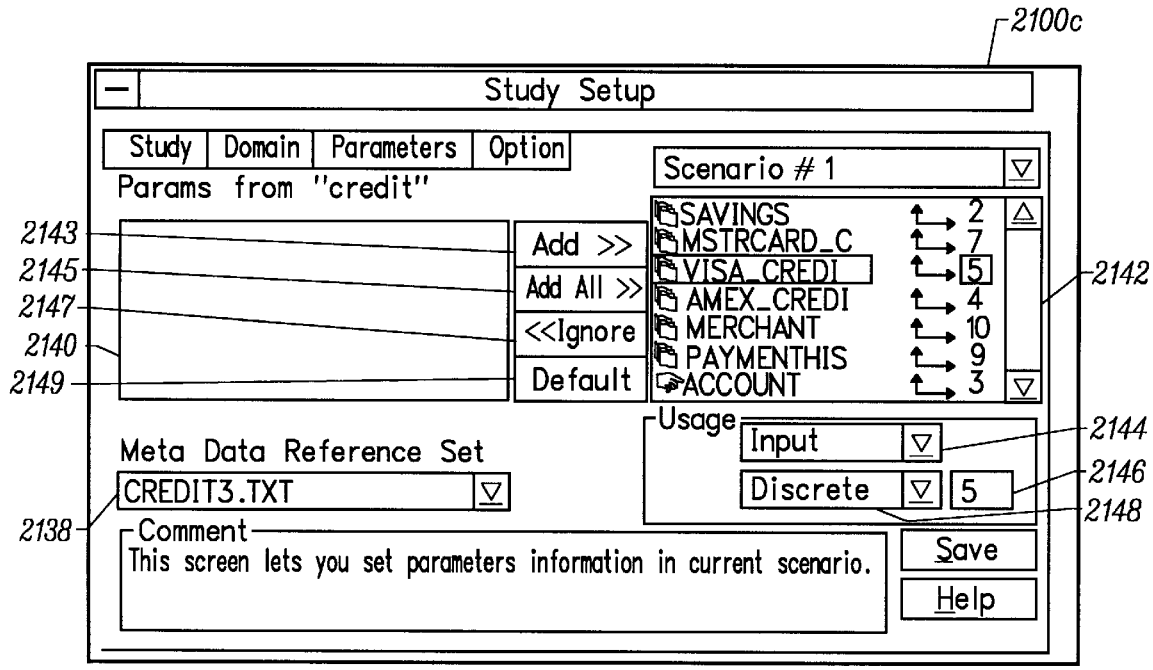

In the "Parameters" mode, one has the dialog box 2100c as shown in FIG. 10(c). Buttons "Add" 2143, "Add All" 2145, "Ignore" 2147 and "Default" 2149 allow the user to switch and remove fields, or Parameters, between data windows 2140 and 2142. The Default button 2149 will set the Parameters in data window 2142 to those not identified as "Ignored." An Ignored Parameter is one deemed not to serve a useful purpose in the Discovery Process, as will later be described.

Pop-up menu 2144 is used to specify any Parameter as input or output. In the present embodiment, at most one output field may be specified as output. This is also called the "Objective" of the Study. For example, the Objective might be to qualify a bank "ACCOUNT" status (e.g., "Balanced," "Overdraft," "VISA Late Payment"). However, it is not necessary to specify an Objective in the disclosed embodiment, the system creating a "virtual" dimension in the Segmentation process described later.

Pop-up menu 2148 allows the user to specify whether a Parameter is discrete or continuous, and if discrete, the number of segments may be entered through data entry box 2146.

As shall be seen, a significant advantage of the disclosed embodiment is that it proposes a default Categorization for continuous Parameters and identification of Ignored Parameters.

(1) Continuous Fields.

A continuous field describes a quantitative dimension (e.g., SIZE, SPEED). It may, in addition, be treated in an equidistant or fuzzy manner. This treatment allows a continuous field to be treated in some senses similar to a discrete field. As shall be seen, if the Categorization is overlapping, a continuous field value might correspond to more than one category segment, which is not characteristic of a discrete field.

(a) Equidistant.

A continuous parameter characterized as equidistant means that it is broken down into several segments of the same length. For example, for numbers between 0 and 50, an equidistant categorization of five segments would be: [0,10], [11,20], [21,30], [31,40], [41, 50], or, if one needs a more refined breakdown, one may have [0,10.0], [10.1,20.0], [20.1,30.0], [31.1,40.0], [41.1, 50.0]. In the disclosed embodiment, equidistant categorization is the default because it is the most frequently used to do pattern discovery in the absence of further information.

(b) Fuzzy.

Fuzzy categorization is another way to categorize a continuous field. Fuzzy means that there are several segments and limits are set out, but each segment overlaps the next. For example, between 0 and 50, a fuzzy categorization of five segments could be: [0,10–15], [10–15,20–25], [20–25, 30–35], [30–35,40–45], [40–45, 50]. Were this a categorization for age groups, it might mean that an 11-year-old belongs "essentially" to the child category [0,10–15], but also for some decisions belongs to the teenager category [10–15,20–25]. The fuzzy categorization introduces another level of difficulty in understanding a decision because the model is less theoretical and needs interpretation both of the Categorization and the Discovery. However, once a user finds confidence in such a Knowledge Model, they are rewarded with a model having more realistic prediction behavior.

(c) Custom.

There is nothing inconsistent with the disclosed embodiment in having any number of custom categorizations. For example, a population distribution exhibiting several peaks might be separated into peak-to-peak regions, or, equivalently, trough-to-trough regions. Similarly, regions may be equidistributed, i.e., selected so that each region have at least roughly equal populations. Fuzzy categorization is an example where categories do not have to be mutually exclusive, i.e., a field value might come under two or more category values.

(2) Discrete.

A discrete field corresponds to a qualitative dimension (e.g., SEX, PROFESSION, CITY). Each possible value has a meaning of its own. A numerical code (e.g., Zip Code) is a discrete field rather than a continuous field because each numerical value means something different in a particular context.

d. Options.

Figure 10D:
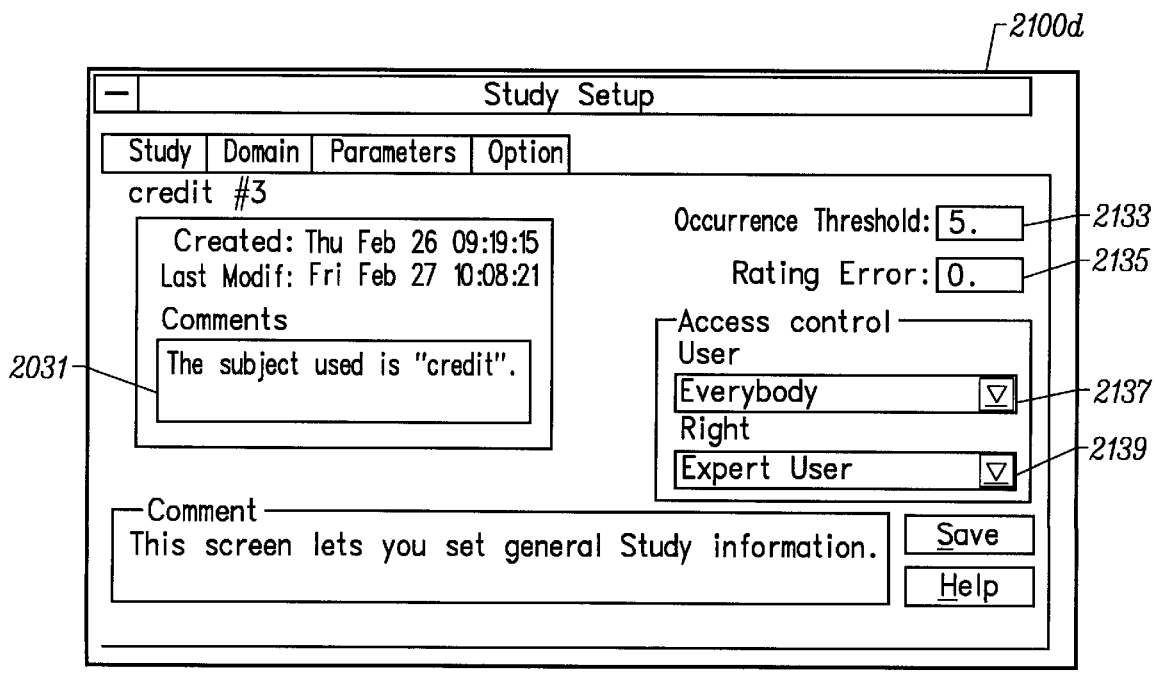

Finally, in the "Options" mode, one has the dialog box 2100d as shown in FIG. 10(d). This allows for a user to add comments 2031, as well as regulate user access 2137 and level of access 2139. The "Occurence Threshold" 2133 allows a user to specify an "active" threshold in the number of occurences of a particular outcome, wherein the occurences are always noted, but not actively taken into account until the threshold is reached. This will prove quite in useful in Incremental Discovery, as shall be seen. The "Rating Error" 2135 is another threshold, this one for distinguishing a "winner" from a "challenger" in Prediction, as shall also be discussed later.

4. Immediate Use of the Study.

Referring once more to FIG. 8, once the Subject(s) and Study have been specified, the Discovery Domain may be reviewed even before the Discovery Process is performed, in order to provide a user an understanding of the nature of the "raw" data. In the disclosed embodiment, this is provided through three utilities: (i) Scenario Specification (icon buttons 2006, 2006'); (ii) Population Description (tab marker 2042); and (iii) Distribution (icon button 2017').

a. Scenario Specification.

Thus, with reference now to FIG. 11, the scenario specification 2080 is shown. It displays the field name 2082, field designation 2084 (i.e., input or output) and type 2086 (i.e., discrete or continuous), the number of values "Nb_Values" 2088, categorization type 2090 (e.g., equidistant or fuzzy for continuous variables), and the minima 2092 and maxima 2094 for the field.

In this example, one can readily see that "ACCOUNT" is the Objective as output variable, with various variables, such as "SEX", "MARITALSTA" (i.e., marital status), "CHILDREN", "OCCUPATION", "HOME", etc., specified as input variables.

b. Population Description.

With reference to FIG. 12, the Population Description spreadsheet 2280 is shown. It shows the field name 2282, field designation 2284, field type 2286, number of values 2288, category or field values 2290, with the category or field value occurrence 2292 shown in addition to the minima 2294 and maxima 2296. In that each category of field value is shown in this spreadsheet, the Scenario Specification spreadsheet just described is a "summary" of the Population Description spreadsheet (2280).

c. Distribution.

Referring now to FIGS. 13(a)–(b), one can see how the charting capabilities of Microsoft® Excel™ are used to display the distributions of data among the Subject variables. Thus, for example, in FIG. 13(a), a histogram 2250 is shown displaying the distribution of frequencies 2260 as a function of the input variable "PAYMENTHIS" (i.e., payment history, expressed in months), broken down, as shown here, into nine discrete values 2251–2259, corresponding to 1–9 months, respectively.

However, for other variables, such as "VISA_CREDI" (VISA™ credit card rating), the distribution may be more suitably displayed as a pie chart 2275 (or histogram or other such familiar graphical construct), as in FIG. 13(b). Thus, with the VISA_CREDI distribution may be readily seen as "very low" 2280, "low" 2281, "middle level" 2282, "high" 2283 and "very high" 2284, with an additional legend 2285 useful for making the association.

It should be well understood by one of ordinary skill in the art how other graphical forms of distribution could be applied.

5. Discovery Process.

The term "Discovery Process" refers to the learning process which allows one to automatically build the study knowledge model from a historical data set in order to use it in a decision process (prediction capability) or for an understanding of a phenomenon (discovery results). The Discovery Process is initiated once the user has accumulated a Subject and created a Study. The term "discovery" is used in place of "learning" because one can have learning systems that are black boxes, i.e., these systems "discover" nothing for the user because they are unable to understand the results. "Discovery" is thus used in the sense that one normally defines it—it is finding out something new, i.e., obtaining knowledge for the first time. The Discovery process extracts from raw data interesting and previously unknown nuggets of information and highlights them.

In the disclosed embodiment, one can associate only one Data Source for the Discovery Domain, which must always be prescribed. For the other processes where one does not explicitly associate Data Sources, the Data Source for the Discovery Process will be associated by default.

When one selects the Discovery icon button 2008 from the DataMind Toolbar 2001, icon button 2008' from the "Drawing Actions" spreadsheet or "Discovery" from the pull-down menu 2066, the embodying application's knowledge discovery process automatically builds knowledge models for both understanding and prediction. The data mining process is quite rapid, but naturally the more data you have, the longer the process. The Discovery Process is a background process that automatically builds a Knowledge Model in the data mining tool environment, based on the Discovery Domain specification. The Discovery Process works well in spite of null or otherwise missing data values. The process duration depends on the volume of data processed and on the PC-network efficiency. The timing appears to be a sublinear function of the number of data rows, given a fixed number of input dimensions. This scaling is a learning curve phenomenon, i.e., once the data population is built up, assuming the data is fairly well-behaved, the results will tend to an asymptote. When compared to statistical, rule induction and neural network approaches, this scaling is very favorable.

As discussed above, a Discovery Domain (set of examples) is taken directly from a data base or a matrix and put under the Discovery Process to build the Study model. In data mining, the reliability of results vary according to the amount and quality of the data. Although there is no minimum or maximum data requirement in this Discovery set, depending on the expertise in a subject, the amount of examples needed for a reliable result can vary. The order of presentation of examples has no influence on the construction of the Knowledge Model. The Discovery set may be sorted or unsorted, as this too has no influence on the Knowledge Model built. There is no "unlearning" phenomena, as is present with neural networks.

In the disclosed embodiment, a small Discovery Domain may be saved in ASCII format and loaded into Excel™. A larger one, which cannot be loaded into Excel™ because of memory requirements, will need to be accessed through ODBC by using the Microsoft® Windows™ ODBC button.

a. Relationship Discovery Report.

The results of data mining are displayed as reports which may be manipulated through the main DataMind Toolbar 2001. Thus, one may obtain, with reference to FIG. 14, the Relationship Discovery Report 2200, as well as other views accessible through the Discovery Toolbar 2220, discussed below. The Discovery Results 2200 shows the conjunctions 2202, input criteria 2204, conditions 2206, frequency 2208, importance 2210 and output 2212 columns.

(1) Output.

The outputs represented by column 2212 are simply the predicted outputs of the Discovery Process. Thus, in this example, the "ACCOUNT" output has three possible results: "Balanced", "Overdraft" and "VISA Late Payment".

(2) Conjunctions.

Conjunctions are fully correlated criteria in that they either appear together or not at all and thus may be treated as one construct. The Relationship Discovery Report 2200 will therefore show the criteria of a given conjunction having the same calculated values.

Thus, in this example, under column 2202, one may note that the criteria "MARITALSTA S" (i.e., marital status single), "HOME rent" (i.e., home is a rental) and "INCOME 4/5" (i.e., income the fourth quintile) are all flagged as "&1", meaning that they all belong to the same conjunction (the first, represented by the "1") and are linked by logical AND's (represented by "&"), as opposed to NAND's, NOT's or other such links.

(3) Frequency.

The frequency, as per column 2208, should be used to decide whether there are enough cases in the training Discovery Domain having this criterion in order to base a decision upon. If the number of occurrences seems too low, the user can rebuild the model with a new scenario definition or a new Discovery Domain. If the frequency is above a substantial threshold, this is a signal to go ahead and compare the importance and the discrimination, as discussed below.

These results may be used to make the kinds of decisions posed by the following questions. Does the one instance of a set of specific criteria represent a potential customer who should be accorded special treatment? A sales group might use this information to justify having a special customer promotion only for a certain number of customers, with incomes about $100,000 and owning three or more vehicles, say. Or, if the sex of the customer is irrelevant to the purchase of Product "A", should the user advertise in sports magazines? In this case, the advertising manager might re-evaluate the costs associated with advertising in magazines whose demographics suggest they are read preferentially by one or the other sex. Other criteria may help the user to define more closely who these target people are.

(4) Criteria.

The criteria used to achieve a certain output result, or are otherwise associated with that result, are shown in column 2204. By default, only the first three input criteria are displayed. However, actuation of "+" buttons 2214, 2216 will display all input criteria, as in this example, for ACCOUNT "Balanced" or "Overdraft," respectively. The output result ACCOUNT "VISA Late Payment" is already shown expanded.

One should note that a "criterion" is a singular concept that the user can manipulate directly in a decision-making process. For example, "PRICE" alone is not what one would normally manipulate to make a decision; rather, one might use "PRICE LOW" and "PRICE HIGH" instead. In this case, "PRICE" is the field, "LOW" is one possible value for the field "PRICE" and "PRICE LOW" is the criterion. It is not necessarily the same as the data presented in the database, instead being regrouped into a more meaningful set of data. As example: with data which refers to children aged between 1 and 3 years, "toddler" could be the criterion.

(5) Minimal Criteria.

The condition column 2206 shows minimal criteria. A minimal criterion is the basic minimal state or set of circumstances necessary for an output, necessary though maybe not sufficient. For example, one must have at least wheels to say something is a car but it is not sufficient because there are many others things besides cars which have wheels. Minimal criteria can be considered as strong constraints which must be satisfied to give the possibility to validate a given output. If a minimal criterion exists for a given output, it needs to be present in any Evaluation or Prediction Domain, otherwise there is an absolute indeterminacy in this output, as shall be discussed in detail below.

One needs to distinguish minimal criteria from systematic criteria. Systematic criteria are criteria that appear to be minimal, but owing to the small number of examples reviewed, there is not sufficient confidence in declaring them minimal. In the disclosed embodiment, this example cut-off is set at 50, but it is clear that there may be circumstances where this cut-off is too low or even too high.

In this example, one minimal condition is shown, the criterion being "CHECKING N" (i.e., no checking privileges) for the output ACCOUNT "Overdraft".

(6) Importance.

The method with which people intuitively rank importance is rarely elucidated. Usually, people do not have clearly in mind the reasoning calculus that they use in the real world to determine the impact of one criteria on a decision. However, everybody is able to rank the criteria by importance level and look at a sorted list to validate a certain importance calculus as similar to their own thinking. Importance is expressed as a numerical value, the higher the number the more important the finding to the output objective (relative to the other inputs). The user can thus interpret importance with the discrimination level to obtain a view of the significance of a result to the Objective.

Importance, as shown in column 2210, expresses the relative impact of a criterion on a decision, i.e., the impact of the input, or the impact of the conjunction to which the input belongs, against the output. Built during the Discovery process, the importance regroups all the Discovery relations such as the specificity (i.e., the more specific the relation is, the higher the impact), the discrimination (i.e., the more discriminating the relation is, the higher the impact is), the noise threshold, the conjunction(s), etc.

Thus, in this example, the importance of the criteria, "Occupation Principal," "Merchant level 8," and "Merchant level 7," is maximal, at 100%, for the output, "ACCOUNT Balanced." In this embodiment, the maximal importance of a criterion is 100% times the number of criteria in the conjunction in which this particular criterion forms part. Thus, the criteria cited in this example are not in conjunction.

b. The Discovery Views.

With the Discovery Toolbar 2220 one can access useful views such as: (i) Conjunctions (icon button 2222), which shows the sub-population of a given profile; (ii) the Specific/Discriminant/Irrelevant Criteria (icon button 2224), the specific, discriminant and irrelevant criteria tied to a particular profile; and (iii) the Decision Impact View (icon button 2226), showing the impact of a single criterion on the objective.

(1) Conjunctions View.

The Conjunction View provides the user with all the strong correlations between the input criteria for a given output. One can thus discover strong correlations between the input criteria for a given output, strong in the sense that they necessarily occur together. With reference to FIG. 15, one can review the conjunction "&1" described above that occurred for the "ACCOUNT Visa Late Payment" output.

(2) Specific/Discriminant/Irrelevant Criteria View.

(a) Specific Criteria.

The list of specific criteria for an output are criteria that are not involved in any other output, and so they are "specific" to this particular output. A specific criterion therefore has a discrimination level which is maximal (i.e., in the disclosed embodiment, 100). Note that conjunctions are not necessarily specific criteria—they occur together, but the conjunction or the individual criteria may have importance for other output values. Furthermore, criteria are specific criteria only to within the tolerance of the Occurence Threshold, meaning that if the number of data records having the same criteria, but different outputs, exceeds the Occurence Threshold, the implicit connection to the other outputs will become recognized and the specificity lost.

Thus, with reference to FIG. 16, the Specific Criteria 2420 are shown for the output ACCOUNT "Balanced". Any possible conjunctions are flagged at column 2041, the name of the criteria at column 2402, the frequency at 2406, importance at 2408 and discrimination at 2410 (as explained above, both, by definition, 100).

(b) Discriminant Criteria.

There is also Discriminant criteria, which also differ from Specific Criteria. A Specific Criterion impacts only one output, while a Discriminant Criterion impacts more on a particular output that the others. "Discrimination" is a way to differentiate "n" things. A discrimination criterion for an object is something pertaining to the object which would make a difference in making a decision. Discrimination is expressed as a numeric value. The higher the discrimination, the more a particular input criteria is discriminating for a given output as compared to other outputs. To understand the influence of a criterion on a decision, one needs to look at both the importance level and the discrimination level. This approach is advantageous as compared with other prior art systems that would require the user to review frequency values for all criteria, in order to ascertain a particular criterion's overall relevance. Here, frequency and discrimination together reveals that at a glance.

If the discrimination is a positive value, the criterion discriminates in favor of the current output and against the other outputs. Conversely, if the discrimination is a negative value, this criterion discriminates for other outputs, and against the current output.

Example: a customer who does not fit within one of the top five customer profiles but who is still judged a very good customer for Product "A" because he owns three cars and the Knowledge Model tells that a person who owns 3 cars is specific to a buyer of product "A". That means that the mere fact of knowing that this customer owns 3 cars tells the user that the customer will not buy product "B" or "C", but only product A. Thus, the criterion "Owning 3 Cars" might not represent a high frequency in the occurences for buying Product "A", but this criterion may discriminate highly in favor of buying Product "A", i.e., the circumstances may not occur often, but when they do, they point strongly to this particular outcome.

Both Specific and Discrimination criteria could have a minor or major impact on a user's decision. Even if minor, focusing a business strategy on a minor criterion but specific (or discriminant) could be a decisive advantage in a competitive market. If the criterion has a major impact, there is no doubt that the user will need to consider this discovery as significant for their investigation.

Once more referring to FIG. 16, one sees that the top Discrimination Criteria 2430 for "ACCOUNT Balanced"

are "INCOME 4/5" (income in fourth quintile), "CHILDREN 2" (two children) and "AMEX_CREDI level 2" (American Express™ Gold card). Additional Discrimination Criteria are exposed through actuation of the "+" button 2414.

(c) Irrelevant Criteria.

The list of irrelevant criteria are criteria which are not involved in a particular output, although they may or may not be important to another output. On the other hand, it may turn out that a criterion which was in former times important has now become obsolete.

Example: The user has been changing the packaging color of their products every year because the user thought that it had a positive impact on the purchase level of their product; now, the Model tells the user that the color is an Irrelevant criterion. The conclusion is that the user should change this practice because they are spending money needlessly.

Referring again to FIG. 16, only the irrelevant criteria 2440 for 'Account Balanced' are listed, there being no sense to attach any calculated values with such criteria.

(3) Decision Impact View.

The Decision Impact View 2226 is particularly useful to see the difference between the impact on the criteria of the decision and the standard data distribution available through other database access tools. Thus, with reference to FIG. 17, one can see the impact 2510 of the criterion "INCOME" 2508 on the Objective ACCOUNT outputs "Balanced" 2502, "Overdraft" 2504 and "VISA Late Payment" 2506. INCOME 2508, as one should be able to verify from FIG. 12, is equipartitioned into five partitions, labelled "1"–5," representing the five income quintiles. Thus, in the example of FIG. 17, the lower INCOME quintiles have a greater impact 2510 on having an ACCOUNT "Overdraft" 2502 than "Balanced" 2504 or "VISA Late Payment" 2506. One could note that the fourth INCOME quintile has the greatest impact of "VISA Late Payment" 2506. The user is reminded that INCOME is part of a conjunction set by the presence of the "&" sign.

6. Using the Model for Evaluation.

Using the model in the Evaluation mode allows one to audit the model accuracy with some testing set, the Evaluation Domain, that may be available. One can either directly analyze the results, one by one, or use the data mining tool to generate an Auditing profile. The accuracy of the model gives one a confidence level in it, either prompting one to further specify one's Study or to investigate interesting but hitherto unexplored areas.

Evaluation, in the sense that one normally defines it, means to compare the expected results with given results. In the disclosed embodiment, the evaluation process is made on a set of data with expected results already defined for each case. For one case, the Evaluation Process consists in submitting each of these criteria to the model, the model propagates this new information in the network and the propagation results are then compared to the expected results.

The Evaluation Process is a background process that takes each record or data row of the Evaluation Domain one after one other, submits it to the Knowledge Model and builds a report with the comparison between the expected results and the model results. The process duration depends on the volume of data to process and on the network efficiency.

As for the Discovery Process, one can specify the Data Source(s) for the Evaluation. This Evaluation Domain is used to evaluate the relevance of the Knowledge Model or the relevance of known data. One evaluates the relevance of a model either when in the process of building a Study, to see if the Knowledge Model has a satisfactory prediction level with known data, or when in the process of using a Study over the course of time to see if the model still yields a satisfactory prediction level.

For example, one might run an Evaluation at the beginning of each quarter after the historical data for the past quarter is posted to a company's database. Since the Knowledge Model is established at a previous time, any deviations from expected results could indicate changes in salient factors, such as the customers or product lines requiring immediate attention. The results would alert the user to the fact that it is time to renew the model because the data population is shifting.

Another purpose for using the Evaluation Process is to evaluate the relevance of data during fraud detection. If one has confidence in one's model, then a difference in the prediction between the model and evaluated data would alert the user to the fact that there is abnormal data. The Evaluation Domain thus helps to decide if a model or the data is correct when the model and data do not seem to be in accord with each other.

One might evaluate the relevance of the Knowledge Model either when in the process of building of a Study (e.g., to see if the model has an acceptable prediction level based on known data); or, if one has been using a given study over time, to see if the model still yields an acceptable prediction level. To judge the relevance of data suspected as being of low confidence, with a model with which one has high confidence, would show up as a difference in the prediction between the model and the data, if the data was indeed abnormal.

a. Operation of the Evaluation Process.

Referring back to FIG. 8, to start the Evaluation phase one clicks either the Evaluation icon button 2010 or 2010' or selects the "Evaluation" item from the Data Mining menu 2050. During this process the user may consult a spooler box (not shown) to examine the progress of this process. The Evaluation Process can only be started if the Discovery Process has already been run, as can be well understood as the Knowledge Model must first be developed. As shall later be understood, the timing of the Evaluation Process is much faster than the Discovery Process.

b. Interpreting the Evaluation.

Once the Evaluation results are available, actuation of the Evaluation Results icon button 2011 or 2011' brings up the Evaluation Report 2700 as shown in FIG. 18. The columns represent the output 2702, success number 2704 and percentage 2706, failure number 2708 and percentage 2710, relative indeterminancy number 2712 and percentage 2714, absolute indeterminancy number 2716 and percentage 2718, and the number of examples 2720. The number of examples 2720 represent those data rows of the Evaluation Domain that fall under the various output values.

(1) Success/Failure Number/Percentage.

The success number 2704 reveals the number of data rows of the Evaluation Domain that successfully follow the Knowledge Model created by the Discovery Process, i.e., where the predicted and actual output are equal. However, it is by looking at the column output 2702 with the corresponding column success percentage 2706, that a user may evaluate the global relevance of the model. In the disclosed embodiment, that would amount to the average of the success percentage per output.

For most studies, a good relevant factor would be indicated by a success percentage greater than 80%. However, depending on the context this relevant threshold may need some adjustment. In the present example, the success numbers for all exceed 80%, the best fit represented by the output ACCOUNT "VISA Late Payment", with success percentage of 97.7%. The final row in the Evaluation Report 2700 represents the weighted average of successes.

By contrast with the success number and percentage, columns 2708 and 2710 reveal the data rows of the Evaluation Domain that fail to follow the knowledge model. Thus, success and failure are completely complementary concepts.

(2) Indeterminacy.

The higher the success percentage, the more the model may be perceived as accurate. However, an unsuccessful result is not tantamount to failure. In some situations, the user may have some trouble giving an absolute answer (i.e., unable to choose between several possible solutions) but that does not make the user wrong. This situation is called the "indeterminate result."

Indeterminacy can occur when one does not have enough information, a situation called "relative indeterminacy". Indeterminacy can also occur even given sufficient information, but where necessary information is missing, what is called "absolute indeterminacy." Relative indeterminacy is indicated as raw numbers in column 2712 and as percentages in column 2714. The absolute indeterminacy is also indicated in raw numbers in column 2716 and as percentages in column 2718. The examples shown here show zero relative and absolute indeterminancy. As will later be seen, changing the Rating Error (accessible through the Study Manager, as shown in FIG. 9(*d*)), can affect whether criteria are determined to be relatively indeterminate.

(3) Hetero- versus Homogeneous Prediction Relevance.

Overall, the most important thing is to maximize a model's relevance in accordance with a Study's purpose. Depending on the purpose, it might be better to have an heterogeneous prediction relevance between outputs with an important success percentage for the group under investigation rather than to have an homogeneous prediction relevance which is less successful for the group—in other words, to be more discriminating in some data ranges than others.

For example, in a particular context it may be considered a better result to predict 84% of people aged between 20–60 and 50% of people between the ages 0–20, rather than to predict 80% overall for the two groups. One thus needs to evaluate the global results against the particular decision needed to be made.

c. Top "N" Profile View.

Recall that in the Relationship Discovery Report 2200 the criteria are displayed in the order of importance level, which means that one directly has the top criteria with the highest importance for a given output value. These top criteria should be distinguished from the Top "N" profile. The top criteria are the most important criteria in terms of impact on one specific decision. The Top "N" criteria are not, taken together, a real profile. For example, a set of minor criteria, taken together, could have more impact (importance) that one major criterion alone. The key is that the importance or impact is a static label for a criterion affixed by the Discovery Domain. One needs another measure, the Excitation Level, which registers the strength a particular data row upon a particular output value. This forms the "best fit" between the data and the predicted result. The Top "N" Profile thus constitutes the best candidates for a particular output.

With reference now to FIG. 19, the Top "N" Profile View 2600 is shown. Thus, for the output ACCOUNT, there are results for "Balanced" 2610, "Overdraft" 2620 and "VISA Late Payment" 2630, with "+" buttons 2615 and 2625 for showing more than the default three profiles for output results "Balanced" 2610 and "Overdraft" 2620, respectively. Thus, the columns represent the variables for this example Study, namely ACCOUNT 2640 (output), presented with the line number of the record 2642, SEX 2643, MARITALS 2644 (marital status), CHILDREN 2645 (number of children), OCCUPATION 2646, HOME 2648, EXPENSES 2650, INCOME 2652, CHECKING 2654, SAVINGS 2656, MSTRCARD 2658 (MasterCard™ rating), VISA_CREDIT 2659 (VisaCard™ rating), AMEX 2660 (American Express® rating), MERCHANT 2662 (merchant rating), PAYMENTHIS 2664 (payment history, in months), with the Excitation Level 2666 and Discrimination 2668. Thus, for example, one can see that the data entry that registered most strongly as ACCOUNT "Visa Late Payment", i.e., had an Excitation Level of 621, has an OCCUPATION of "Professional" and a VISA_CREDIT of "middle level."

d. Study Improvement.

When a user sees fifty prediction results, say, it is quite possible they could synthesize the profile of a good prediction. On the other hand, if the Evaluation Domain contains 5000 records or more, doubtlessly the user would be unable to look at the results and extract an answer from them in semantic terms.

Referring to FIG. 20, the Study Improvement 2800 is shown. It is broken up into Discoveries 2810 and Audit of the Model 2820. Discoveries 2810 comprises "Minimal Relationships" 2814 and Conjunctions 2818. Audit of the Model 2820 comprises the Failure Profile 2830, Success Profile 2840, Relative Indetermination Profile 2850 and Absolute Indetermination Profile 2860. The columns presented are Conjunctions ("N°") 2862, Criteria 2864, description 2866, frequency 2868, output 2872 and scenario (Domain) 2874.

(1) Discoveries.

"Minimal Relationships" 2814 and Conjunctions 2818 should already be well understood in light of previously-described spreadsheets, and thus will not be repeated here.

(2) Audit of the Model.

The auditing section built into the disclosed embodiment analyzes results for the user. The synthesis of the prediction results gives the user another direct abstraction level via the Failure profile 2830, Success profile 2840, Relative 2850 and Absolute 2860 Indeterminable profiles. The user can discover the main criteria which are responsible for good or bad predictions. The Failure profile, for instance, can be useful to improve a Study by changing the Discovery Domain or can be useful to discover abnormal profiles. All these profiles are in fact itself other Discoveries established automatically for the user in the disclosed embodiment.

(a) Failure Profile.

The Failure Profile 2830 is the synthesis of all the failure prediction results in order to give the user a profile of the prediction failures. Thus, one would see the most important criteria which makes the system unable to predict as per expectation. One would also see the conjunctions 2862, the minimal conjunction (e.g., SEX "M", OCCUPATION "Professional", HOME "Own", forming minimal conjunction "&10"), frequency 2868, importance 2870.

The failure predictions represent the "non-reproducible" results, meaning that the model was unable to find the same answer as presented in the data. For example, one can see under column 2872, that with a set of criteria linked to a prediction set having a result of a "ACCOUNT Balanced" profile, the model finds the opposite, the "Bad ACCOUNT Balanced" profile. A non-reproducible result does not necessarily mean that the model used is wrong; rather, the result could have come from a wrong or a non-discriminating Evaluation Domain, the Evaluation Domain (scenario) specified under column 2874.

(b) Success Profile.

The Success Profile 2840 does not indicate success in the sense of "Good" or "Bad". Instead, the Success Profile indicates the frequency 2868 of the results as compared with the model. The profile may indicate several criteria which need to be taken into account for any decision-making regarding successful outputs. For example, if the results indicate 1000 successes from a database of 1 million records, one would naturally want to learn more about the success profile. However, it is unlikely that one would want to look through the 1000 records. One can move to the next level of abstraction by examining these 1000 records by using the interactive simulation, discussed below, to see what is common in these records.

(c) Relative and Absolute Indeterminable Profiles.

As discussed earlier, indeterminacy can occur when one does not have enough information, a situation called "relative indeterminacy". Indeterminacy can also occur even given sufficient information, but where necessary information is missing, what is called "absolute indeterminacy." Sections 2850 and 2860 would indicate, at a glance, such situations occurring within the model. For the particular Evaluation Domain and Rating Error given in this example, no such indeterminacy is apparent.

e. Redefining the Model.

If the proportion of success to failure does not meet expectations, the user may want to redefine the Knowledge Model to screen out a higher percentage of validated outputs. The options thus include the following. First, one can look at the cases that result in absolute or relative indeterminacy, as they may aid in optimization of the Domain. Second, one could take a look to the Audit of the model for the success and failure profile criteria. Third, one could create another Domain to screen for a lower Occurrence Threshold (accessed through the Study setup as shown in FIG. 9(*d*)). Then, one would again run the Discovery and the Evaluation Processes. Fourth, one could rebuild the Knowledge Model with the current Discovery Domain but with a larger Evaluation Domain to verify the model. Thus, one would compare the two Evaluation Domain results.

7. Prediction.

"Prediction", as used herein, means to give the most accurate result for a case for which one does not have a preconception of the expected value. The capabilities of the disclosed embodiment include both batch and interactive Prediction.

a. Batch Prediction.

The Batch Prediction process is a background process that takes each record or data row of the Prediction Domain, one after another, submits it to the Knowledge Model and builds a report with either the Scoring Results for each submitted case, or only the best ones for the Mailing Results. The duration of the process depends on the volume of data to be processed and on the network efficiency, but again, compares very favorably with other methods.

The Batch Prediction process is built upon a set of cases, or data records, the Knowledge Model establishing for each case the propagation results. The Prediction Process is a propagation process of each criterion into the Knowledge Model that yields a result for each different output value with the corresponding discrimination level between them.

Batch Prediction has several uses. It can be used to simulate a decision beforehand in order to implement it effectively. The prediction tries to match the criteria of the potential data set with a predictable decision. Prediction is particularly useful because the results indicate what could happen provided the right conditions. Another use is to simulate a decision with some set of constraints. The Prediction Process is the same but, depending to the way the user selects their Prediction Domain, they may see the influence of one or more constraints on their decision.

Referring back to FIG. 8, to start the Batch Prediction the user has to click either on one of the icon buttons 2013, 2013' or the "Prediction" item from the "DataMind" menu 2050. During this process the user may consult a spooler box to observe the progress of the process. This process can only be started if the Discovery Process is complete. It is not necessary to run the Evaluation process beforehand, though this is tantamount to emphatically trusting the Knowledge Model without testing it first.

(1) Scoring Results.

Now, with reference to FIG. 21, the Scoring Results 2900 is shown. Scoring is the ranking of the output results for the purpose of using them for such activities as, for example, determining which is the best sales campaign to launch. The scoring level 2934 indicates the best candidates profiled in the results. Those scored as best may include candidates in several profiles and are not, therefore, a conventional numeric ranking from best to worst. Scoring in data mining gives the comparison between each possible output result and the discrimination level between them. However, here the discrimination is between predictions, not importances, as shall be seen.

Thus, in the example given here, the results are shown with the now familiar fields SEX 2902, MARITALS 2904 (marital status), CHILDREN 2906 (number of children), OCCUPATION 2908, HOME 2910, EXPENSES 2912, INCOME 2914, CHECKING 2916, SAVINGS 2920, MSTRCARD 2922 (MasterCard™ rating), VISA_CREDIT 2924 (VisaCard™ rating), AMEX 2926 (American Express™ rating), MERCHANT 2928 (merchant rating), PAYMENTHIS 2930 (payment history, months), along with the predicted output ACCOUNT 2932 and the scoring level 2934.

(2) Mailing Results.

With reference to FIG. 22, the Mailing Results 3300 is shown. Mailing is useful to extract a target group (corresponding to one output value) classified by scoring level. The results indicate what could happen to each record (corresponding to the target group in the Prediction Domain) based on the experience (the historical data or Discovery Domain).

Thus, in the example given here, the columns appear identically as in the Scoring Results, with fields SEX 3302, MARITALS 3304, CHILDREN 3306, OCCUPATION 3308, HOME 3310, EXPENSES 3312, INCOME 3314, CHECKING 3316, SAVINGS 3318, MSTRCARD 3320, VISA_CREDIT 3322, AMEX 3324, MERCHANT 3326 and PAYMENTHIS 3328. With the Mailing Results 3300, however, the prediction of the output ACCOUNT 3330 is specified by the user, here as "Balanced", and the rows are thus ordered by the scoring level 3332.

The user may thus cut off the results at an appropriate scoring level and submit the chosen records to a conventional mail merge utility (hence the name "Mailing Results"), as for example, to contact those persons predicted to have an ACCOUNT "Balanced", such as to propose some marketing offer.

b. Interactive Prediction.

The Interactive Prediction Result is a classification for one case only, of all the possible results with the percentage of discrimination between the different possible outputs. Normally, in a decision process, one evaluates all the alternatives and decides on one among them evaluated as being the best answer. For this reason, in the disclosed embodiment, the Interactive Prediction Result presents the users with all the possible answers (the winner, the challenger, the second runner up, etc.).

Thus, before making a decision, the user is urged to examine the discrimination percentage between the winner and the challenger. Depending on the context, a user may wish to reach a decision for each submitted case by selecting the winner even if the difference between the two top answers is very small. In this case, there is no need to look at the discrimination percentage between the winner and the challenger. If the difference between the winner and the challenger is too close, then one should not rely uniquely on the winning answer. "Too close" is in general, five percent or less, but this threshold may vary depending on the problem and the data.

With reference now to FIG. 23(a), one sees the Interactive Simulation dialog box 2950. Thus, a record for prediction is displayed in window 2960, showing field name 2964 and field value 2966. Selection of the appropriate field in window 2960 allows modification through data entry field 2954. Button 2962 permits interruption of the simulation. The simulation is activated by button 2956. Thus, one can use data selection field 2952 to select the winner ("Best") or the challenger for each output result as indicated by subfield 2951. Shown here is the winner for output result 2953 ACCOUNT "Overdraft", with a prediction score 2955 of 566, a validation flag 2957 indicating validation ("V") and a confidence level 2959 of 15%.

The definition of confidence level shall be discussed later, but for purposes here, relates to the winner-challenger spread. Button 2958 accesses the Simulation Influence dialog box 2975, shown in FIG. 23(b). Thus, one sees the ranking of each criterion 2976, the importance 2978, the identification of conjunctions 2980 (here a minimal conjunction indicated by "Nez") and the criterion name 2982. Thus, one can see that the most important criteria was a payment history of zero months (PAYMENTHIS 0), with an overall importance of 93%.

8. Overall Use of the Disclosed Embodiment.

Thus, the disclosed embodiment demonstrates a data mining tool that can be used throughout the entire data mining process. One starts by taking a snapshot of the data from one or more Data Sources, possibly performing some initial spreadsheet analysis. This "lay of the land" view may give the user a sense of the potentially relevant Parameters, an Output Parameter with which to judge results, and Input Parameters that may have "impact" on such an Output Parameter. Thus, by establishing a Discovery Domain out of the Data Sources examined and specifying the appropriate Parameters, a Discovery Process may be run to produce the Knowledge Model, and thus the relative significance of the Parameters may be discerned. This Knowledge Model may be then evaluated for accuracy through an Evaluation Domain. If the accuracy is judged acceptable, the Knowledge Model may be turned over to Prediction Domains for scoring predictions. Over the course of time, it may become necessary to re-evaluate the Knowledge Model. The new Evaluation Domain may represent a more comprehensive Data Source, as, for example, integrated over a longer time scale, or otherwise. If the accuracy of the Knowledge Model is then judged not sufficiently accurate, one could do either: (i) create a new Knowledge Model; or (ii) augment the old Knowledge Model. As far as it is known, prior art systems have only offered the first option, namely to relearn from the start. The second option is available through the Incremental Discovery ability of the present invention, to be discussed later.

B. Implementation of the Disclosed Embodiment for Data Mining.

Now that the user-apparent features of the disclosed embodiment are understood, it is possible to discuss the implementation of this embodiment. The overall block level view of the implementation of the disclosed embodiment is shown in FIG. 24. The data mining system 3000 comprises a Study manager 3010, Discovery Manager 3020, Evaluation manager 3030, Prediction Manager 3040, neuroagent engine 3070, memory 3050, optionally an ODBC 3060, user interface 3070, spreadsheet compilation unit 3080, spreadsheet application 3090 and spreadsheet interface 3095.

The Study Manager 3010 controls the Study, Subject and Domain creation, modification and maintenance processes.

The Discovery Manager 3020 performs the Discovery Process, producing the Discovery Results and Conjunctions, Specific/Irrelevant Criteria, and Decision Impact Views.

The Evaluation Manager 3030 performs the Evaluation Process, controlling the Top "N" Profile, Audit, Interactive Prediction and Batch Prediction features.

The Prediction Manager 3040 performs the Prediction Process, controlling the Batch and Interactive Prediction features.

The memory 3050, which may be random access memory and/or disk storage, is for the storage of data and instructions, which may include Domain data stored in ASCII format 3052 as well as statistical meta data 3055 and population meta data 3056 created by the Study Manager 3010. Domain data may be supplied alternatively by an ODBC 3060.

The neuroagent engine 3070 is what creates and manages the Knowledge Model, the neuroagent network necessary to perform the data mining based on the Study established by the Study Manager 3010 and used by the Discovery 3020, Evaluation 3030 and Prediction 3040 Managers.

The user interface 3080 allows the user to interact with the application 3000 and may include a display screen, keyboard, mouse, printer, or other such peripherals. The spreadsheet compilation unit 3084 prepares most tabular data created by the system 3000 for display. The graphics compilation unit 3088 prepares most graphical data created by the system 3000 for display.

The spreadsheet application 3090, which in this embodiment is Microsoft® Excel™, takes the tabular data from spreadsheet and graphics compilation units 3084, 3088 and displays it through the user interface 3080, as well as allowing the standard spreadsheet operations to be performed. The spreadsheet application 3090 communicates with the rest of the system 3000 through the compilation units 3084, 3088, which in this embodiment is the standard Visual Basic™ interface, created and promulgated by Microsoft Corp. The Visual Basic™ interface is well documented and so the exact methodology of passing spreadsheet information to the spreadsheet application 3090 need not be discussed here. Needless to say, the data mining system 3000 is launched by the spreadsheet application 3090 as a Microsoft™ Excel™ macro program, this macro making dynamic link-library (DLL) calls into the Study Manager 3010, Discovery Manager 3020, Evaluation Manager 3030 and Prediction Manager 3040. It is readily apparent to one of ordinary skill in the art that an alternative embodiment could have implemented system 3000 as a "standalone" application, rather than as an add-on application. Implementing system 3000 as an "add-on" takes advantage of the existing installed user base of the Excel™ application. Implementing tabular and graphical displays are well known in the art and so the mechanisms for implementing such features need not be described here.

The Study Manager 3010 performs all the initializing tasks associated with data mining, namely, the creation and administration of Subjects, Domains and Studies (accessed through the Subject Administration 2003, Study Manager 2002, Study Setup 2005, Save Study 2004 and Close Study 2007 icon buttons as shown in FIG. 8). As described earlier, a Subject includes a set of Data Sources incorporated in Domains. In this embodiment, Data Sources may be stored in memory 3050 or, alternatively, accessed through an ODBC connection 3060.

As shown here, the Domains of a Subject are stored in memory 3050 as the Discovery Domain 3052, the Evaluation Domain 3053 and the Prediction Domain 3054, corresponding to the processes performed by the Discovery 3020, Evaluation 3030 and Evaluation 3040 Managers. The user interaction involving the selection of Subjects and Domains were described in great detail earlier, and as it would be obvious to one of ordinary skill of the art how to implement these dialog boxes involved, the mechanics of such code shall not be described here.

1. Meta Data Construction Process.

Before data mining can truly proceed, the Study Manager 3010 needs to examine the "landscape" of the Discovery Domain. The derived information from this process is termed "meta data." The Study Manager 3010 thus takes the Discovery Domain 3052 and constructs the Statistical Meta Data 3051, which with reference to FIG. 25, proceeds as follows from step 3200. As shall be seen, the purposes of building the Statistical Meta Data 3051 is to gather the population statistics of the various parameters, as well as identify parameters that should probably be ignored during the Discovery Process. Starting with the first field or Parameter of the Discovery Domain, the maximum, minimum, number of distinct values, and the number of null entries are evaluated at step 3204. When the Data Source used is accessed through ODBC, this can be accomplished readily through SQL source statements, such as max(field), min (field), count(distinct(field)), or "count(*) where field is NULL". The implementation for processing field data contained in ASCII files is straightforward as well. In the case of null values, it can be appreciated by someone of ordinary skill in the art that Data Sources may represent null values by special numerical values, which are distinguished from zero or other legitimate field values. This may be carried over into the meta data tables, the only concern being to reconcile the null value representations of disparate Data Sources.

A cut-off, "M", in the number of distinct field values is tested for in step 3208. In this embodiment, the cut-off, M=100, but could certainly be adjusted for specific applications. One reason for having a cut-off is to put an upper bound on the memory constraints imposed by the table construction steps described below. Another reason is to identify fields whose distribution is so broad that they may serve either as identification criteria or should be categorized. An identification criterion (e.g., ID number, telephone, address) is a criterion that help may help the user to identify a group of other criteria (e.g., customer, product) but this criterion is known not to be useful to qualify the data. Identification criteria are ignored during the Discovery Process but are displayed in the Mailing Report, for instance, as Identifiers for the record. Criteria to be ignored may even be explicitly flagged so in the Domain.

A positive result in the cut-off test is followed by the setting, at step 3212, of the number of unaccounted values, "OTHER", which is the difference between the total number of field values and the cut-off, and thus the number of values accounted for, "NB_VALUES," is set to the pre-imposed cut-off.

A negative result in the cut-off test is followed by the setting, at step 3216, of "OTHER" to zero and "NB_VALUES" to the total number of field values, i.e., there are no unaccounted values.

Whatever the result of the cut-off test, a statistical meta data table is created at step 3220. In the disclosed embodiment, this is a two-columned table, with the number of rows exceeding NB_VALUES by two, the extra two rows provided for the "OTHER" and null values.

Thereafter, a loop is set up at step 3224, with an index "i" used to cycle through the rows of the statistical meta data table. The "i-th" row is set to the i-th field value and the count of the i-th field value's appearances in the Discovery Domain.

A test is performed at step 3228 as to whether the count of the i-th field value is greater than one. If so, under this embodiment, the field is removed from consideration as an "Ignored Parameter" at step 3232. Ignored Parameters are not participant in the Discovery Process. This test operates by default, and Parameters presented as "ignored" (shown in the left hand window 2140 of the "Parameters" view 2100c of the Study Setup, as was discussed in the context of FIG. 9(c) above) can be overridden by the user.

Regardless of the result of the test performed at step 3228, a check of whether the loop index "i" has reached its maximum value, "NB_VALUES", with a failed check resulting in an increment of the index and loop back to step 3224; otherwise, the process continues (through connectors 3240, 3240').

The next step 3244 involves the setting of the last two rows of the statistical meta data table. The next-to-last row records the count of null field values as "BLANK", and the last row records the "OTHER" unaccounted field values.

At this point, step 3248, the statistical meta data table is written to a file with extension *.STT. Clearly, in an alternative embodiment, where there is ODBC access, one could contemplate this table being created and maintained in a database form, rather than created in memory and written to a flat file. For example, the meta data tables could be formed and maintained within a Data Warehouse.

The following steps involve the population meta data table. The first step 3252 involves a test whether the field is continuous, or whether the user has specified the field should be categorized (accomplished, as was seen in FIG. 9(c), through controls 2146 and 2148 of the Parameters view 2100c of the Study Setup).

If the decision to "categorize" is not taken, a population meta data table is created at step 3256. It is filled with the values of the first NB_VALUES rows of the statistical meta data table and then extended to explicitly incorporate the "OTHER" values passed over in the statistical meta data table. The population meta data table has an additional column permitting a pointer to a neuroagent, representing the value of that row, to be stored.

If the decision to categorize is taken, a population meta data table is also created, at step 3260, with at least three columns and "N+2" rows, where N is the number of "bins" into which the field is distributed. By default, the field is spread among five equidistant bins, although this can be done in an equidistributed (equally populated) or fuzzy distributions as well. Equidistant (and fuzzy) distributions require the calculation of the minima and maxima of the field's distribution in order to calculate the bin sizes. Thus, the range calculations for the bins are performed at step 3264. The first "N" rows of the population meta data table can thus be filled with the range of each bin, and the count of values falling within that range. In this embodiment, for fuzzy or other overlapping distributions, the count for each of multiple bins that a data point may map onto will be incremented by one, rather than some fractional membership in each. Again, a pointer to the neuroagents corresponding to each of the N+2 bins will be stored in the appropriate row. Thus, it should be recognized that, in general, there is a one-to-one correspondence between neuroagents, criteria, and categorized bins. In the case of fuzzy logic, a single field value may of course correspond to multiple criteria and neuroagents.

Regardless of whether fields are categorized or not, information about the field is stored as a Model Header in step 3272. In this embodiment, for a Data Source that is an ASCII text file, the Model Header is prepended to that file. If the Data Source is obtained through the ODBC, then the Model Header is prepended to the Statistical Meta Data File.

Next, the population meta data table is stored to a file with extension *.MDH in step 3276. This is followed by a test, at step 3280, of whether any more fields in the Discovery Domain need to be dealt with. The presence of more fields prompts the whole process to be repeated from step 3204 (through connectors 3284, 3284') with the immediately succeeding field. Otherwise, the process terminates at step 3288.

It should thus be readily apparent to one of ordinary skill in the art how the Scenario Specification 2080, Distribution 2250, 2275, and Population Description 2280 spreadsheets (shown in FIGS. 11, 13(*a*), 13(*b*) and 12, respectively) are built up. The Scenario Specification 2080 and Population Description 2280 spreadsheets, in fact, use the statistical meta data tables before the Discovery Process, and the population meta data tables after the Discovery Process. This choice was motivated, at least in part, by a desire to reduce the pre-Discovery Process overhead. If a user decides at some point to re-categorize the Discovery Domain, only steps 3252 onward need to be repeated in order to create a new population meta data table, i.e. the entire Discovery Domain need not be reviewed again. Apart from their role in Categorization, the meta data tables are used for verification of a new Discovery Domain before proceeding with Incremental Discovery, and to retrieve possible field values in the Interactive Simulation dialog (these values appearing in drop-down menu form under field entry area 2954 in FIG. 23(*a*)).

2. Neuroagent Network Construction.

With reference to FIG. 26, the process of building up the neuroagent networks is shown, beginning at 3100. It should be noted that in this embodiment, neuroagents are created and initialized as they are needed, meaning that if and until a data row calls for a particular neuroagent, there is no valid pointer in the population meta data table. One could certainly envision another embodiment where all the possible neuroagents are initialized up front. In the example discussed above (refer to FIGS. 10, 11 and 13), output neuroagents would be created, as needed, for "ACCOUNT: Balanced", "ACCOUNT: Overdraft" and "ACCOUNT: VISA Late Payment". Input neuroagents would be created, as needed, for "SEX: M" and "SEX: F", i.e., sex male or female, for marital status "MARITALSTA:" as "M" (married), "S" (single), "W" (widowed), and so on. For a categorized input field such as "INCOME", with a maximum of 8975 and minimum of 2004, the five bins (by default), and hence Input Neuroagents, would be "1" [2004, 3398.2), "2" [3398.2, 4792.4), "3" [4792.4, 6186.6), "4" [6186.6, 7580.8), and "5" [7580.8, 8975]. The categorization is obtained using the meta data construction process just described.

The starting assumption, effective for the first row of data, is that all Input Neuroagents validated by the data in that row are always present, in other words, one has a "minimal" neuroexpression of all expressly validated neuroagents operating on the Minimal Excitation Zone of the Output Neuroagent 3120. In other words, if the data of the first row fits into a particular bin categorization among the Input and Output Parameters:

$$\text{input}_1 \epsilon (i_1, i_2, \ldots, i_k); \text{output}_1 \epsilon O_j \qquad (\text{Eq. 14})$$

then the minimal neuroexpression is the following:

$$E_{mezj}^{(1)} = n_{i_1} \& n_{i_2} \& \ldots \& n_{i_k} \qquad (\text{Eq. 15})$$

This, is of course, an unrealistic assumption in the long run, but it is a starting basis of the network construction. Validation in this context means that the field value falls into the neuroagent's bin. Similarly, Inhibition in this context means that the field data is either unspecified (null or missing) or falls outside the neuroagent's bin.

For a subsequent row, if the output is different, say, "ACCOUNT: VISA Late Payment" instead of "ACCOUNT: Balanced", tested at step 3125, a new minimal neuroexpression must be constructed corresponding to this Output Neuroagent by returning to step 3120. Otherwise, a subsequent row is matched against the existing neuroexpression (s) at step 3130. If the neuroagents in a particular existing neuroexpression are not all simultaneously validated or inhibited 3130, that neuroexpression should be broken up into a "common" neuroexpression 3140 and a "non-common" neuroexpression 3150. The common neuroexpression is composed of those neuroagents of the original neuroexpression that remain validated, while the non-common neuroexpressions are formed from either those neuroagents of the original neuroexpression that were previously validated but are here inhibited, or those neuroagents never before validated. For the minimal neuroexpression, the common neuroexpression remains connected to the Minimal Excitation Zone, i.e., the common neuroexpression becomes the new minimal neuroexpression. The non-common neuroexpression in all cases becomes connected to the Contextual Excitation Zone. Neuroagents previously inhibited that are validated at this step are grouped into another neuroexpression and connected to the Contextual Excitation Zone. The break-up of neuroexpressions other than the minimal neuroexpression proceed analogously, with the exception that both the common and non-common neuroexpressions are connected to the Contextual Excitation Zone. In other words, after the process has proceeded up to a certain row, with a minimal and set of contextual neuroexpressions, respectively of:

$$E_{mez,j}^{(m-1)}, E_{cezj,k}^{(m-1)}; k=1, \ldots M(m-1) \qquad \text{(Eq. 16)}$$

where M(l) is the number of contextual neuroexpressions after the l-th iteration, and forming a neuroexpression out of the validated neuroagents for this next row, also, for the sake of argument, having output $O_j$:

$$\text{input}_m \epsilon (i_1^{(m)}, i_2^{(m)}, \ldots i_{K(m)}^{(m)}) \qquad \text{(Eq. 17)}$$

$$E_j^{(m)} = n_{i_1}^{(m)} \& \ n_{i_2}^{(m)} \& \ \ldots \& \ n_{i_{K(m)}}^{(m)} \qquad \text{(Eq. 18)}$$

therefore, common neuroexpressions may be formed from the intersections with this new neuroexpression; the differences with the new neuroexpression form new contextual neuroexpressions; as well as a residual neuroexpression formed by the remaining unallocated neuroagents of the new neuroexpression, this process overall termed a fusion of the neuroexpressions:

$$E_{mez,j}^{(m)} = E_{mez,j}^{(m-1)} \cap E_j^{(m)} \qquad \text{(Eq. 19)}$$

$$E_{cez,j,k}^{(m)} = E_{cez,j,z}^{(m-1)} \cap E_j^{(m)}; \quad k = 1, \ldots, M(m-1)$$

$$E_{cez,j,M(m-1)+k}^{(m)} = E_{cez,j,k}^{(m-1)} \setminus E_j^{(m)}$$

$$E_{cezj,2M(m-1)+1} = E_{mez,j}^{(m-1)} \setminus E_j^{(m)}$$

$$E_{cez,j,2M(m-1)+2} = E_j^{(m)} \setminus \left( E_{mez,j}^{(m)} \bigcup_{k=1}^{2M(m-1)+1} E_{cez,j,k}^{(m)} \right)$$

If there are more data rows, as decided at step 3160, the next row is considered and the process repeated beginning at step 3125. It is clear that the whole process can be performed among a plurality of Data Sources, i.e., when rows from one Data Source are exhausted, another Data Source could be accessed. This continued network construction could proceed immediately, or put off to a later time.

The ability to pick up Knowledge Model construction where it was left off is called Incremental Discovery. Work with multiple Data Sources certainly requires that their respective Categorizations be comparable. If the data populations of Data Sources differ markedly, it may be necessary to recreate the meta data information, whose formation was as discussed above. For example, the new minima or maxima may be outside the original bin ranges, so that one of the following procedures is merited.

Where the new maximum or minimum is not too far outside the original bin range, it may not be a terrible assumption to remap values outside the original bin range to the closest of the minimum or maximum. Otherwise, one or more new neuroagents may be initialized corresponding to the expanded regions, with training only needing to be performed with those outlying field values. Furthermore, if the outlying values are few and unrepresentative, they might simply be ignored. This approach could work with a predetermined upper tolerance triggering a user alert, if for example, the outlying population grew too large, prompting the user as to whether the categorizations should be realigned, and thus the neuroagent network construction started anew.

In the final step, importance may be calculated 3170 in accordance with (Eq. 13), thereby terminating the process 3180. It is at this stage that the Occurence Threshold comes into play (set through data entry area 2133 as in FIG. 10(*d*)).

No matter how few the number of data points pointing to the connection of a particular neuroexpression to a particular Output Neuroagent, i.e., no matter how small the value of $N(E_i|O_j)$, the topological connections are made; however, if the number is less than the Occurrence Threshold, the value of $N(E_i|O_j)$ is considered zero for the purposes of (Eq. 13) and propagation along such connections will be prohibited. If a subsequent Incremental Discovery brings $N(E_i|O_j)$ over the Occurence Threshold, the number is taken into account for the importance calculations and this "muting" of the connections is ended. It should be noted that the other threshold defined in (Eq. 13), namely the Significant Threshold, ST, in this embodiment is taken as zero.

3. Discovery.

Having constructed the neuroagent network and calculated impact (importance), the conjunctions, the discrimination, the specificity or irrelevancy may be evaluated, as shall now be discussed. Therefrom, it will become readily apparent to one of ordinary skill in the art how the Relationship Discovery Report 2200, Conjunction Profile 2300, Specific/Discriminant/Irrelevant Criteria Profile 2400 spreadsheets, as well as the Impacts View 2500 (as shown in FIGS. 14, 15, 16 and 17, respectively), are created.

a. Conjunctions and Minimal Conditions.

Once the neuroagent network is constructed during the Discovery Process, it is a simple matter to identify the neuroagents remaining in the neuroexpression, $E_{mez,j}$, connected to the Minimal Excitation Zone of a given output neuroagent, $O_j$. This is the "minimal" neuroexpression, each of the component neuroagents thus representing the minimal criteria for the particular output. Similarly, each of the various neuroexpressions, $E_{cezj,i}$, i=1, . . . , M(n), attached to the Contextual Excitation Zone of a given output neuroagent $O_j$ represent non-minimal criteria that are in conjunction. Each of these conjunctions can thus be ordered by importance, with each of the component input neuroagents marked as being part of the i-th conjunction by "&I". Thus, for a given conjunction, the component criteria, when present at all, are present together.

b. Importance.

The importance (or impact) of a criterion corresponding to input neuroagent $n_k$, is simply the connection weight, w, of the conjunction neuroexpression, $E_j$, that it belongs to, as calculated in accordance with (Eq. 13). As the connection weight is based on a probability, it is clear that the maximal importance is 100%.

c. Frequency.

The frequency, simply stated, is the number of examples where a criterion was present, for a given output. Thus, for input neuroagent $n_k$ and output $O_j$, with the neuroagent belonging to neuroexpression $E_i$, the frequency is the ratio of occurrence of the neuroexpression $E_i$ in the presence of $O_j$ to the occurrence of $O_j$ overall, i.e., $N(E_i|O_j)|N(O_j)$. It is thus clear that for a minimal criterion, this frequency is necessarily 100%. It should also be clear that the sum of the frequencies of a given criterion across all outputs should not necessarily add to 100%, as the frequency is measured only for a given criterion against a given output, not all outputs.

d. Discrimination.

As was discussed above, discrimination characterizes how a particular input criterion is "discriminating" for a given output as compared to other outputs. One should first understand that for a given input neuroagent $n_k$, the neuroexpression it belongs to, $E_{k,j}$, may vary according to the output $O_j$ under consideration, hence the two indices (k,j) used here. Thus, there would be associated connection weights:

$$w_{j,k} = w(E_{j,k}, O_j) \quad \text{(Eq. 20)}$$

from which one could seek to construct some form of discrimination function. In the embodiment described here, if for a given neuroagent $n_k$ there is an output, $O_w$, with the highest importance, $w_{w,k}$, the "winner", defined by:

$$w_{w,k} = {}_j^{max} w_{j,k} \quad \text{(Eq. 21)}$$

and a "challenger" output, $O_c$, with importance defined by:

$$w_{C,k} = \max_{j \neq W} w_{j,k} \quad \text{(Eq. 22)}$$

then a discrimination function could be defined by:

$$D_{j,k} = w_{j,k} - \begin{cases} w_{C,k}; & \text{if } j = W \\ w_{W,k}; & \text{otherwise} \end{cases} \quad \text{(Eq. 23)}$$

Thus, under this embodiment, only the winner's discrimination is non-negative, although it can certainly be zero if the challenger's importance matches the winner's.

One could certainly contemplate other discrimination functions, including taking the difference between the importance and the average of the other importances, or even a weighted average of importances. Their ability to discriminate will differ, of course, but may find particular applications, such as to resolve situations where there is a bunching rather than a spreading out of importances.

e. Specificity and Irrelevancy.

As was described above, a specific criterion is one that is not involved in any other output, thus "specific" to a particular output. Under this embodiment, a specific criterion will thus be revealed by a discrimination level that is maximal (i.e., 100), because all importances, aside from the of the winner, will be zero. The irrelevant criteria will show up as having zero importance for a given output.

4. Evaluation Manager.

As was discussed above, the Evaluation Process takes each record of the Evaluation Domain one after one other, submits it to the Knowledge Model (neuroagent network) and builds a report with the comparison between the expected results and the model results. Thus, it is a matter of evaluating, the excitation levels, $el_j$, of the various validated output neuroagents, $O_j$, in accordance with (Eq. 1). The winning excitation level, $el_w$, is that neuroagent with the highest excitation level. This, in conjunction with the discussion immediately following, renders it straightforward for one of ordinary skill in the art to implement the Evaluation Report 2700, Top "N" Profile 2600, and Study Improvement 2800 (respectively, FIGS. 18, 19 and 20) spreadsheets.

a. Failure, Success Numbers.

If the "winning" excitation level corresponds to the actual output, the evaluation was a success. If this is not the case, the evaluation was a failure. Thus, success numbers and failure numbers can be defined, respectively, as the raw numbers of evaluations that were successes or failures, for a particular output.

b. Indeterminancy.

Recall that having a winning excitation level is premised on there being at least one validated output neuroagent. If none of the output neuroagents are validated, then this situation is what has been referred to previously as absolute indeterminancy. This may occur, for example, if a minimal criterion was not satisfied. If, on the other hand, there are at least two validated outputs, with a challenger excitation level, $el_c$, corresponding to the next-highest excitation level, after $el_w$, the winner, and the confidence level, CL, satisfies the following inequality:

$$CL = \frac{el_W - el_C}{el_W} < R \quad \text{(Eq. 24)}$$

where R is the Rating Error (accessible to the user through field 2133 of the Study Setup as per FIG. 9(d)), this situation corresponds to what has been referred to as relative indeterminancy. In other words, to within some tolerance, there is no clear "winner" among the results. It is thus evident that raising R to some point will cause relative indeterminancy to set in. The trivial case of having only one validated output is, by convention, not considered a case of relative indeterminancy. This is equivalent to considering $el_c$ to be identically zero, so (Eq. 24) is not satisfied.

The numbers of results which are absolutely or relatively indeterminate may therefore be readily calculated.

5. Prediction Manager.

The primary responsibility of the Prediction Manager is to take the results of Prediction Domain and present the predicted outcomes. As was stated above, this takes the form of presenting the score, where scoring is the comparison between each possible output result and the discrimination level between them. Hence, for each record or data row "j", the excitation level, $el_{j,k}$, for each output neuroagent $n_k$ is measured. The score, $S_j$, is obtained by calculating the discrimination, not between importances, but between excitation levels thus:

$$S_j(el_{j,W} - el_{j,C}) \times \begin{cases} -1; & \text{if } j \text{ indeterminate} \\ 1; & \text{otherwise} \end{cases} \quad \text{(Eq. 25)}$$

where $el_{j,W}$ and $el_{j,C}$ are the winning and challenger excitation levels, respectively. The sign factor of +1 is introduced to flag any states of relative or absolute indeterminancy, and is used to distinguish a "good" prediction from a "bad" one, in the sense where a predicted result is not indicated strongly enough.

6. Specialized Discoveries.

a. Segmentation.

Recall in the discussion earlier that up to one output Parameter may be specified. There is a variation of the Discovery Process where no output Parameter is specified, called Segmentation or "output-less" Discovery. With reference to FIG. 27 the process begins at 3400 as follows. Given a Discovery Domain without specified output Parameter, a fictitious Parameter, "NORM" is created having only one nominal value ascribed to the entire Discovery Domain, at step 3404. Next, a neuroagent network is built up in the conventional manner with this "NORM" output, at step 3408. Admittedly, this network may contain no interesting information of itself. However, next, batch prediction is performed on this Discovery Domain, at step 3412. The scoring calculated by the Batch Prediction will serve to differentiate the data in the Discovery Domain. Thus, the next step is to recast the Discovery Domain by dropping the "NORM" output parameter, and replacing it with the scoring level, at step 3416. The scoring level can be considered a continuous Parameter, and thus may be categorized, by default into five bins. This is done at step 3420. Finally, this revised Discovery Domain may be subjected to a second Discovery Process, namely the construction of a second neuroagent network, at step 3424. The process thus terminates at step 3428.

The second neuroagent network that is the result of this process does permit the user to ascertain related groups of data, without any a priori knowledge of what would be the distinguishing Parameters. This feature of the present invention demonstrates the true predictive advantages of the neuroagent approach to data mining.

To give an example, say a user knew that the customer base included 10% "bad" customers, but could not characterize which Output Parameter to judge customer quality, nor, for that matter, what likely Input Parameters customer quality would be based upon. Thus, the user could perform a Segmentation Discovery, and partition (categorize) the population determined by scoring in one of two ways: (i) the lower 10% and upper 90%; or (ii) the lower 90% and upper 10%. This checking of the population distribution either way is due to a lack of information as to which end of the distribution would be significant to this 10% of "bad" customers, if it is significant at all. More generally, a user could investigate the population distribution and notice that the landscape appears to fall into two or more separate categories. Thus, Discovery performed on one of those categorized Domains could reveal those Parameters that are significant in characterizing the "bad" customers. One or more of the minimal criteria could therefore be proxies for customer quality, in other words, suitable choices for an Output Parameter.

b. Audit Profiles.

It was described earlier that the Success, Failure, Relative and Absolute Indetermination Profiles (shown in FIG. 20) amount to their own Discovery Processes. This is accomplished by augmenting the Output Parameter four-fold. This augmentation is based on whether the evaluation was a success, a failure, absolutely or relatively indeterminate. For example, if the Output Parameter was "ACCOUNT", with output values of "Balanced", "Overdraft", and "VISA Late Payment," then if the Evaluation Domain data record had an output of "Balanced", the Output Parameter would be tagged as "Good Balanced", "Bad Balanced", "Absolute Balanced" or "Relative Balanced", depending on the success (good), failure (bad) or indeterminancy (absolute or relative) of the evaluation. This augmented Evaluation Domain can thus serve as a new Discovery Domain and submitted to the neuroagent engine 3070 in the manner described earlier to determine the importances, frequencies, etc., of the individual successful, failed or indeterminate evaluations of the Output Parameter.

7. Parallelism.

There are many instances where the present invention is amenable to parallel or multi-threaded implementations. For example, multiple instances of the neuroagent network may be provided, in client-server fashion, in order that Evaluation or Prediction may be performed by various users in parallel. The process of Incremental Discovery may be applied in parallel, wherein different instances of the same original neuroagent network would be trained by different Discovery Domains operating in parallel, followed by a reconciliation phase verifying and correcting, through fusion of the neuroexpressions, of the differences in network connections among the different instances. Thereafter, a global calculation of the connection weights could be performed.

If the various Discovery Domains were characterized as representing different data sets, each say representing a different year's data, there might be some use keeping the instances separate and correlating the change in significance of the Input Parameters over time. If the interest was simply to perform the Discovery more quickly, one might prefer to have a random mix of data records among the Discovery Domains, in order that the reconciliation phase proceed rapidly in that each network instance has essentially comparable topology.

Additional advantages and modifications will readily occur to those skilled in the art. The invention in its broader aspects is therefore not limited to the specific details, representative apparatus and illustrative examples shown and described.

Thus, various modifications and variations can be made to the present invention without departing from the scope or spirit of the invention, and it is intended that the present invention cover the modifications provided they come within the scope of the appended claims and their equivalents.

We claim:

1. A data mining system comprising:
   a study manager with which a discovery domain, an evaluation domain and a prediction domain can be selected from at least one data sources, each data source including one or more data records, each data record having one or more parameters;
   a knowledge model engine, coupled to the study manager, which:
   (i) when presented with the discovery domain, constructs an explicitly predictive knowledge model in the form of a neuroagent network therefrom and returns a discovery results set, and
   (ii) when presented with either of the evaluation or prediction domains, applies the neuroagent network thereto and returns an evaluation or prediction results set, respectively;
   a discovery manager, coupled to the knowledge model engine, which takes the discovery results set from the knowledge model engine and calculates the relative significance of the parameters under the knowledge model;
   an evaluation manager, coupled to the knowledge model engine, which takes the evaluation results set from the knowledge model engine and calculates the accuracy of the knowledge model; and
   a prediction manager, coupled to the knowledge model engine, which takes the prediction results set from the knowledge model engine and calculates the predictions of the knowledge model.

2. The data mining system of claim 1, the neuroagent network of the knowledge model engine including:
   a plurality of input neuroagents;
   a plurality of output neuroagents, each output neuroagent having a minimal excitation zone and a contextual excitation zone, the contextual excitation zone having an excitation level and an excitation threshold associated therewith; and
   one or more connections formed between the input neuroagents and the output neuroagents, each connection of a input neuroagent to an output neuroagent formed either with the minimal or the contextual excitation zone thereof, each connection formed with the contextual excitation zone having a connection weight associated therewith, each connection weight having a stimulation function associated therewith,
   wherein the excitation level of an output neuroagent is a summation of the stimulation functions associated with the connections formed with the contextual excitation zone of that output neuroagent.

3. The data mining system of claim 2 wherein further each parameter is designated as either an input parameter or an output parameter, each parameter having a value, each value of an input parameter associated with at most one input neuroagent, each value of an output parameter parameter associated with at most one output neuroagent, a match between a parameter value and its associated input or output neuroagent termed a validation of such neuroagent.

4. The data mining system of claim 3 wherein application of the neuroagent network to either of the evaluation or prediction domains includes, for each data record of such domain:
a validation of those input neuroagents associated to the parameter values of the data record, and for each output neuroagent, calculation of its associated excitation level.

5. The data mining system of claim 4 wherein further:
the values of the output parameter of the evaluation domain are specified before being presented to the knowledge model; and
calculation of the accuracy of the knowledge model, for a given data record having a first value specified for the output parameter, includes identification of a first output neuroagent having the highest excitation level, this level termed a winner level, and comparison with an output neuroagent which is associated with the first value.

6. The data mining system of claim 5 wherein calculation of the accuracy of the knowledge model, for a given data record, further includes verification that the winner level exceeds the excitation threshold of the first output neuroagent.

7. The data mining system of claim 5 wherein calculation of the accuracy of the knowledge model, for a given data record, further includes:
identification of an output neuroagent having the next-highest excitation level as compared with winner level, this level termed a challenger level, and comparison of the winner level with challenger level.

8. The data mining system of claim 7 wherein calculation of the accuracy of the knowledge model, for a given data record, further includes verification that the relative difference between the winner level and the challenger level is less than a predetermined value, termed a rating error.

9. The data mining system of claim 4 wherein calculation of the predictions of the knowledge model, for a given data record, includes identification of an output neuroagent having the highest excitation level.

10. The data mining system of claim 9 wherein calculation of the prediction of the knowledge model, for a given data record, further includes formation of the discrimination between excitation levels of the output neuroagents.

11. The data mining system of claim 3 wherein the neuroagent network further includes:
one or more neuroexpressions connected to at least one output neuroagent, each neuroexpression representing one or more input neuroagents that are, for each data record of the discovery domain, either all validated or all not validated when the output neuroagent with which these neuroagents are connected is validated.

12. The data mining system of claim 11 wherein further:
the one or more neuroexpressions include at least a minimal neuroexpression or at least a contextual neuroexpression,
a minimal neuroexpression meaning that, for each data record of the discovery domain, the one or more neuroagents of the minimal neuroexpression are always validated when the output neuroagent with which these neuroagents are connected is validated, and
a contextual neuroexpression meaning that there is at least one data record of the discovery domain where the one or more neuroagents of the contextual neuroexpression are all not validated when the output neuroagent with which these neuroagents are connected is validated.

13. The data mining system of claim 2 wherein the calculation of the relative significance of the parameters includes the determination of the connection weight of the output neuroagents.

14. The data mining system of claim 13 wherein the calculation of the relative significance of the parameters further includes determination of the discrimination between the connection weights of the output neuroagents.

15. The data mining system of claim 2 wherein the calculation of the relative significance of the parameters further includes identification of a first set of input neuroagents for which a connection exists only to a single output neuroagent.

16. The data mining system of claim 2 wherein the calculation of the relative significance of the parameters further includes identification, for a given output neuroagent, a second set of input neuroagents for which no connection exists therewith.

17. The data mining system of claim 1 further comprising:
a graphical user interface including
a set of dialog screens through which the user can perform the selection of the discovery, evaluation and prediction domains, and
a spreadsheet and graphics generator by which the results sets from the neuroagent engine and the calculated values therefrom are displayed.

18. The data mining system of claim 17 wherein the spreadsheet and graphics generator is embodied, at least in part in an external spreadsheet application package.

19. The data mining system of claim 1 further comprising:
a flat file system; and
an open database connectivity to one or more databases, wherein the one or more data sources are selected from either the flat file system or the database.

20. The data mining system of claim 1 further comprising:
an open database connectivity to one or more databases, wherein at least one database is adapted to perform data warehousing.

21. A data mining system comprising:
a study manager with which a discovery domain can be selected from one or more data sources, each data source including at least one data records, each data record having one or more parameters;
a knowledge model engine, coupled to the study manager, which when presented with the discovery domain, constructs an explicitly predictive knowledge model in the form of a neuroagent network therefrom and returns a discovery results set; and
a discovery manager, coupled to the knowledge model engine, which takes the discovery results set from the knowledge model engine and calculates the relative significance of the parameters under the knowledge model.

22. A data mining system comprising:
a study manager with which a prediction domain can be selected from one or more data sources, each data source including at least one data records, each data record having one or more parameters;
a knowledge model engine, coupled to the study manager, which when presented with the prediction domain, applies an explicitly predictive knowledge model in the form of a neuroagent network thereto and returns a prediction results set; and
a prediction manager, coupled to the knowledge model engine, which takes the prediction results set from the knowledge model engine and calculates the predictions of the knowledge model.

23. In a data mining system wherein a discovery domain includes a plurality of parameters having one or more input parameters and one output parameter, the discovery domain selected from one or more data sources, each data source providing one or more data records, a method of creating meta data from the discovery domain comprising:

(i) for each parameter, input or output, determining the parameter's maximal value, minimal value, number of distinct values and number of null values;

(ii) if, for a parameter, the number of distinct values exceeds a first predetermined number, setting the number of distinct values to the first predetermined number;

(iii) for each parameter, creating a statistical meta data table, with a row allocated for each distinct value of the parameter, and the count of data records from the data sources having that distinct value, up to the first predetermined number; and (iv) saving the statistical meta data tables for each of the parameters.

24. The method of claim 23, further comprising:

(v) if a parameter is continuous or specially designated, creating a population meta data table with a second predetermined number of rows corresponding to data bins into which the parameter will be categorized;

(vi) allocating the ranges of the second predetermined of data bins;

(vii) setting each row of the population data table to the range of the corresponding data bin, and the count of the data records from the data sources of the parameter falling within that range; and (ix) saving the population data table.

25. The method of claim, 24, further comprising:

(x) repeating steps (v)–(ix) in the event that the parameter is re-categorized.

26. The method of claim 24 wherein the allocating step is performed on a equidistant basis.

27. The method of claim 24 wherein the allocating step is performed on a equidistributed basis.

28. The method of claim 24 wherein the allocating step is performed on a fuzzy distributed basis.

29. A method of data mining using a discovery domain comprised of a plurality of data records, each data record comprised of a plurality of parameters, one of the plurality of parameters termed an output parameter, all other of the plurality of parameters termed input parameters, each parameter categorized into a plurality of data bins, a neuroagent initialized for each represented data bin of the plurality of data bins for each parameter, each neuroagent of an input parameter termed an input neuroagent, each neuroagent of an output parameter termed an output neuroagent, each neuroagent including a communication and activation envelope, the method comprising the steps of:

(i) creating a population meta data table for each parameter in accordance with which one or more neuroagents which are initialized;

(ii) for a first data record of the plurality of data records whose output parameter corresponds to a first output neuroagent, (a) identifying in the first data record a first set of neuroagents corresponding to data bins represented in the first data record, (b) forming a first neuroexpression from the first set of neuroagents, and (c) connecting the first neuroexpression to the communication and activation envelope of the first output neuroagent;

(iii) for any subsequent second data record of the plurality of data records whose output parameter corresponds to the first output neuroagent, a current set of neuroexpressions connected to the communication and activation envelope of the first output neuroagent, each of the current set of neuroexpressions including a current set of neuroagents, (a) identifying a second set of neuroagents corresponding to data bins represented in the second data record, (b) forming a second neuroexpression from the second set of neuroagents, (c) forming a new neuroexpression from a difference of the second neuroexpression and a union of the current set of neuroexpressions;

(d) from each current neuroexpression of the current set of neuroexpressions, forming a common neuroexpression as an intersection of the current neuroexpression with the second neuroexpression, and a non-common neuroexpression as a difference of the current neuroexpression with the second neuroexpression, and (e) from the communication and activation envelope of the first output neuroagent, disconnecting the current set of neuroexpressions and connecting the new neuroexpression and for each of the current set of neuroexpressions, the common neuroexpressions and the non-common neuroexpressions, all these neuroexpressions so connected designated as a new current set of neuroexpressions;

(iv) repeating step (iii) above for all the subsequent second data records; and (v) for the network of neuroagents formed by steps (i)–(iv) above, calculating the importance of at least one input neuroagent towards at least one output neuroagent.

30. The method of claim 29, wherein at least one of the identifications performed in steps (ii)(a) or (iii)(a) is performed through a lookup of the population meta data table.

31. The method of claim 29, wherein further:

the communication and activation envelope of each output neuroagent having a minimal excitation zone and a contextual excitation zone, for the first data record, the first neuroexpression is connected to the minimal excitation zone of the first output neuroagent, for all the subsequent data records, at most one of the new current neuroexpressions is connected to the minimal excitation zone of the first output neuroagent, formed by the intersection of the current neuroexpression with at most one of the current neuroexpressions that was disconnected from the minimal excitation zone of the first output neuroagent in step (iii).

32. The method of claim 29, wherein importance, for a given output neuroagent and a certain neuroexpression connected to the communication and activation envelope of the output neuroagent, is calculated as the probability that the given output neuroagent is validated when the certain neuroexpression is true.

33. The method of claim 22 wherein the importance calculation is subject to an occurrence threshold.

* * * * *